(12) United States Patent
Tanabe et al.

(10) Patent No.: US 10,564,921 B2
(45) Date of Patent: Feb. 18, 2020

(54) DISPLAY DEVICE, DISPLAY METHOD, AND DISPLAY SYSTEM FOR DETERMINING IMAGE DISPLAY SIZE

(71) Applicants: Kazuhide Tanabe, Tokyo (JP); Ryoh Aruga, Kanagawa (JP); Fumihiko Minagawa, Chiba (JP); Tatsuroh Sugioka, Kanagawa (JP)

(72) Inventors: Kazuhide Tanabe, Tokyo (JP); Ryoh Aruga, Kanagawa (JP); Fumihiko Minagawa, Chiba (JP); Tatsuroh Sugioka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 248 days.

(21) Appl. No.: 15/451,517

(22) Filed: Mar. 7, 2017

(65) Prior Publication Data
US 2017/0262250 A1 Sep. 14, 2017

(30) Foreign Application Priority Data

Mar. 9, 2016 (JP) .................................. 2016-045389
Nov. 2, 2016 (JP) .................................. 2016-215605

(51) Int. Cl.
*G06F 3/14* (2006.01)
*G09G 5/391* (2006.01)

(52) U.S. Cl.
CPC ........... *G06F 3/1462* (2013.01); *G09G 5/391* (2013.01); *G09G 2310/08* (2013.01); *G09G 2340/0407* (2013.01)

(58) Field of Classification Search
CPC ................................ G06F 3/1462; G09G 5/14
See application file for complete search history.

(56) References Cited

U.S. PATENT DOCUMENTS 6,592,227 B2 * 7/2003 Ouchi .................. G03B 21/005
353/122
2002/0159035 A1 * 10/2002 Koyama ............ H04N 5/44513
353/31

(Continued)

FOREIGN PATENT DOCUMENTS

JP 2004-054134 2/2004
JP 2004-054783 2/2004

(Continued)

*Primary Examiner* — Barry Drennan
*Assistant Examiner* — Terrell M Robinson
(74) *Attorney, Agent, or Firm* — Harness, Dickey & Pierce, P.L.C.

(57) ABSTRACT

A display device that displays image data received from a transfer device includes a size determiner, a control information transmitter, a size adjuster, and an outputter. The size determiner determines a transmission image size as a resolution at which image data is to be transmitted by the transfer device, based on a display image size as a resolution at which the image data is to be displayed and a desired image size as a resolution at which the transfer device desires to transmit the image data. The control information transmitter transmits control information including the determined transmission image size to the transfer device. The size adjuster converts the image data received from the transfer device into image data having a resolution indicated as the display image size. The outputter displays the image data converted by the size adjuster on a screen.

18 Claims, 41 Drawing Sheets

(56) References Cited

U.S. PATENT DOCUMENTS

| | | | |
|---|---|---|---|
| 2004/0130568 A1 | 7/2004 | Nagano et al. | |
| 2006/0177152 A1* | 8/2006 | Lin | G06T 3/40 |
| | | | 382/299 |
| 2008/0037055 A1* | 2/2008 | Yun | H04N 1/00214 |
| | | | 358/1.15 |
| 2008/0074444 A1* | 3/2008 | Morikawa | G09G 5/005 |
| | | | 345/660 |
| 2008/0144501 A1* | 6/2008 | Nagy | H04W 28/22 |
| | | | 370/235 |
| 2010/0095241 A1 | 4/2010 | Nagano et al. | |
| 2012/0093171 A1 | 4/2012 | Yamashita et al. | |
| 2013/0219012 A1* | 8/2013 | Suresh | G09G 5/14 |
| | | | 709/217 |
| 2014/0115528 A1 | 4/2014 | Nagano et al. | |
| 2014/0226031 A1* | 8/2014 | Yoshida | H04N 1/00307 |
| | | | 348/207.1 |
| 2014/0376878 A1 | 12/2014 | Nakamura et al. | |
| 2017/0024031 A1* | 1/2017 | Ueda | G06F 3/0488 |
| 2017/0052757 A1* | 2/2017 | Kanda | G06F 3/1462 |
| 2017/0148420 A1* | 5/2017 | Gao | G09G 5/391 |
| 2018/0069761 A1* | 3/2018 | Iwami | G06F 13/00 |

FOREIGN PATENT DOCUMENTS

| | | |
|---|---|---|
| JP | 2004-140818 | 5/2004 |
| JP | 2010-141779 | 6/2010 |
| JP | 2015-005908 | 1/2015 |

\* cited by examiner

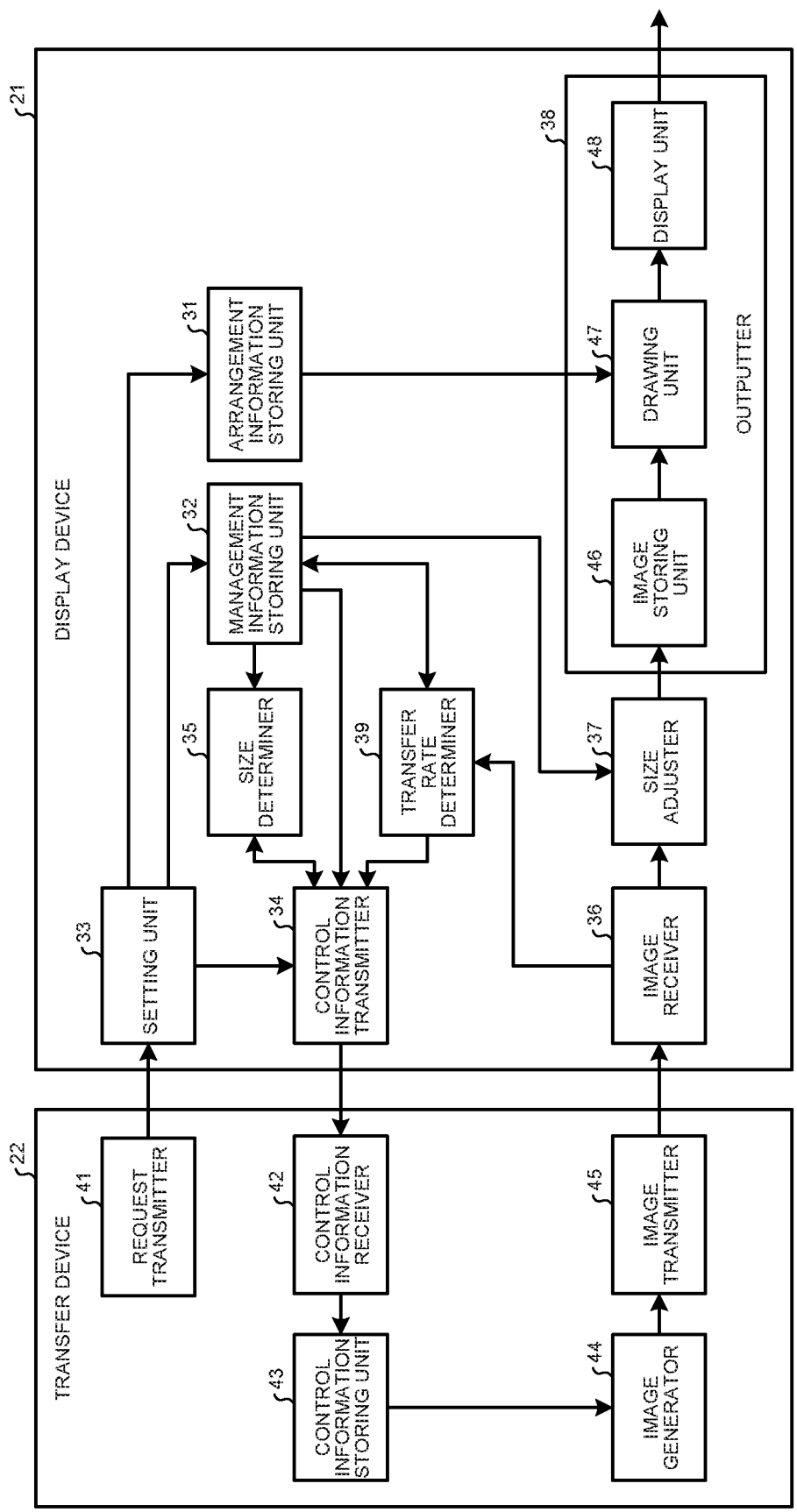

FIG.5

ARRANGEMENT INFORMATION

· MODE: 4
· DISPLAY TYPE: DIVIDED DISPLAY
· DISPLAY ALLOWED REGION (0, 0) (1280, 800)
· DRAWING ORDER: 2→3→4→1
· DRAWING POSITION OF EACH IMAGE DATA
    IMAGE NUMBER 1: STARTING-POINT COORDINATES (5, 5),
        WIDTH 800, HEIGHT 450
    IMAGE NUMBER 2: STARTING-POINT COORDINATES (645, 5),
        WIDTH 630, HEIGHT 390
    IMAGE NUMBER 3: STARTING-POINT COORDINATES (5, 405),
        WIDTH 630, HEIGHT 390
    IMAGE NUMBER 4: STARTING-POINT COORDINATES (645, 405),
        WIDTH 630, HEIGHT 390

FIG.6

MODE: 1
DISPLAY TYPE: FULL-SCREEN DISPLAY
DISPLAY ALLOWED REGION (0, 0), (1280, 800)
DRAWING ORDER: 1
IMAGE NUMBER 1: STARTING-POINT COORDINATES (0, 0),
 WIDTH 1280, HEIGHT 800

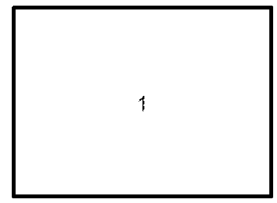

MODE: 2
DISPLAY TYPE: DIVIDED DISPLAY
DISPLAY ALLOWED REGION (0, 0), (1280, 800)
DRAWING ORDER: 2→1
IMAGE NUMBER 1: STARTING-POINT COORDINATES (5, 5),
 WIDTH 630, HEIGHT 395
IMAGE NUMBER 2: STARTING-POINT COORDINATES (640, 5),
 WIDTH 630, HEIGHT 395

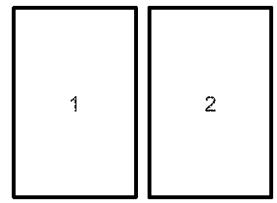

MODE: 3
DISPLAY TYPE: DIVIDED DISPLAY
DISPLAY ALLOWED REGION (0, 0), (1280, 800)
DRAWING ORDER: 2→3→1
IMAGE NUMBER 1: STARTING-POINT COORDINATES (5, 5),
 WIDTH 1270, HEIGHT 390
IMAGE NUMBER 2: STARTING-POINT COORDINATES (5, 405),
 WIDTH 630, HEIGHT 390
IMAGE NUMBER 3: STARTING-POINT COORDINATES (645, 405),
 WIDTH 630, HEIGHT 390

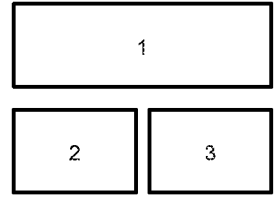

MODE: 4
DISPLAY TYPE: DIVIDED DISPLAY
DISPLAY ALLOWED REGION (0, 0), (1280, 800)
DRAWING ORDER: 2→3→4→1
IMAGE NUMBER 1: STARTING-POINT COORDINATES (5, 5),
 WIDTH 800, HEIGHT 450
IMAGE NUMBER 2: STARTING-POINT COORDINATES (645, 5),
 WIDTH 630, HEIGHT 390
IMAGE NUMBER 3: STARTING-POINT COORDINATES (5, 405),
 WIDTH 630, HEIGHT 390
IMAGE NUMBER 4: STARTING-POINT COORDINATES (645, 405),
 WIDTH 630, HEIGHT 390

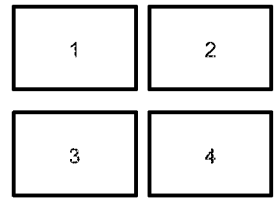

FIG.7

| MODE | 3 |
|---|---|
| DISPLAY TYPE | DIVIDED DISPLAY |

MANAGEMENT TABLE

| ITEM NUMBER | IMAGE NUMBER | JOB IDENTIFIER | IP ADDRESS | TRANSMISSION TRANSFER RATE | DISPLAY IMAGE SIZE |
|---|---|---|---|---|---|
| 1 | 2 | 1286 | 10.60.62.21 | 5 Mbps | 1280×400 |
| 2 | 3 | 2387 | 10.60.62.234 | 7 Mbps | 640×400 |
| 3 | 1 | 8541 | 10.60.62.4 | 13 Mbps | 640×400 |

FIG.8

START REQUEST

| PREFERRED IMAGE SIZE | IP ADDRESS | DISPLAY TYPE |
|---|---|---|

FIG.9

CONTROL INFORMATION

| JOB IDENTIFIER | TRANSMISSION IMAGE SIZE | TRANSMISSION TRANSFER RATE | MODE | DISPLAY TYPE |
|---|---|---|---|---|

FIG.10

DISPLAY REQUEST

| JOB IDENTIFIER | IMAGE DATA (BODY) | TRANSMISSION IMAGE SIZE | DISPLAY TYPE | TRANSMISSION TRANSFER RATE | TRANSMISSION TIME |
|---|---|---|---|---|---|

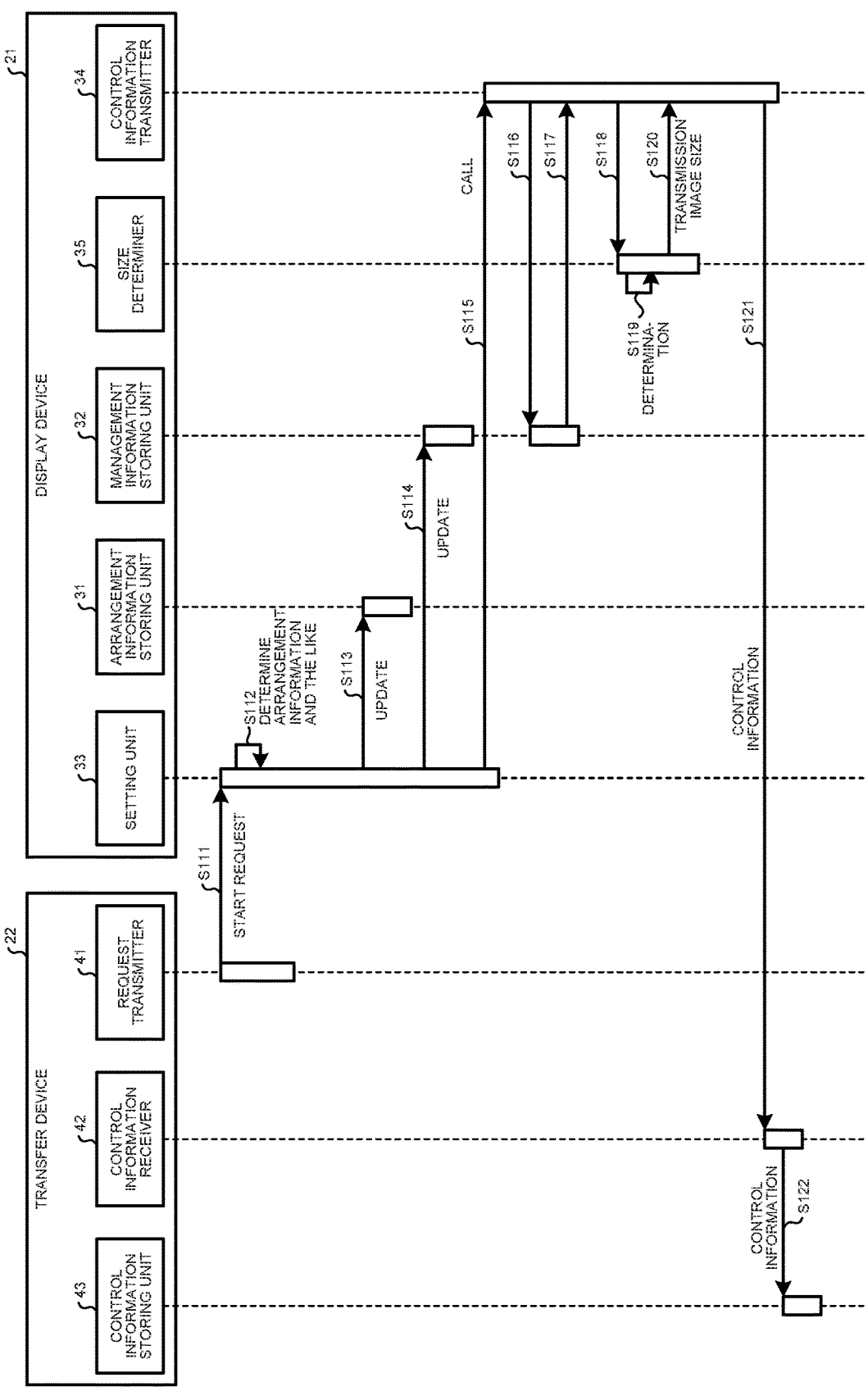

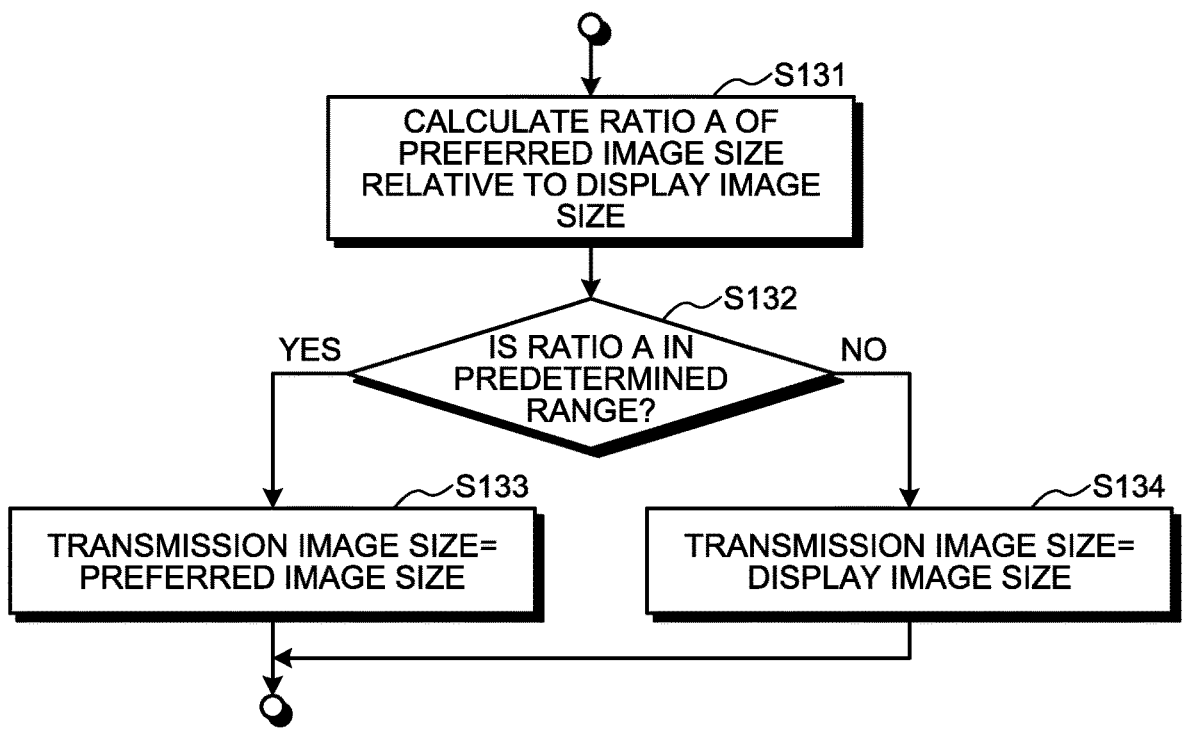

FIG.18

| AUTOMATIC ADJUSTMENT INFORMATION | |
|---|---|
| ·AUTOMATIC ADJUSTMENT OF TRANSMISSION IMAGE SIZE | ON |
| ·AUTOMATIC ADJUSTMENT OF TRANSMISSION TRANSFER RATE | ON |
| ·AUTOMATIC ADJUSTMENT OF SIZE WHEN AUXILIARY INFORMATION IS DISPLAYED | OFF |

FIG.19

| AUTOMATIC ADJUSTMENT SETTING SCREEN | | |
|---|---|---|
| ·PERFORM AUTOMATIC ADJUSTMENT OF TRANSMISSION IMAGE SIZE? | ■YES | □NO |
| ·PERFORM AUTOMATIC ADJUSTMENT OF TRANSMISSION TRANSFER RATE? | ■YES | □NO |
| ·PERFORM AUTOMATIC ADJUSTMENT OF SIZE WHEN AUXILIARY INFORMATION IS DISPLAYED | □YES | ■NO |

FIG.22

AUTOMATIC ADJUSTMENT SETTING SCREEN

· PERFORM QUALITY ENHANCEMENT?　　　■YES　　□NO

FIG.23

AUTOMATIC ADJUSTMENT INFORMATION (WHEN QUALITY ENHANCEMENT IS PERFORMED)

· AUTOMATIC ADJUSTMENT OF TRANSMISSION IMAGE SIZE　OFF

· AUTOMATIC ADJUSTMENT OF TRANSMISSION TRANSFER RATE　ON

FIG.24

AUTOMATIC ADJUSTMENT INFORMATION (WHEN QUALITY ENHANCEMENT IS NOT PERFORMED)

· AUTOMATIC ADJUSTMENT OF TRANSMISSION IMAGE SIZE　ON

· AUTOMATIC ADJUSTMENT OF TRANSMISSION TRANSFER RATE　OFF

FIG.25

AUTOMATIC ADJUSTMENT SETTING SCREEN

· PERFORM AUTOMATIC SWITCHING OPERATION?　　　■YES　　□NO

FIG.26

AUTOMATIC ADJUSTMENT INFORMATION
(WHEN AUTOMATIC SWITCHING OPERATION IS PERFORMED)

·AUTOMATIC ADJUSTMENT OF TRANSMISSION IMAGE SIZE    ON

·AUTOMATIC ADJUSTMENT OF TRANSMISSION
   TRANSFER RATE      ON

FIG.27

AUTOMATIC ADJUSTMENT INFORMATION
(WHEN AUTOMATIC SWITCHING OPERATION IS NOT PERFORMED)

·AUTOMATIC ADJUSTMENT OF TRANSMISSION IMAGE SIZE    OFF

·AUTOMATIC ADJUSTMENT OF TRANSMISSION
   TRANSFER RATE      OFF

FIG.31

SETTING SCREEN OF TRANSMISSION DELAYING OPERATION OF CONTROL INFORMATION

· PERFORM TEMPORARY POSTPONEMENT OPERATION OF
　TRANSMISSION OF CONTROL INFORMATION?　　　　■YES　　□NO

FIG.33

| MODE | 4 |
|---|---|
| DISPLAY TYPE | DIVIDED DISPLAY |

| ITEM NUMBER | IMAGE NUMBER | JOB IDENTIFIER | IP ADDRESS | TRANSMISSION TRANSFER RATE | DISPLAY IMAGE SIZE | OPERATION STATE |
|---|---|---|---|---|---|---|
| 1 | 2 | 1286 | 10.60.62.21 | 5 Mbps | 1280×400 | DISPLAY ALLOWED |
| 2 | 3 | 2387 | 10.60.62.234 | 7 Mbps | 640×400 | DISPLAY ALLOWED |
| 3 | 1 | 8541 | 10.60.62.4 | 13 Mbps | 640×400 | BEING CHANGED |

CONTROL INFORMATION

| JOB IDENTIFIER | TRANSMIS- SION IMAGE SIZE | TRANSMISSION TRANSFER RATE | MODE | DISPLAY TYPE | OPERATION STATE |
|---|---|---|---|---|---|
| | | | | | |

FIG.39

SETTING SCREEN OF COMMUNICATION SUPPRESSING OPERATION
WHILE IMAGE DATA IS BEING ARRANGED

·PERFORM COMMUNICATION SUPPRESSING OPERATION      ■YES    □NO
 WHILE IMAGE DATA IS BEING ARRANGED?

SETTING SCREEN OF SCREEN ARRANGEMENT FIXING OPERATION

·FIX SCREEN ARRANGEMENT?　　　　　■YES　　☐NO

DUMMY DATA

| INFORMATION TYPE | OPTIONAL INFORMATION SIZE | OPTIONAL INFORMATION |
|---|---|---|

INFORMATION TYPE TABLE

| NO. | INFORMATION TYPE |
|---|---|
| 01 | NO INFORMATION |
| 02 | TEXT |
| ... | ... |

DISPLAY DEVICE, DISPLAY METHOD, AND DISPLAY SYSTEM FOR DETERMINING IMAGE DISPLAY SIZE

CROSS-REFERENCE TO RELATED APPLICATIONS

The present application claims priority under 35 U.S.C. § 119 to Japanese Patent Application No. 2016-045389, filed on Mar. 9, 2016 and Japanese Patent Application No. 2016-215605, filed on Nov. 2, 2016. The contents of which are incorporated herein by reference in their entirety.

BACKGROUND OF THE INVENTION

1. Field of the Invention

The present invention relates to a display device, a display method, and a display system.

2. Description of the Related Art

There is known a display system including a computer (transfer device) configured to generate image data and a projector. In this display system, the projector receives the image data from the computer and projects the image data onto a screen.

In this display system, the resolution of displayed image data is changed in some cases. For example, an image size is changed through an operation by a user or the like in some cases. In such a case, in the display system, to inform the change of the resolution of image data, setting values are needs to be transmitted (negotiated) between the projector and the computer. Thus, in the display system, communication procedures performed when the resolution of image data is changed are cumbersome.

In this display system, either one of the projector and the computer executes the conversion operation of the resolution of image data. Thus, in this display system, a large processing load is applied on one of the projector and the computer. In a case in which the projector executes the conversion operation of the resolution, high-resolution image data is transmitted from the computer to the projector, resulting in a large communication load. In a case in which the computer executes the conversion operation of the resolution, it is difficult to perform temporary change or fine adjustment of the resolution.

SUMMARY OF THE INVENTION

According to one aspect of the present invention, a display device that displays image data received from a transfer device includes a size determiner, a control information transmitter, a size adjuster, and an outputter. The size determiner determines a transmission image size as a resolution at which image data is to be transmitted by the transfer device, based on a display image size as a resolution at which the image data is to be displayed and a desired image size as a resolution at which the transfer device desires to transmit the image data. The control information transmitter transmits control information including the determined transmission image size to the transfer device. The size adjuster converts the image data received from the transfer device into image data having a resolution indicated as the display image size. The outputter displays the image data converted by the size adjuster on a screen.

BRIEF DESCRIPTION OF THE DRAWINGS

FIG. 4 is a diagram illustrating functional configurations of the display device and the transfer device according to a first embodiment;

FIG. 5 is a diagram illustrating exemplary arrangement information;

FIG. 6 is a diagram illustrating variations of arrangement information that can be set;

FIG. 7 is a diagram illustrating exemplary management information;

FIG. 8 is a diagram illustrating information items included in a start request;

FIG. 9 is a diagram illustrating information items included in control information;

FIG. 10 is a diagram illustrating information items included in a display request;

FIG. 11 is a sequence diagram illustrating an exemplary flow of operations when the start request is transmitted;

FIG. 12 is a flowchart illustrating a procedure of determining a transmission image size;

FIG. 18 is a diagram illustrating exemplary automatic adjustment information;

FIG. 19 is a diagram illustrating a setting screen for receiving information on whether to perform automatic adjustment;

FIG. 22 is a diagram illustrating a setting screen for receiving information on whether to increase quality;

FIG. 23 is a diagram illustrating exemplary automatic adjustment information when the quality enhancement is set to be performed;

FIG. 24 is a diagram illustrating exemplary automatic adjustment information when quality enhancement is set not to be performed;

FIG. 25 is a diagram illustrating a setting screen for receiving information on whether to execute automatic switching operation;

FIG. 26 is a diagram illustrating exemplary automatic adjustment information when the automatic switching operation is set to be executed;

FIG. 27 is a diagram illustrating exemplary automatic adjustment information when the automatic switching operation is set not to be executed;

FIG. 31 is a diagram illustrating a setting screen for receiving information on whether to execute transmission delaying operation of the control information;

FIG. 33 is a diagram illustrating exemplary management information according to the third modification of the first embodiment;

FIG. 39 is a diagram illustrating a setting screen for receiving information on whether to execute communication suppressing operation;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
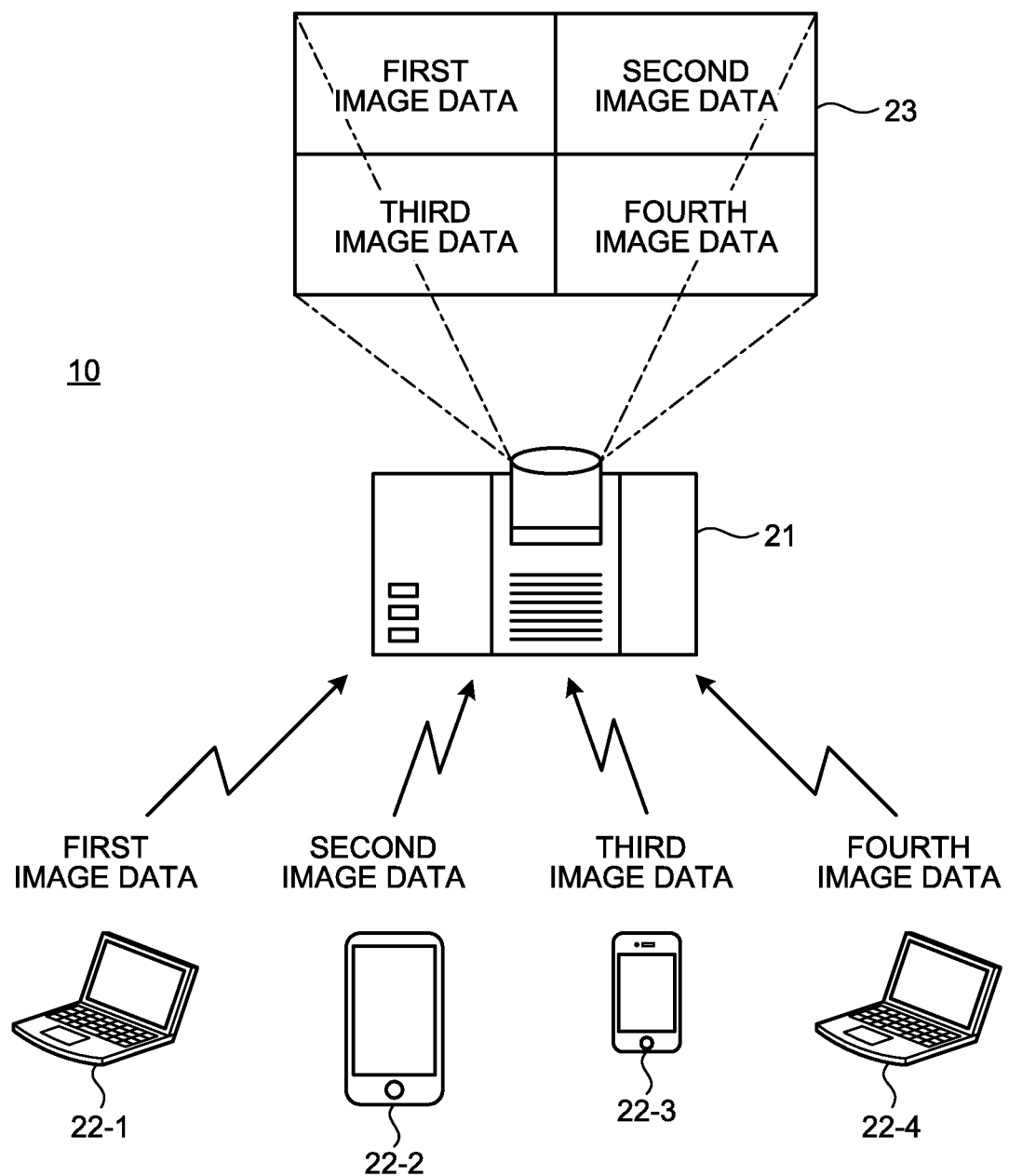
FIG. 1 is a diagram illustrating a display system.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide a display device, a display method, and a display system that are capable of reducing the number of communication procedures performed between a display device and a transfer device.

First Embodiment

The following first describes a display system 10 according to a first embodiment.

FIG. 1 is a diagram illustrating the display system 10. The display system 10 includes a display device 21, a plurality of transfer devices 22 (22-1, 22-2, 22-3, and 22-4), and a screen 23.

The display device 21 and each transfer device 22 are connected with each other through, for example, a wired communication or wireless communication network.

The display device 21 receives image data from the transfer device 22 and displays the image data on the screen. In the present embodiment, the display device 21 is a projector configured to receive image data from the transfer device 22 through the network and project the received image data onto the screen 23. The display device 21 is capable of receiving image data from each transfer device 22 and collectively displaying the pieces of image data on one screen. The present embodiment describes an example in which the display device 21 receives a plurality of pieces of image data from the transfer devices 22 through the network and collectively projects the pieces of image data onto the single screen 23 (screen).

For example, in the example illustrated in FIG. 1, the display device 21 receives first to fourth pieces of image data from the first to the fourth transfer devices 22-1 to 22-4. Then, the display device 21 projects the first to the fourth pieces of image data onto the respective regions obtained by dividing the screen 23 into four. The display device 21 does not necessarily need to receive four pieces of image data, but may receive any number of pieces of image data.

Each transfer device 22 transmits image data to the display device 21. The transfer device 22 may be a computer configured to execute information processing, such as a laptop computer, a tablet terminal, and a smartphone. Alternatively, the transfer device 22 may be a device configured to read image data from a recording medium and output the image data. Alternatively, the transfer device 22 may be a video playback device configured to play back image data. Alternatively, the transfer device 22 may be a reception device configured to receive a broadcast signal or a communication signal and play back video data.

Figure 2:
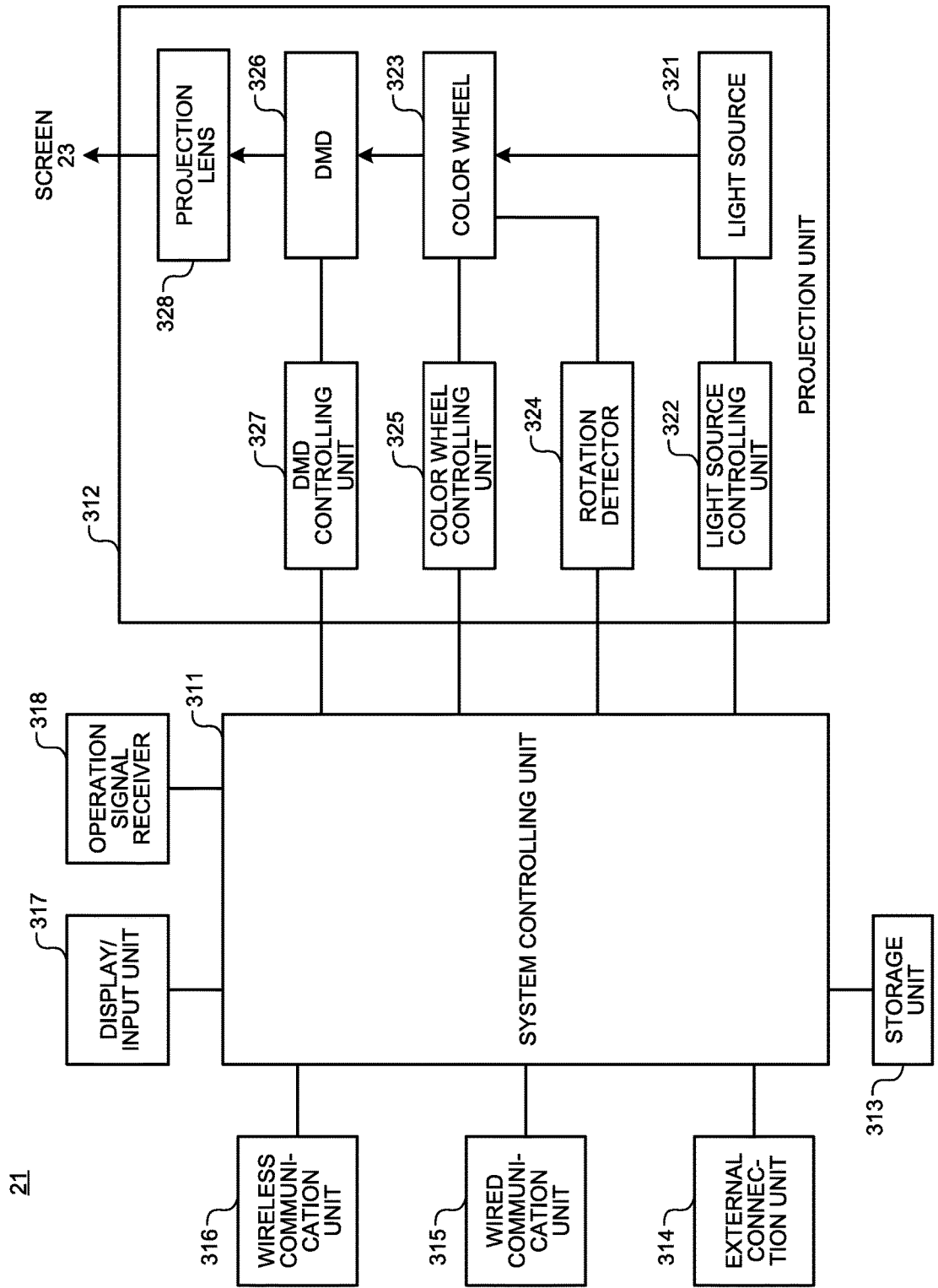
FIG. 2 is a diagram illustrating a hardware configuration of the display device.

FIG. 2 is a diagram illustrating a hardware configuration of the display device 21. The display device 21 includes a system controlling unit 311, a projection unit 312, a storage unit 313, an external connection unit 314, a wired communication unit 315, a wireless communication unit 316, a display/input unit 317, and an operation signal receiver 318.

The system controlling unit 311 includes, for example, peripheral circuits such as a central processing unit (CPU), a random access memory (RAM), and a read only memory (ROM). The system controlling unit 311 controls the entire display device 21 by executing a computer program stored in, for example, the storage unit 313.

The storage unit 313 includes, for example, a RAM, a ROM, or a flash memory. The storage unit 313 stores therein, for example, various kinds of computer programs to be executed by the display device 21, image data to be projected, and various kinds of setting information.

The external connection unit 314 is an interface for inputting of external video (image) data such as an image output signal from a computer, and a HDMI (registered trademark) signal and a video signal from, for example, a video instrument. The wired communication unit 315 includes a wired LAN interface and a communication controlling unit for the interface.

The wireless communication unit 316 includes a wireless LAN interface and a communication controlling unit for the interface. The wireless communication unit 316 connects the display device 21 with the transfer device 22 through the network.

The display/input unit 317 includes, for example, an operation button or a touch panel, and displays various kinds of information. The display/input unit 317 accepts inputting of an operation by a user on, for example, the operation button or the touch panel. The operation signal receiver 318 accepts inputting of an operation by the user by receiving an operation signal from, for example, a remote controller.

The projection unit 312 includes a light source 321, a light source controlling unit 322, a color wheel 323, a rotation detector 324, a color wheel controlling unit 325, a digital mirror device (DMD) 326, a DMD controlling unit 327, and a projection lens 328.

The light source 321 is an image projection light source such as a lamp, a light emitting diode (LED), or a solid light source such as a semiconductor laser. The light source controlling unit 322 controls, for example, the brightness of the light source 321 and turning on and off of the light source 321.

The color wheel 323 performs coloring by transmitting light from the light source 321 while rotating, at high speed, a circular disk colored in three colors of, for example, red, blue, and green. The rotation detector 324 detects a rotation state of the color wheel 323. The color wheel controlling unit 325 controls rotation of the color wheel 323.

The DMD 326 is a display element including a large number of two-dimensionally disposed micro mirrors. The DMD controlling unit 327 controls orientation of the micro mirrors of the DMD 326 for each pixel in accordance with image data to be projected. The projection lens 328 projects, onto the screen 23, light passing through the DMD 326. The DMD 326 and the color wheel 323 are an exemplary image projection display element, and may be, for example, another display element such as a liquid crystal display (LCD).

Light emitted from the light source 321 is colored through the color wheel 323, is reflected at the DMD 326, the orientation of which is controlled for each pixel in accordance with image data, and is incident on the screen 23 through the projection lens 328, forming an image.

Figure 3:
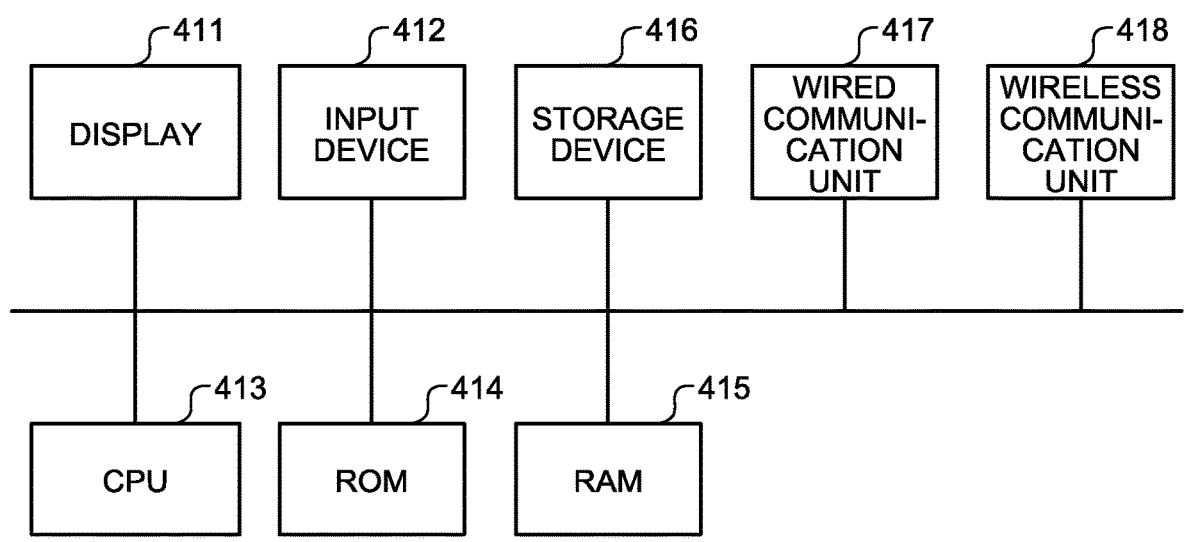
FIG. 3 is a diagram illustrating a hardware configuration of a transfer device.

FIG. 3 is a diagram illustrating a hardware configuration of each transfer device 22. The transfer device 22 has a configuration same as that of a normal computer. Specifically, the transfer device 22 includes a display 411, an input device 412, a CPU 413, a ROM 414, a RAM 415, a storage device 416, a wired communication unit 417, and a wireless communication unit 418. These components are connected with each other through a bus.

The display 411 is a display device such as an LCD. The display 411 displays information based on a display signal from the CPU 413. The input device 412 accepts inputting of information on an operation by the user on, for example, a keyboard or a mouse. The input device 412 supplies the input operation information to the CPU 413. The display 411 and the input device 412 may be integrally provided as, for example, a touch panel.

The CPU 413 is an exemplary processor configured to perform, for example, data processing and control by executing a computer program. The CPU 413 executes, by using a predetermined region of the RAM 415 as a work area, various kinds of processing through cooperation with various computer programs previously stored in the ROM 414 or the storage device 416, and performs overall control of operation of each component included in the transfer device 22. The CPU 413 controls, for example, the display 411, the input device 412, the wired communication unit 417, and the wireless communication unit 418 through cooperation with the computer programs previously stored in the ROM 414 or the storage device 416.

The ROM 414 is a non-transitory memory storing therein a computer program and various kinds of information used for control of the transfer device 22. The RAM 415 is a transitory memory configured to function as a work area for the CPU 413.

The storage device 416 is a semiconductor storage medium such as a flash memory, or a rewritable storage device such as a magnetically or optically recordable storage medium. The storage device 416 stores therein a computer program and various kinds of information used for control of the transfer device 22.

The wired communication unit 417 includes a wired LAN interface and a communication controlling unit for the interface. The wireless communication unit 418 includes a wireless LAN interface and a communication controlling unit for the interface. The wireless communication unit 418 connects the transfer device 22 with the display device 21 through the network.

FIG. 4 is a diagram illustrating functional configurations of the display device 21 and the transfer device 22 according to the first embodiment. The display device 21 includes an arrangement information storing unit 31, a management information storing unit 32, a setting unit 33, a control information transmitter 34, a size determiner 35, an image receiver 36, a size adjuster 37, an outputter 38, and a transfer rate determiner 39. The transfer device 22 includes a request transmitter 41, a control information receiver 42, a control information storing unit 43, an image generator 44, and an image transmitter 45.

The arrangement information storing unit 31 of the display device 21 stores therein arrangement information. The arrangement information indicates, for example, on-screen arrangement of each piece of image data collectively displayed on one screen. The arrangement information will be further described in detail with reference to FIGS. 5 and 6.

The management information storing unit 32 of the display device 21 stores therein management information. The management information is information used for management and display of image data received from each transfer device 22. The management information includes a display image size as the resolution of display of the image data received from the transfer device 22. The management information includes the display image size of each transfer device 22.

The management information also includes a transmission transfer rate as the transfer rate (bit rate, for example) of image data to be transmitted from the transfer device 22. The management information includes the transmission transfer rate of each transfer device 22. The management information will be further described in detail with reference to FIG. 7.

Before transmitting image data to the display device 21 to start display, the request transmitter 41 of the transfer device 22 transmits a start request to the display device 21. The start request includes a desired image size as a resolution at which the transfer device 22 desires to transmit image data. The start request will be further described with reference to FIG. 8.

The setting unit 33 of the display device 21 receives the start request from any one of the transfer devices 22. Upon reception of the start request from any one of the transfer devices 22, the setting unit 33 changes the arrangement information and the management information.

The control information transmitter 34 of the display device 21 transmits control information to each transfer device 22. The control information includes a transmission image size as the resolution of image data to be transmitted by the corresponding transfer device 22, and a transmission transfer rate as the transfer rate of the image data to be transmitted by the corresponding transfer device 22.

When a display image size stored in the management information storing unit 32 is set or changed, the control information transmitter 34 causes the size determiner 35 to determine a transmission image size as the resolution of the image data to be transmitted by the corresponding transfer device 22. Then, the control information transmitter 34 transmits the control information including the determined transmission image size to the corresponding transfer device 22.

When a transmission transfer rate stored in the management information storing unit 32 is set or changed, the control information transmitter 34 transmits the control information including the set or changed transmission transfer rate to the corresponding transfer device 22. The control information will be further described with reference to FIG. 9.

When called by the control information transmitter 34, the size determiner 35 of the display device 21 determines a transmission image size as a resolution at which image data is to be transmitted by the corresponding transfer device 22. For example, the size determiner 35 determines a transmission image size included in the control information to be transmitted to the corresponding transfer device 22 based on a display image size as a resolution at which image data received from the corresponding transfer device 22 is to be displayed and the desired image size as a resolution at which the corresponding transfer device 22 desires to transmit image data.

More specifically, the size determiner 35 sets the transmission image size to be the desired image size when the ratio of the desired image size relative to the display image size is in a predetermined range. The size determiner 35 sets the transmission image size to be the display image size when the ratio of the desired image size relative to the display image size is out of the predetermined range. Determination operation of the transmission image size will be further described with reference to FIG. 12.

The control information receiver 42 of the transfer device 22 receives the control information from the display device 21. The control information storing unit 43 of the transfer device 22 stores therein the control information received by the control information receiver 42.

The image generator 44 of the transfer device 22 generates image data having the transmission image size included in the received control information. The image transmitter 45 of the transfer device 22 transmits, to the display device 21, a display request including the image data generated by the image generator 44. In this case, the image transmitter 45 transmits the image data to the display device 21 at the transmission transfer rate included in the received control information. For example, the image transmitter 45 encodes the image data to a target encoding degree that allows transmission at the transmission transfer rate (bit rate) included in the received control information. The display request will be further described with reference to FIG. 10.

The image receiver 36 of the display device 21 receives the display request from any one of the transfer devices. The image receiver 36 provides the size adjuster 37 with the image data included in the received display request. The image receiver 36 performs measurement to obtain a measured value of the transfer rate of the data received from each transfer device 22. Then, the image receiver 36 provides the transfer rate determiner 39 with the measured value of the transfer rate measured for each transfer device 22.

The size adjuster 37 of the display device 21 converts the resolution of the image data received from each transfer device 22 into the corresponding display image size stored in the management information storing unit 32. The size adjuster 37, however, does not convert the resolution when the resolution (transmission image size) of the received image data matches with the display image size stored in the management information storing unit 32.

The outputter 38 of the display device 21 displays the image data that is received from each transfer device 22 and the resolution of which is converted by the size adjuster 37, collectively on one screen in arrangement in accordance with the arrangement information stored in the arrangement information storing unit 31. The outputter 38 includes, for example, an image storing unit 46, a drawing unit 47, and a display unit 48.

The image storing unit 46 stores therein the image data, the resolution of which is converted, in association with the transfer device 22 from which the image data is transmitted. For example, when having received new image data from any one of the transfer devices 22, the image storing unit 46 deletes image data stored in association with the transfer device 22 and stores therein the new image data instead. This configuration allows the outputter 38 to update displayed image data at each reception of new image data.

The drawing unit 47 generates synthesized image data by drawing each piece of image data stored in the image storing unit 46 at a screen position indicated by the arrangement information. In this manner, the drawing unit 47 can collectively display, on one screen, pieces of image data received from the respective transfer devices 22.

The display unit 48 displays the synthesized image data generated by the drawing unit 47. In the present embodiment, the display unit 48 projects the synthesized image data onto the screen 23.

The transfer rate determiner 39 of the display device 21 determines the transmission transfer rate included in the control information to be transmitted to the corresponding transfer device 22 based on the measured value of the transfer rate of the received image data. The transfer rate determiner 39 determines the transmission transfer rate for each transfer device 22.

For example, the transfer rate determiner 39 sets the transmission transfer rate to be a first speed if the transfer rate of the received image data is equal to or larger than a defined value, or sets the transmission transfer rate to be a second speed lower than the first speed if the transfer rate of the received image data is smaller than the defined value. Upon the determination of the transmission transfer rate, the transfer rate determiner 39 replaces the transmission transfer rate stored in the management information storing unit 32 with the determined transmission transfer rate. Determination operation of the transmission transfer rate will be further described with reference to FIG. 16.

FIG. 5 is a diagram illustrating exemplary arrangement information. The arrangement information includes a mode, a display type, a display allowed region, a drawing order, and a drawing position of each piece of image data.

The mode indicates the number of pieces of image data collectively displayed on one screen. In the present embodiment, in mode 1, one piece of image data is displayed one screen. In mode 2, two pieces of image data are displayed on one screen. In mode 3, three pieces of image data are displayed on one screen. In mode 4, four pieces of image data are displayed on one screen. Any mode other than these modes may be applicable.

A unique image number is allocated to each piece of image data collectively displayed on one screen. For example, in a case of mode 1, image number 1 is allocated to one piece of image data. In a case of mode 2, image number 1 is allocated to the first image data, and image number 2 is allocated to the second image data. In a case of mode 3, image number 1 is allocated to the first image data, image number 2 is allocated to the second image data, and image number 3 is allocated to the third image data. In a case of mode 4, image number 1 is allocated to the first image data, image number 2 is allocated to the second image data, image number 3 is allocated to the third image data, and image number 4 is allocated to the fourth image data.

The display type is set to be full-screen display or divided display. The full-screen display indicates a state in which one piece of image data is displayed on the screen alone. For example, in a case of mode 1, the display type is the full-screen display. The divided display indicates a state in which a plurality of pieces of image data are displayed on the screen, sharing the screen. For example, in mode 2, 3, or 4, the display type is the divided display.

The display allowed region indicates a range on the screen in which image data can be displayed in units of pixels. For example, in the example illustrated in FIG. 5, the display allowed region indicates a range spanning from coordinates (x, y)=(0, 0) to (x, y)=(1280, 800).

The drawing order indicates an order of drawing image data. The drawing order is expressed as a sequence of the image numbers allocated to the respective pieces of image data. When drawing ranges of two pieces of image data or more overlap with each other, the overlapping part is drawn over by image data having a larger drawing order.

The drawing position of each piece of image data includes starting-point coordinates, a width, and a height. The starting-point coordinates indicate the coordinates of a point at which drawing of the corresponding image data starts. The width indicates the number of pixels of the corresponding image data in a width direction (X direction). The height indicates the number of pixels of the corresponding image data in a height direction (Y direction).

FIG. 6 is a diagram illustrating variations of the arrangement information that can be set.

For example, as illustrated in FIG. 6, the display device 21 can collectively display one or a plurality of pieces of image data on the screen in various arrangements. The display device 21 can change the arrangement of the image data by, for example, changing the drawing position (the starting-point coordinates, the width, and the height) included in the arrangement information. The display device 21 may change the drawing position in response to, for example, an operation by the user or an instruction from another processing unit.

The display device 21 can change the number of pieces of image data collectively displayed on one screen by switching the mode and the display type in the arrangement information.

For example, when having received the start request from any one of the transfer devices 22, the setting unit 33 of the display device 21 sets or changes the mode and the display type. For example, when having received the start request from any one of the transfer devices 22 while displaying no image data, the setting unit 33 sets the mode to mode 1 and the display type to the full-screen display. For example, when having further received the start request from any one of the transfer devices 22 while the mode is set to mode 1, the setting unit 33 changes the mode to mode 2 and the display type to the divide screen. For example, when having further received the start request from any one of the transfer devices 22 while the mode is set to mode 2, the setting unit 33 changes the mode to mode 3. For example, when having further received the start request from any one of the transfer devices 22 while the mode is set to mode 3, the setting unit 33 changes the mode to mode 4.

When having received a request to switch the display type to the full-screen display from any one of the transfer devices 22 in any one of modes 2 to 4, the setting unit 33 changes the mode to mode 1 and the display type to the full-screen display. The setting unit 33 may change the arrangement information at various timings.

When the mode and the display type are set or changed in this manner, the setting unit 33 also changes the drawing order and the drawing position of each image data included in the arrangement information. In this manner, the setting unit 33 can change the drawing position and the image size of image data appropriately for each mode.

FIG. 7 is a diagram illustrating exemplary the management information. The management information includes a mode, a display type, and a management table.

The mode and the display type are identical to those included in the arrangement information. When having set or changed the mode and the display type included in the arrangement information, the setting unit 33 also sets or changes the mode and the display type included in the management information.

The management table includes entries (records) in the number of pieces of image data that can be collectively displayed on the screen. When having changed the mode, the setting unit 33 changes the number of entries of the management table. For example, in a case of mode 1, the setting unit 33 generates one entry in the management table. For example, in a case of mode 2, the setting unit 33 generates two entries in the management table. For example, in a case of mode 3, the setting unit 33 generates three entries in the management table. For example, in a case of mode 4, the setting unit 33 generates four entries in the management table.

Image data to be displayed is allocated to each entry. Each entry includes an item number, an image number, a job identifier, an IP address, a transmission transfer rate, and a display image size.

The item number is a number for identifying the entry. The image number corresponds to the image number included in the arrangement information, and is a number for identifying image data allocated to the entry. The job identifier is a value identifying information set to the entry, and is updated, for example, when any item included in the entry is changed.

The IP address is the network address of the transfer device 22 from which the image data allocated to the entry is transmitted. The transmission transfer rate is the transfer rate of the image data allocated to the entry. The transmission transfer rate is expressed as, for example, a bit rate, which is the amount of data per second.

The display image size is a resolution at which the image data allocated to the entry is displayed. The setting unit 33 sets or changes the display image size in the management information based on a width and a height included in the drawing position of the image data allocated to the entry, in the arrangement information. Thus, when having set or changed the width or the height included in the drawing position in the arrangement information, the setting unit 33 also sets or changes the corresponding display image size in the management information.

FIG. 8 is a diagram illustrating information items included in the start request. When requesting display of image data or requesting switching of the display type, the transfer device 22 transmits the start request to the display device 21.

The start request includes a desired image size, an IP address, and a display type. The desired image size is a desired resolution of image data to be transmitted. The transfer device 22 determines the desired image size based on, for example, original data of the image data to be transmitted. For example, when a video captured by, for example, a camera is to be displayed, the transfer device 22 may set the desired image size to be the resolution of the video. Alternatively, when image data stored in, for example, a recording medium is read and displayed, the transfer device 22 may set the desired image size to be the resolution of image data stored in, for example, a recording medium. Alternatively, the transfer device 22 may set the desired image size to be a resolution specified by the user.

The IP address is the network address of the transfer device 22 from which the start request is transmitted. The display type indicates an image data display method preferred by the transfer device 22, and is set to be the full-screen display or the divided display.

FIG. 9 is a diagram illustrating information items included in the control information. When the display image size or the transmission transfer rate included in the management table in the management information is set or changed, the control information transmitter 34 of the display device 21 transmits the control information to the corresponding transfer device 22.

In this case, for example, the control information transmitter 34 specifies an entry (target entry) including the display image size or the transmission transfer rate set or changed in the management table, and specifies the transfer device 22 to which the control information is to be transmitted based on the IP address included in the specified target entry.

The control information includes a job identifier, a transmission image size, a transmission transfer rate, a mode, and a display type. The job identifier is a value included in a target entry in the management table. The transmission image size is a resolution determined by the size determiner 35. The transmission transfer rate is a value included in the target entry. The mode is a value included in the management information. The display type is a value included in the management information.

The control information transmitter 34 can notify the transfer device 22 of the resolution and the transfer rate of image data to be transmitted by transmitting such control information to the transfer device 22.

FIG. 10 is a diagram illustrating information items included in the display request. After having transmitted the start request to the display device 21, the transfer device 22 receives the control information from the display device 21. After having received the control information, the transfer device 22 generates image data based on information included in the control information. Then, the transfer device 22 transmits the display request including the generated image data to the display device 21 and displays the generated image data through the display device 21.

The display request includes a job identifier, image data, a transmission image size, a display type, a transmission transfer rate, and a transmission time. The job identifier is a value included in the control information. The image data is the body of data to be displayed through the display device 21. The transmission image size is a value included in the control information. The display type is a value included in the control information. The transmission transfer rate is a value included in the control information. The transmission time is a time at which the display request is transmitted.

FIG. 11 is a sequence diagram illustrating an exemplary flow of operations executed when the start request is transmitted. The display device 21 and the transfer device 22 execute the operations as illustrated in FIG. 11 before transmission of image data from the transfer device 22 to the display device 21.

First, the request transmitter 41 of the transfer device 22 transmits the start request to the display device (step S111). The start request includes the desired image size, the IP address, and the display type.

Subsequently, the setting unit 33 of the display device 21 receives the start request from the transfer device 22. The setting unit 33 determines the next arrangement information and the next management information based on the display type included in the start request, the current arrangement information, and the current management information (step S112). Specifically, the setting unit 33 changes the mode and the display type so as to allow display of image data transmitted from the transfer device 22 from which the start request is transmitted. For example, when the current mode is mode 1, the setting unit 33 changes the next mode to mode 2. The setting unit 33 also generates information included in the arrangement information and the management information in accordance with the changed mode and the changed display type.

Subsequently, the setting unit 33 updates the arrangement information stored in the arrangement information storing unit 31 in accordance with the information determined at step S112 (step S113). In this manner, the setting unit 33 can add, to the arrangement information, the drawing position and the like corresponding to the image data transmitted from the transfer device 22 from which the start request is transmitted.

Subsequently, the setting unit 33 updates the management information stored in the management information storing unit 32 in accordance with the information determined at step S112 (step S114). In this manner, the setting unit 33 can generate an entry to which the image data transmitted from the transfer device 22 from which the start request is transmitted is allocated, and set information necessary for the generated entry.

Subsequently, the setting unit 33 calls the control information transmitter 34 and provides the control information transmitter 34 with the desired image size included in the start request (step S115). When called by the setting unit 33, the control information transmitter 34 reads the mode and the display type from the management information. In addition, the control information transmitter 34 reads the job identifier, display image size, the IP address, and the transmission transfer rate from the entry to which the image data transmitted from the transfer device 22 from which the start request is transmitted is allocated in the management table included in the management information (steps S116 and S117).

Subsequently, the control information transmitter 34 calls the size determiner 35 and provides the size determiner 35 with the desired image size included in the start request and the display image size read from the management information (step S118). Subsequently, the size determiner 35 determines the transmission image size based on the received desired image size and display image size (step S119). The determination operation of the transmission image size at step S119 will be further described with reference to FIG. 12. Subsequently, the size determiner 35 provides the control information transmitter 34 with the determined transmission image size (step S120).

Subsequently, the control information transmitter 34 transmits the control information to the transfer device 22 from which the start request is transmitted (step S121). The control information includes the job identifier, the transmission image size, the transmission transfer rate, the mode, and the display type.

Subsequently, the control information receiver 42 of the transfer device 22 receives the control information from the display device 21. Then, the control information receiver 42 provides the control information storing unit 43 with the received control information for storage (step S122).

FIG. 12 is a flowchart illustrating a procedure of determination operation of the transmission image size. The size determiner 35 determines the transmission image size in accordance with, for example, the process illustrated in FIG. 12.

First, the size determiner 35 calculates a ratio A of the desired image size relative to the display image size (step S131). The size determiner 35 calculates the ratio A by, for example, Expression (1) below.

$$A = \text{desired image size/display image size} \quad (1)$$

Subsequently, the size determiner 35 determines whether the ratio A is in a predetermined range (step S132). For example, the size determiner 35 determines whether the ratio A is 1.2 or smaller. In this case, the size determiner 35 determines that the ratio A is in the predetermined range if the ratio A is 1.2 or smaller (Yes at step S132), or determines that the ratio A is out of the predetermined range if the ratio A is larger than 1.2 (No at step S132). Alternatively, for example, the size determiner 35 may determine whether the ratio A is in a range having an upper limit and a lower limit, such as a range of 1.2 to 0.8 inclusive.

If the ratio A of the desired image size relative to the display image size is in the predetermined range (Yes at step S132), the size determiner 35 sets the value of the transmission image size to be the desired image size at step S133. if the ratio A of the desired image size relative to the display image size is out of the predetermined range (No at step S132), the size determiner 35 sets the value of the transmission image size to be the display image size at step S134.

In this manner, if the desired image size of the transfer device 22 is in the predetermined range of the display image size of the display device 21, in other words, if the difference between the desired image size and the display image size is smaller than a predetermined amount, the transfer device 22 transmits image data having the desired image size. Then, the display device 21 converts the resolution of the received image data into the display image size. In this manner, the transfer device 22 can transmit the image data to the display device 21 without degradation due to resolution conversion. The display device 21 can also perform the resolution conversion with a small amount of processing, thereby achieving a reduced processing load.

If the desired image size of the transfer device 22 is out of the predetermined range of the display image size of the display device 21, in other words, if the difference between the desired image size and the display image size is the predetermined amount or larger, the transfer device 22 transmits image data having the display image size. Then, the display device 21 does not convert the resolution of the received image data. In this manner, the display device 21 can achieve a reduced processing load. The transfer device 22 can efficiently transmit image data to the display device 21 by transmitting image data having the display image size.

Figure 13:
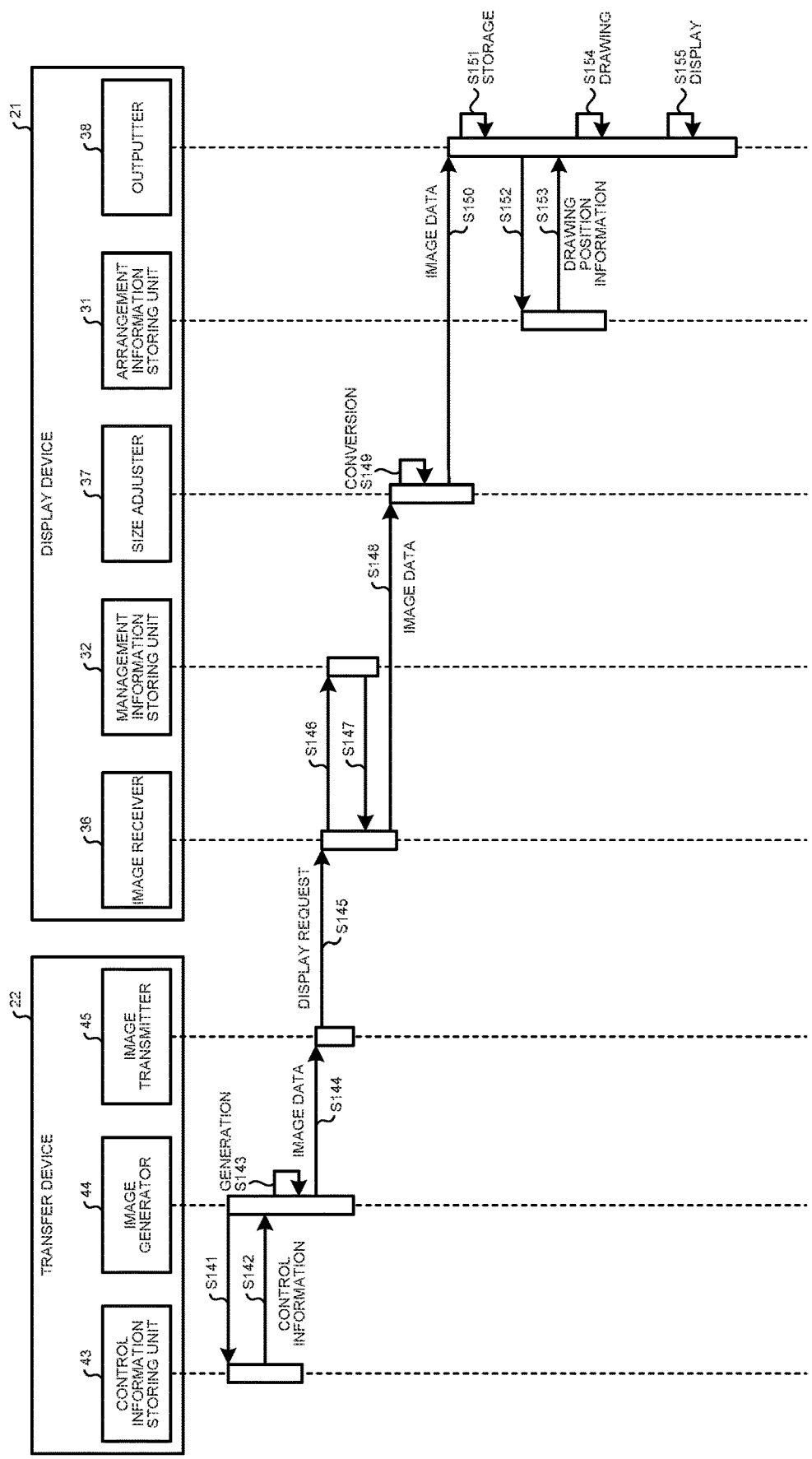
FIG. 13 is a sequence diagram illustrating an exemplary flow of operations executed when image data is displayed.

FIG. 13 is a sequence diagram illustrating an exemplary flow of operations of displaying image data. When displaying image data, the display device 21 and the transfer device 22 execute the processing as illustrated in FIG. 13.

First, the image generator 44 of the transfer device 22 reads the control information stored in the control information storing unit 43 (step S141 and step S142). Subsequently, the image generator 44 generates image data having the transmission image size included in the read control information (step S143). Then, the image generator 44 provides the image transmitter 45 with the generated image data (step S144).

Subsequently, the image transmitter 45 transmits the display request to the display device 21 (step S145). The display request includes the job identifier included in the control information, the body of the generated image data, and the transmission image size, the display type, the transmission transfer rate, and the transmission time included in the control information. The image transmitter 45 encodes the image data at a target encoding degree that allows transmission at the transmission transfer rate (bit rate) included in the control information, and adds the encoded image data to the display request.

Subsequently, the image receiver 36 of the display device 21 receives the display request from the transfer device 22. Subsequently, the image receiver 36 specifies, in the management table stored in the management information storing unit 32, an entry including a job identifier identical to the job identifier included in the display request (step S146). Subsequently, the image receiver 36 reads the item number, the image number, and the display image size included in the specified entry (step S147). Then, the image receiver 36 provides the size adjuster 37 with the image data and the transmission image size included in the display request and the item number, the image number, and the display image size read from the specified entry (step S148).

Subsequently, the size adjuster 37 converts the resolution of the received image data into the display image size (step S149). In this case, if the display image size and the transmission image size are identical to each other, the size adjuster 37 does not need to convert the resolution.

Subsequently, the size adjuster 37 provides the outputter 38 with image data having the converted resolution, in other words, image data having the display image size, and the image number read from the specified entry in the management table (step S150). Subsequently, the outputter 38 stores therein the received image data in association with the image number (step S151).

Subsequently, the outputter 38 reads the drawing position (the starting-point coordinates, the width, and the height) of the image data corresponding to the received image number from the arrangement information stored in the arrangement information storing unit 31 (steps S152 and S153). Subsequently, the outputter 38 generates synthesized image data by drawing the image data having each image number based on the read drawing position (step S154). Then, the outputter 38 displays the generated synthesized image data (step S155). In the present embodiment, the display unit 48 projects the synthesized image data onto the screen 23.

As described above, in the display system 10 according to the present embodiment, when a plurality of pieces of image data are collectively displayed on one screen, the conversion operation of the resolution of each piece of image data can be distributed to the display device 21 and the corresponding transfer device 22 for execution. In this manner, the display system 10 can distribute cost of the processing to the display device 21 and the transfer device 22 appropriately.

The display system 10 sets the transmission image size to be the desired image size, for example, when the desired image size of the transfer device 22 is in the predetermined range of the display image size. In this manner, in the display system 10, the transfer device 22 does not need to perform the resolution conversion, and thus the processing load on the transfer device 22 can be reduced. In addition, in the display system 10, image data can be transmitted to the display device 21 without degradation. In the display system 10, the amount of the resolution conversion at the display device 21 can be reduced, and the processing load on the display device 21 can be reduced.

The display system 10 sets the transmission image size to be the display image size, for example, when the desired image size of the transfer device 22 is out of the predetermined range of the display image size. In this manner, in the display system 10, the display device 21 does not need to perform the resolution conversion, and thus the processing load on the display device 21 can be reduced. In addition, in the display system 10, the resolution of image data to be transmitted from the transfer device 22 to the display device 21 is set to be the display image size, which allows efficient transmission of the image data.

Figure 14:
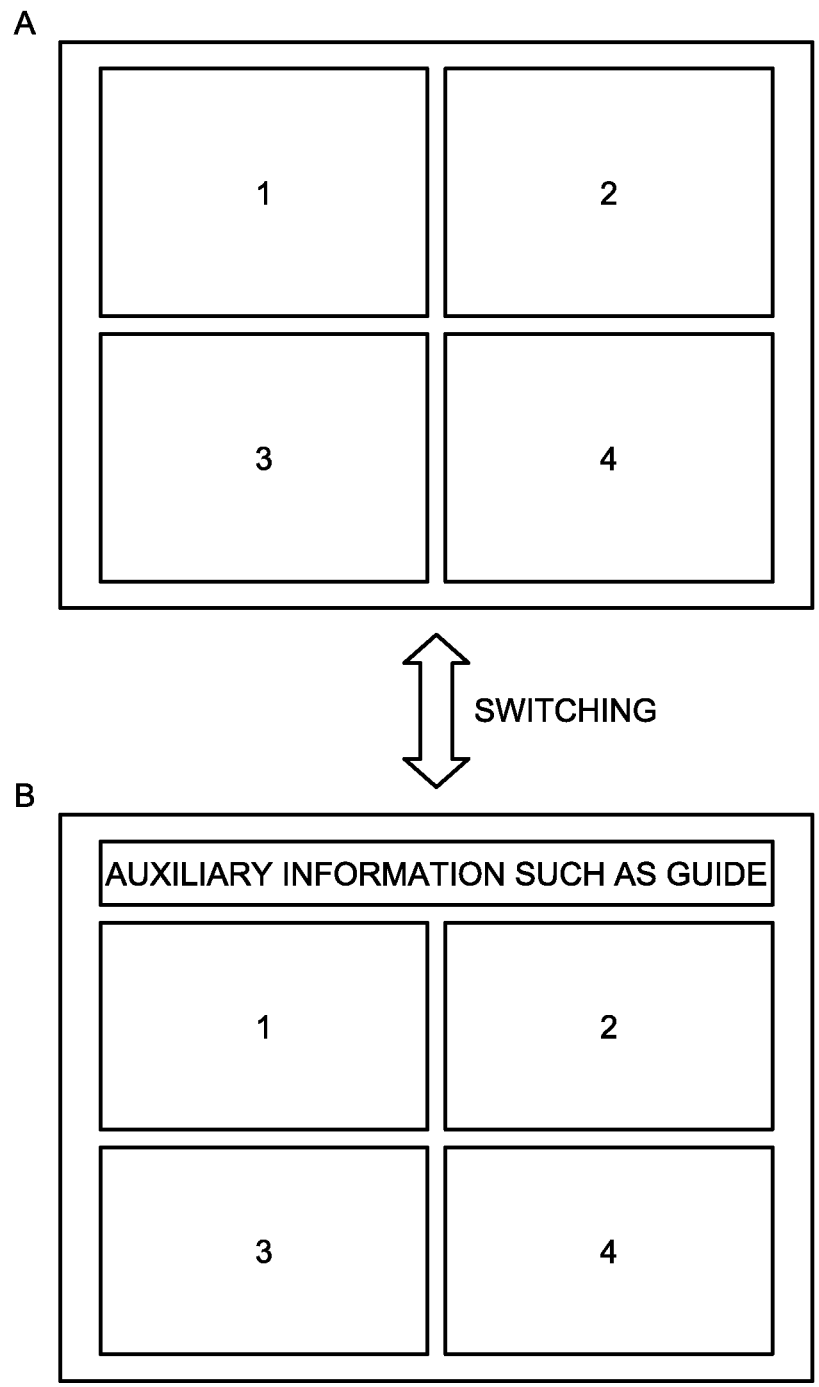
FIG. 14 is a diagram illustrating exemplary switching of information displayed on a screen.

FIG. 14 is a diagram illustrating exemplary switching of information displayed on the screen. The display device 21 displays auxiliary information such as a guide or an IP address in addition to image data received from each transfer device 22 in some cases. In such a case, the display device 21 temporarily reduces the display image size of the image data received from the transfer device 22, and additionally displays the auxiliary information on the screen.

For example, the display device 21 performs switching between a screen displaying no auxiliary information as illustrated in A of FIG. 14 and a screen displaying the auxiliary information as illustrated in B of FIG. 14 depending on an operation by the user in some cases. In such a case, the display device 21 does not need to change the resolution (transmission image size) of image data transmitted from each transfer device 22 because the size adjuster 37 can convert the resolution of each piece of image data.

In this manner, the display system 10 according to the present embodiment can perform temporary change and fine adjustment of the display image size of image data without involving procedures necessary for communication with each transfer device 22. Thus, the display system 10 according to the present embodiment can achieve reduction in the amount of communication between the transfer device 22 and the display device 21.

Figure 15:
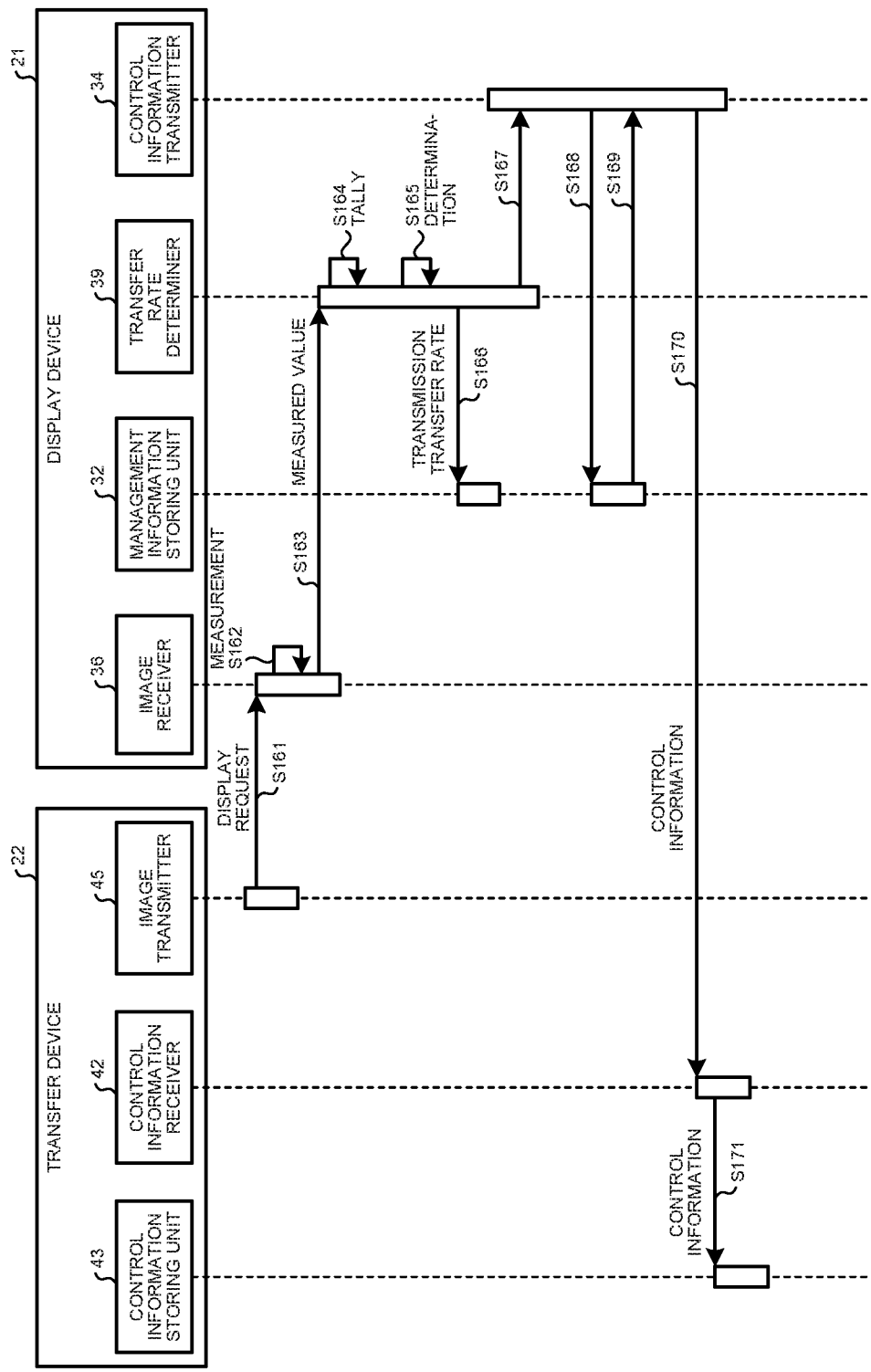
FIG. 15 is a sequence diagram illustrating an exemplary flow of operations executed when the transfer rate of image data is controlled.

FIG. 15 is a sequence diagram illustrating an exemplary flow of operations of controlling the transfer rate of image data. When controlling the transfer rate of image data, the display device 21 and each transfer device 22 execute the operations as illustrated in FIG. 15.

First, the image transmitter 45 of the transfer device 22 transmits the display request to the display device 21 (step S161). Subsequently, the image receiver 36 of the display device 21 measures the transfer rate (for example, bit rate) of the received display request (step S162). The image receiver 36 provides the transfer rate determiner 39 with the value of the measured transfer rate, and the job identifier and the transmission time included in the display request (step S163).

The transfer rate determiner 39 tallies the measured value of the transfer rate for each job identifier (step S164). For example, the transfer rate determiner 39 calculates, for each job identifier, an average value of the transfer rates of the display requests received in a predetermined time. Subsequently, the transfer rate determiner 39 determines the transmission transfer rate for each job identifier (step S165). The determination operation of the transmission transfer rate will be further described with reference to FIG. 16.

Subsequently, the transfer rate determiner 39 sets the calculated transmission transfer rate to an entry in the management table stored in the management information storing unit 32, with which the job identifier matches (step S166). Subsequently, the transfer rate determiner 39 notifies the control information transmitter 34 that the transmission transfer rate is set or changed (step S167).

Subsequently, when the transmission transfer rate stored in the management information storing unit 32 is set or changed, the control information transmitter 34 reads the transmission transfer rate and the like from the corresponding entry, and generates the control information (steps S168 and S169). Then, the control information transmitter 34 transmits the control information including the set or changed transmission transfer rate to the corresponding transfer device 22 (step S170). Subsequently, the control information receiver 42 of the transfer device 22 receives the control information from the display device 21. Then, the control information receiver 42 provides the control information storing unit 43 with the received control information for storage (step S171).

Figure 16:
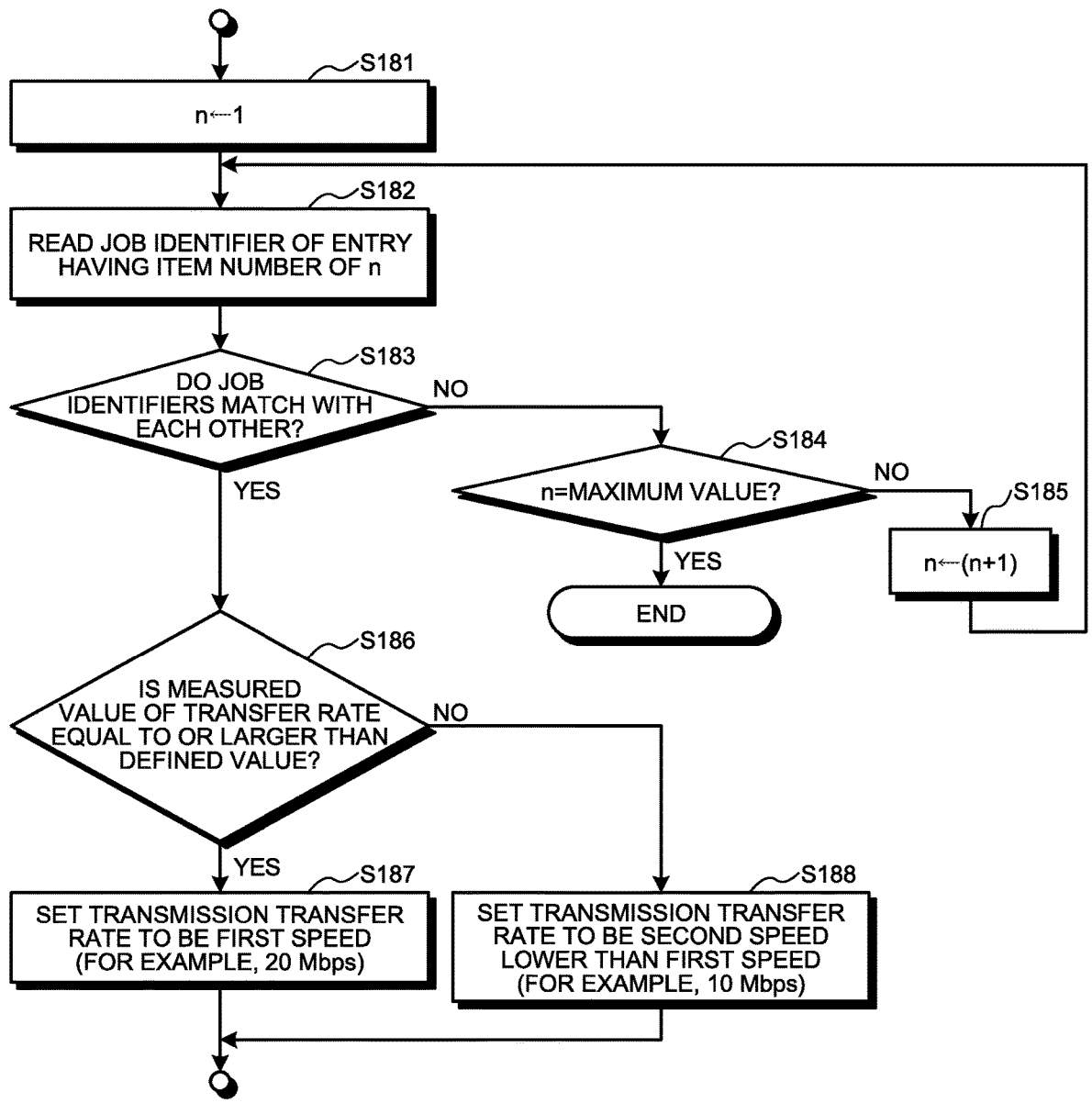
FIG. 16 is a flowchart illustrating a procedure of determination operation of the transfer rate.

FIG. 16 is a flowchart illustrating a procedure of determination operation of the transfer rate. For example, when having tallied the measured value of the transfer rate for each job identifier, the transfer rate determiner 39 determines the transmission transfer rate based on each measured value of the transfer rate in accordance with the process illustrated in FIG. 16.

First, the transfer rate determiner 39 substitutes one to variable n (step S181). Subsequently, the transfer rate determiner 39 reads the job identifier of an entry having an item number of n in the management table stored in the management information storing unit 32 (step S182).

Subsequently, the transfer rate determiner 39 determines whether the job identifier of the measured value of the transfer rate matches with the job identifier read from the management table (step S183). The transfer rate determiner 39 proceeds to the operation at step S186 if the job identifiers match with each other (Yes at step S183), or proceeds to the operation at step S184 if the job identifiers do not match with each other (No at step S183).

At step S184, the transfer rate determiner 39 determines whether n is a maximum value (which is the number of entries included in the management table). If n is the maximum value (Yes at step S184), the transfer rate determiner 39 ends the flow. For example, if a content included in an entry stored in the management table is changed, the job identifiers potentially do not match with each other. if n is not the maximum value, in other words, if n is less than the maximum value (No at step S184), the transfer rate determiner 39 adds one to n (step S185), and returns to the operation at step S182.

At step S186, the transfer rate determiner 39 determines whether the measured value of the transfer rate is equal to or larger than a defined value. The defined value may be previously set or may be changed as appropriate by, for example, the user. If the measured value of the transfer rate is equal to or larger than the defined value (Yes at step S186), the transfer rate determiner 39 sets the transmission transfer rate to be the first speed (step S187). For example, the transfer rate determiner 39 sets the transmission transfer rate to be 20 Mbps (megabit per second).

If the measured value of the transfer rate is smaller than defined value (No at step S186), the transfer rate determiner 39 sets the transmission transfer rate to be the second speed lower than the first speed (step S188). For example, the transfer rate determiner 39 sets the transmission transfer rate to 10 Mbps (megabit per second).

In this manner, when the measured value of the transfer rate is equal to or larger than the defined value, the transfer rate determiner 39 can allow the transfer device 22 to transmit a larger amount of image data at a faster transmission transfer rate. In this manner, the display system 10 according to the present embodiment can change the quality of image data in accordance with a condition of communication between the display device 21 and the transfer device 22.

First Modification of First Embodiment

The following describes a first modification of the first embodiment.

Figure 17:
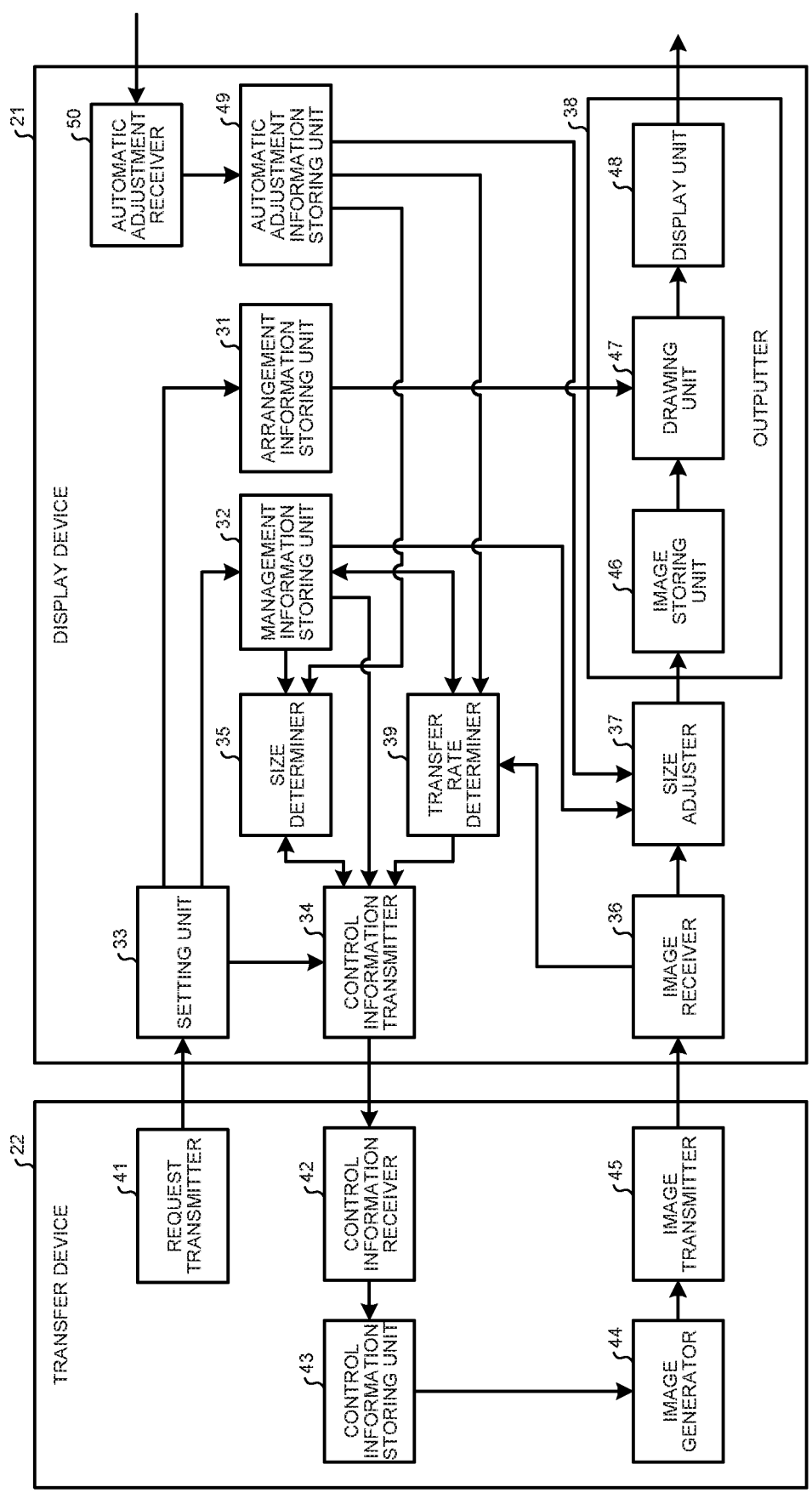
FIG. 17 is a diagram illustrating functional configurations of the display device and the transfer device according to a first modification of the first embodiment.

FIG. 17 is a diagram illustrating functional configurations of the display device 21 and the transfer device 22 according to the first modification of the first embodiment. The display device 21 according to the present modification further includes an automatic adjustment information storing unit 49 and an automatic adjustment receiver 50 in addition to the functional configuration illustrated in FIG. 4.

The automatic adjustment information storing unit 49 stores therein automatic adjustment information. The automatic adjustment information includes set values indicating whether to automatically adjust the transmission image size, whether to automatically adjust the transmission transfer rate, and whether to automatically adjust screen arrangement at display of the auxiliary information. The automatic adjustment information will be further described in detail with reference to FIG. 18.

The automatic adjustment receiver 50 receives setting of automatic adjustment from the user. More specifically, the automatic adjustment receiver 50 receives setting of whether to automatically adjust the transmission image size. The automatic adjustment receiver 50 also receives setting of whether to automatically adjust the transmission transfer rate. The automatic adjustment receiver 50 also receives setting of whether to automatically adjust screen arrangement at display of the auxiliary information. Then, the automatic adjustment receiver 50 changes the automatic adjustment information stored in the automatic adjustment information storing unit 49 in accordance with the setting received from the user.

If the automatic adjustment of the transmission image size is set, the size determiner 35 determines the transmission image size based on the display image size and the desired image size. In other words, if the automatic adjustment of the transmission image size is set, the size determiner 35 executes the operation described in the first embodiment.

If the automatic adjustment of the transmission image size is not set, the size determiner 35 determines the transmission image size to be the desired image size. In other words, if the automatic adjustment of the transmission image size is not set, the size determiner 35 executes the resolution conversion of image data only through the size adjuster 37 of the display device 21 without performing the resolution conversion of image data at the transfer device 22.

If the automatic adjustment of the transmission transfer rate is set, the transfer rate determiner 39 determines the transmission transfer rate included in the control information to be transmitted to the corresponding transfer device 22 based on the measured value of the transfer rate of the received image data. In other words, if the automatic adjustment of the transmission transfer rate is set, the transfer rate determiner 39 executes the operation described in the first embodiment. For example, in the case in which the automatic adjustment of the transmission transfer rate is set, the transfer rate determiner 39 sets the transmission transfer rate to be the first speed if the transfer rate of the received image data is equal to or larger than the defined value, or sets the transmission transfer rate to be the second speed lower than the first speed if the transfer rate of the received image data is smaller than the defined value.

If the automatic adjustment of the transmission transfer rate is not set, the transfer rate determiner 39 sets the transmission transfer rate to be a predetermined fixed speed. In other words, if the automatic adjustment of the transmission transfer rate is not set, the transfer rate determiner 39 does not execute operation of changing the transfer rate of image data from the transfer device 22. For example, if the automatic adjustment of the transmission transfer rate is not set, the transfer rate determiner 39 sets the transmission transfer rate to be the second speed.

If the automatic adjustment of screen arrangement at display of the auxiliary information is set, the size adjuster 37 temporarily reduces the display image size of image data received from each transfer device 22 while the auxiliary information is displayed. In other words, if the automatic adjustment of screen arrangement at display of the auxiliary information is set, the size adjuster 37 executes the operation described in the first embodiment. For example, the size adjuster 37 temporarily reduces the resolution of image data received from each transfer device 22 in the vertical direction.

If the automatic adjustment of screen arrangement at display of the auxiliary information is not set, the size adjuster 37 does not change the display image size of image data received from each transfer device 22 while the auxiliary information is displayed. If the automatic adjustment of screen arrangement at display of the auxiliary information is not set, the size determiner 35 temporarily reduces the transmission image size of image data transmitted from each transfer device 22 while the auxiliary information is displayed. Then, the control information transmitter 34 transmits the control information including the temporarily reduced transmission image size to the corresponding transfer device 22.

FIG. 18 is a diagram illustrating exemplary automatic adjustment information. The automatic adjustment information stores therein a set value indicates whether to automatically adjust the transmission image size, a set value indicating whether to automatically adjust the transmission transfer rate, and a set value indicating whether to automatically adjust the size at display of the auxiliary information.

FIG. 19 is a diagram illustrating a setting screen for receiving information on whether to perform the automatic adjustment. The automatic adjustment receiver 50 displays, for example, the setting screen illustrated in FIG. 19 and receives setting of the automatic adjustment from the user. More specifically, the automatic adjustment receiver 50 receives information on whether to automatically adjust the transmission image size. The automatic adjustment receiver 50 also receives information on whether to automatically adjust the transmission transfer rate. The automatic adjustment receiver 50 also receives information on whether to automatically adjust the size at display of the auxiliary information.

Figure 20:
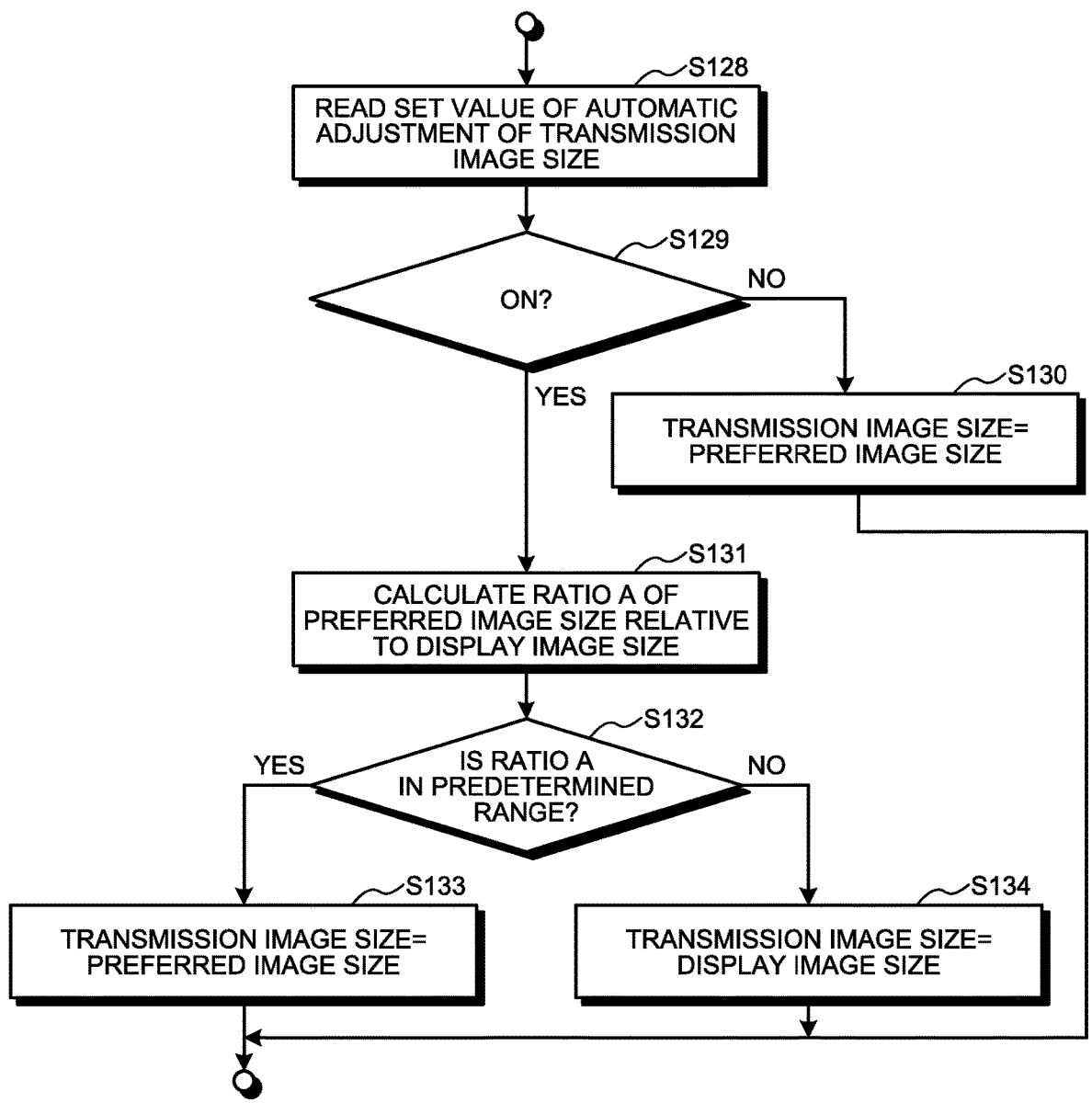
FIG. 20 is a flowchart illustrating a procedure of determination operation of the transmission image size according to the modification.

FIG. 20 is a flowchart illustrating a procedure of determination operation of the transmission image size according to the modification. The size determiner 35 determines the transmission image size in accordance with the process illustrated in FIG. 20.

First, at step S128, the size determiner 35 accesses the automatic adjustment information storing unit 49 to read the set value of the automatic adjustment of the transmission image size. Subsequently, step at S129, the size determiner 35 determines whether the read set value indicates that the automatic adjustment of the transmission image size is set.

If the automatic adjustment of the transmission image size is set (Yes at step S129), in other words, if the automatic adjustment of the transmission image size is ON, the size determiner 35 proceeds to operation at step S131. If the automatic adjustment of the transmission image size is not set (No at step S129), in other words, if the automatic adjustment of the transmission image size is OFF, the size determiner 35 proceeds to operation at step S130.

At step S130, the size determiner 35 determines the transmission image size to be the desired image size. In this manner, if the automatic adjustment of the transmission image size is not set, the display system 10 can execute the resolution conversion of image data only through the size adjuster 37 of the display device 21 without performing the resolution conversion of image data at the transfer device 22. Having completed step S130, the size determiner 35 ends the flow.

At steps S131 to S134, the size determiner 35 executes operations identical to the operations illustrated in FIG. 12. In this manner, the display system 10 can switch whether to execute the resolution conversion at the display device 21 depending on the ratio of the desired image size relative to the display image size.

Figure 21:
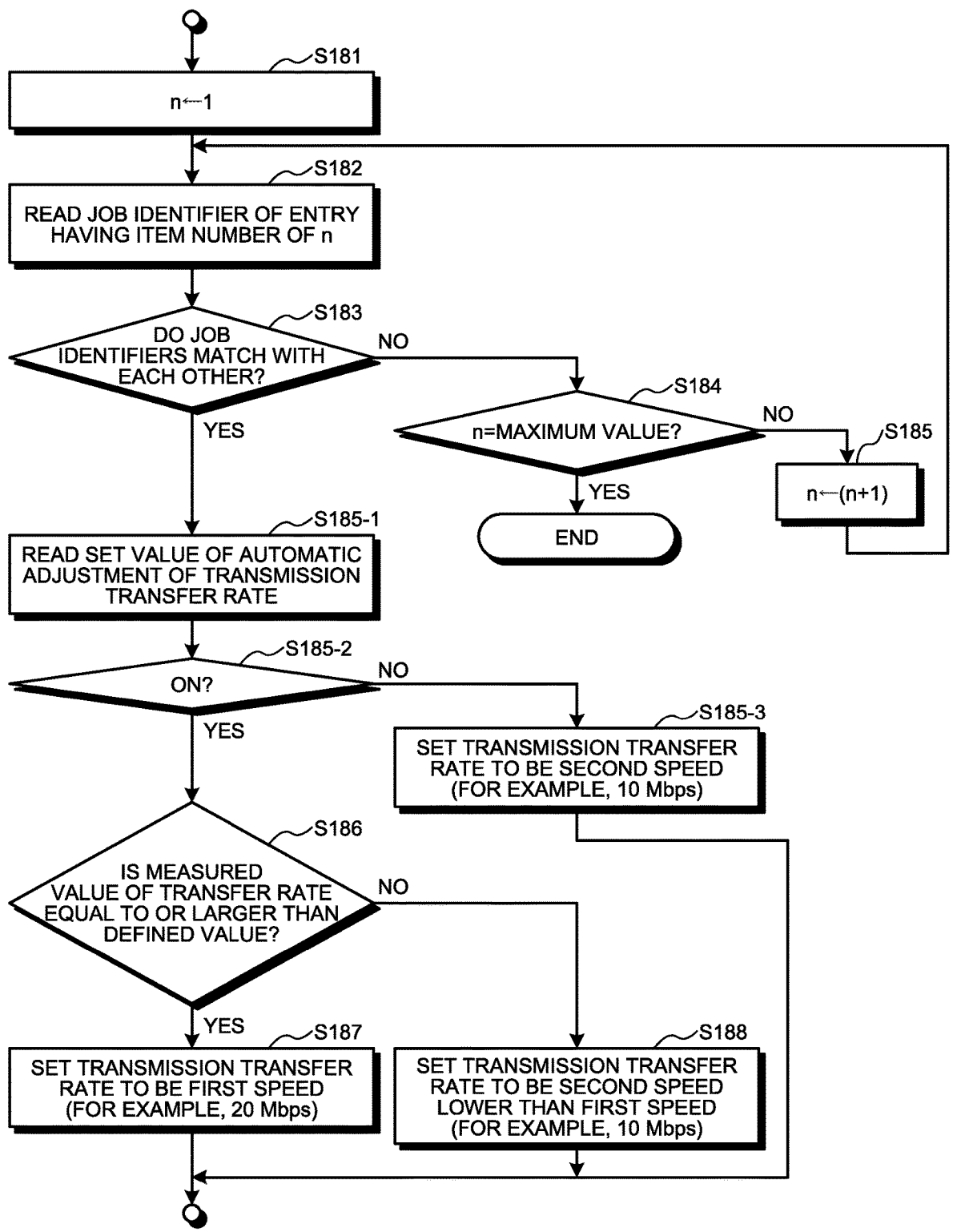
FIG. 21 is a flowchart illustrating a procedure of determination operation of the transfer rate according to the modification.

FIG. 21 is a flowchart illustrating a procedure of determination operation of the transfer rate according to the modification. For example, when having tallied the measured value of the transfer rate for each job identifier, the transfer rate determiner 39 determines the transmission transfer rate based on each measured value of the transfer rate in accordance with the process illustrated in FIG. 21.

First, at steps S181 to S185, the transfer rate determiner 39 executes operations identical to the operations illustrated in FIG. 16. Then, if the job identifier of the measured value of the transfer rate matches with the job identifier read from the management table (Yes at step S183), the transfer rate determiner 39 proceeds to operation step S185-1.

At step S185-1, the transfer rate determiner 39 accesses the automatic adjustment information storing unit 49 to read the set value of the automatic adjustment of the transmission transfer rate. Subsequently, at step S185-2, the transfer rate determiner 39 determines whether the read set value indicates that the automatic adjustment of the transmission transfer rate is set.

If the automatic adjustment of the transmission transfer rate is set (Yes at step S185-2), in other words, if the automatic adjustment of the transmission transfer rate is ON, the transfer rate determiner 39 proceeds to operation at step S186. If the automatic adjustment of the transmission transfer rate is not set (No at step S185-2), in other words, if the automatic adjustment of the transmission transfer rate is OFF, the transfer rate determiner 39 proceeds to operation at step S185-3.

At step S185-3, the transfer rate determiner 39 determines the transmission transfer rate to be the second speed (for example, 10 Mbps). In this manner, if the automatic adjustment of the transmission transfer rate is not set, the display system 10 can allow the transfer device 22 to transmit image data at a normal transmission transfer rate. Having completed step S185-3, the transfer rate determiner 39 ends the flow.

At steps S186 to S188, the transfer rate determiner 39 executes operations identical to the operations illustrated in FIG. 16. In this manner, if the measured value of the transfer rate is equal to or larger than the defined value, the display system 10 can allow the transfer device 22 to transmit a larger amount of image data at a faster transmission transfer rate.

FIG. 22 is a diagram illustrating a setting screen for receiving information on whether to perform quality enhancement. the automatic adjustment receiver 50 may display, for example, the setting screen illustrated in FIG. 22 and receive setting of the automatic adjustment from the user. More specifically, the automatic adjustment receiver 50 may receive information on whether to perform quality enhancement.

FIG. 23 is a diagram illustrating exemplary automatic adjustment information when the quality enhancement is set to be executed. If the quality enhancement is set to be executed through the setting screen as illustrated in FIG. 22, the automatic adjustment receiver 50 sets a set value of whether to automatically adjust the transmission image size to be OFF, and sets a set value of whether to automatically adjust the transmission transfer rate to be ON.

If the set value of whether to automatically adjust the transmission image size is OFF, the display system 10 achieves the quality enhancement of image data without performing the resolution conversion operation at the transfer device 22. If the set value of whether to automatically adjust the transmission transfer rate is ON, the display system 10 increases the transfer rate of image data from the transfer device 22, depending on the measured value of the transfer rate.

FIG. 24 is a diagram illustrating exemplary automatic adjustment information when the quality enhancement is set not to be performed. If the quality enhancement is set not to be performed through the setting screen as illustrated in FIG. 22, the automatic adjustment receiver 50 sets the set value of whether to automatically adjust the transmission image size to be ON, and sets the set value of whether to automatically adjust the transmission transfer rate to be OFF.

If the set value of whether to automatically adjust the transmission image size is ON, the display system 10 potentially executes the operation of converting the resolution of image data at the transfer device 22. If the set value of whether to automatically adjust the transmission transfer rate is OFF, the display system 10 fixes the transfer rate of image data from the transfer device 22 irrespective of the measured value of the transfer rate.

In this manner, the automatic adjustment receiver 50 displays, for example, the setting screen illustrated in FIG. 22 and receives setting of the automatic adjustment from the user, thereby changing a plurality of set values through one operation. Accordingly, the display system 10 can simplify an operation by the user.

FIG. 25 is a diagram illustrating a setting screen for receiving information on whether to execute automatic switching operation. The automatic adjustment receiver 50 may display, for example, the setting screen illustrated in FIG. 25 to receive setting of the automatic adjustment from the user. More specifically, the automatic adjustment receiver 50 may receive information on whether to execute the automatic switching operation.

FIG. 26 is a diagram illustrating exemplary automatic adjustment information when the automatic switching operation is set to be executed. If the automatic switching operation is set to be executed through the setting screen as illustrated in FIG. 25, the automatic adjustment receiver 50 sets the set value of whether to automatically adjust the transmission image size to be ON, and sets the set value of whether to automatically adjust the transmission transfer rate to be ON.

If the set value of whether to automatically adjust the transmission image size is ON, the display system 10 switches whether to execute the resolution conversion operation at the transfer device 22 depending on a ratio between the display image size and the desired image size. If the set value of whether to automatically adjust the transmission transfer rate is ON, the display system 10 switches the transfer rate of image data from the transfer device 22 depending on the measured value of the transfer rate.

FIG. 27 is a diagram illustrating exemplary automatic adjustment information when the automatic switching operation is set not to be executed. If the automatic switching operation is set not to be executed through the setting screen as illustrated in FIG. 25, the automatic adjustment receiver 50 sets the set value of whether to automatically adjust the transmission image size to be OFF, and sets the set value of whether to automatically adjust the transmission transfer rate to be OFF.

If the set value of whether to automatically adjust the transmission image size is OFF, the display system 10 does not execute the operation of converting the resolution of image data at the transfer device 22. If the set value of whether to automatically adjust the transmission transfer rate is OFF, the display system 10 fixes the transfer rate of image data from the transfer device 22.

In this manner, the automatic adjustment receiver 50 displays, for example, the setting screen illustrated in FIG. 25 to receive setting of the automatic adjustment from the user, thereby changing a plurality of set values through one operation. Accordingly, the display system 10 can simplify an operation by the user.

Second Modification of First Embodiment

The following describes a second modification of the first embodiment.

Figure 28:
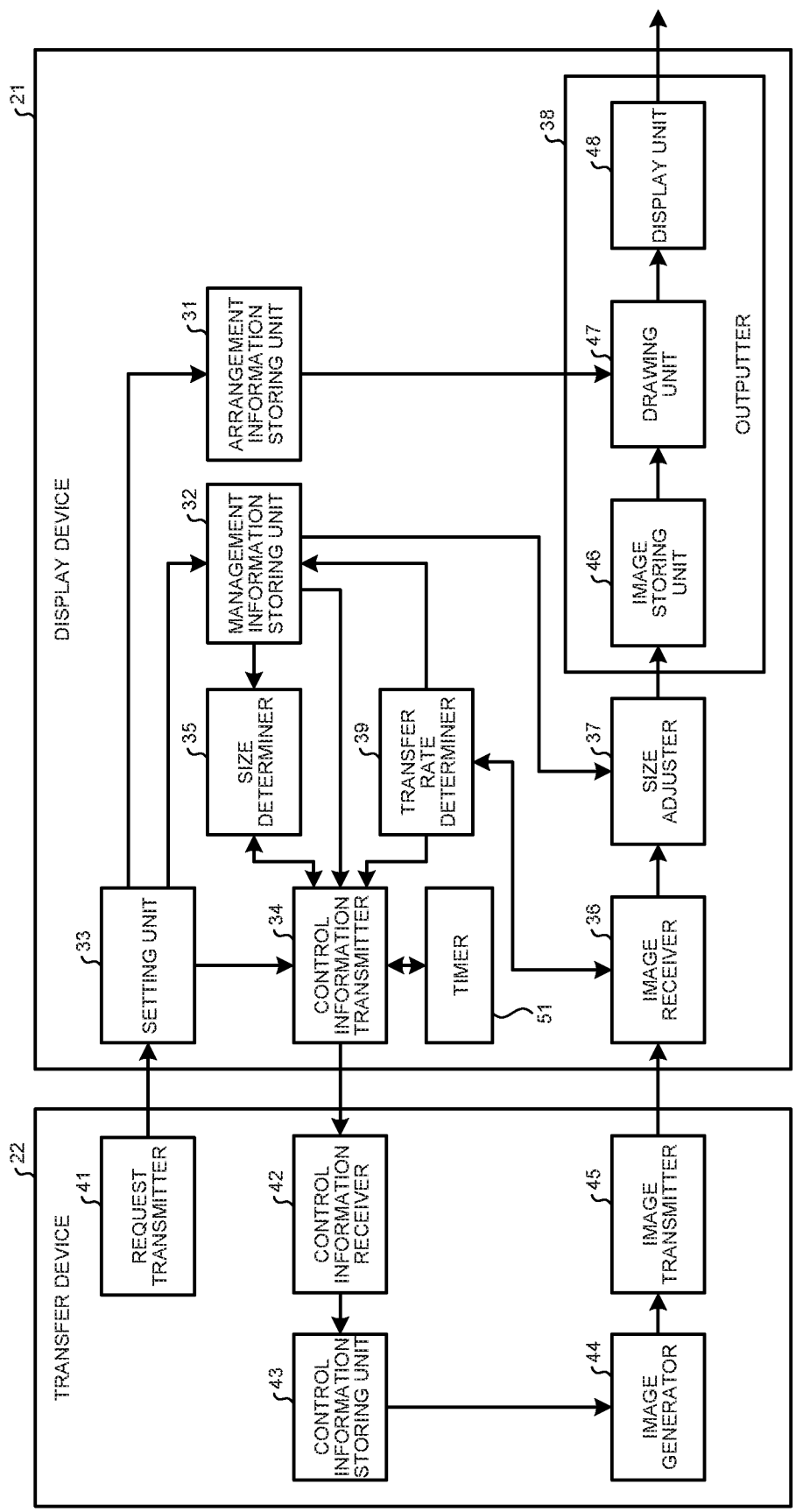
FIG. 28 is a diagram illustrating functional configurations of the display device and the transfer device according to a second modification of the first embodiment.

FIG. 28 is a diagram illustrating functional configurations of the display device 21 and the transfer device 22 according to the second modification of the first embodiment. The display device 21 according to the present modification further includes a timer 51 in addition to the functional configuration illustrated in FIG. 4.

The timer 51 is called by the control information transmitter 34. Having been called by the control information transmitter 34, the timer 51 counts a predetermined time. Then, the timer 51 fires when the predetermined time has passed since the call. The timer 51 also receives an operation stop command from the control information transmitter 34. Having received the operation stop command, the timer 51 stops counting.

Figure 29:
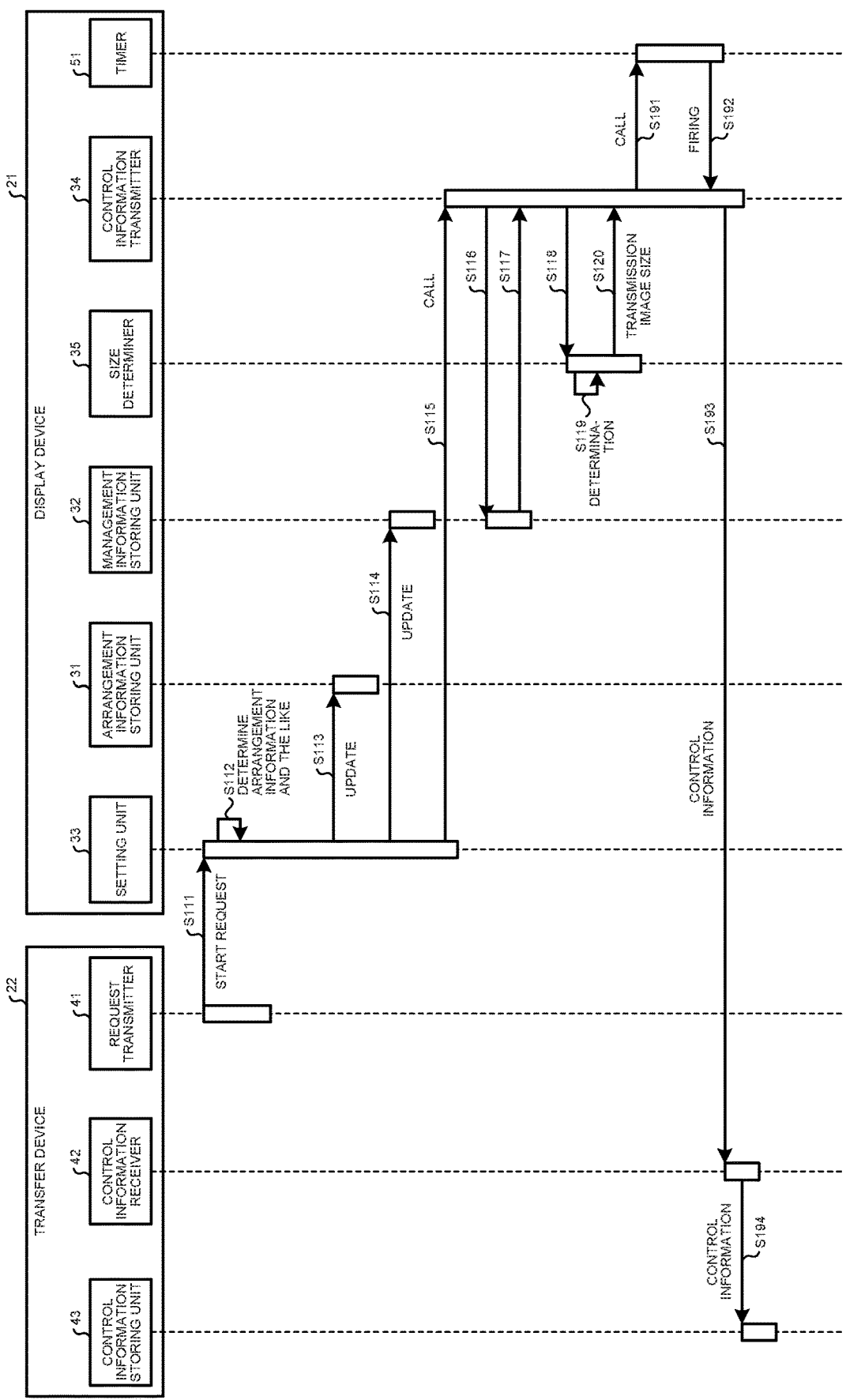
FIG. 29 is a sequence diagram illustrating an exemplary flow of operations executed when the start request is transmitted in the second modification.

FIG. 29 is a sequence diagram illustrating an exemplary flow of operations executed when the start request is transmitted in the second modification. The display device 21 and the transfer device 22 execute the operations as illustrated in FIG. 29 before transmission of image data from the transfer device 22 to the display device 21.

First, at steps S111 to S120, the display device 21 and the transfer device 22 execute operations identical to the operations illustrated in FIG. 11.

When the transmission image size is determined by the size determiner 35, the control information transmitter 34 of the display device 21 calls the timer 51 (step S191). Having been called by the control information transmitter 34, the timer 51 counts a predetermined time. The timer 51 fires when the predetermined time has passed since the call (step S192).

Subsequently, after the timer 51 has fired, the control information transmitter 34 transmits the control information to the corresponding transfer device 22 (step S193). Subsequently, the control information receiver 42 of the transfer device 22 receives the control information from the display device 21. Then, the control information receiver 42 provides the control information storing unit 43 with the received control information for storage (step S194).

If the display image size used to generate the transmission image size is changed before the timer 51 fires (between steps S191 and S192), the control information transmitter 34 stops operation of the timer 51. The display image size used to generate the transmission image size is information used by the size determiner 35 at step S119. Then, after having stopped the timer 51, the control information transmitter 34 causes the size determiner 35 to generate the transmission image size based on the changed display image size again.

If the start requests are received from the transfer devices 22 in a short time, the display device 21 transmits the control information corresponding to each start request to the corresponding transfer device 22. In this case, if the arrangement information and the like are changed in accordance with the next start request after the control information is transmitted, the display device 21 needs to transmit the control information again. However, the display device 21 according to the present modification waits for a predetermined time before transmitting the control information after having determined the transmission image size. If the transmission image size needs to be changed during the wait, the display device 21 according to the present modification stops transmission of the control information and determines the transmission image size again. In this manner, the display device 21 according to the present modification can efficiently transmit the control information while avoiding repeated transmission of the control information.

Figure 30:
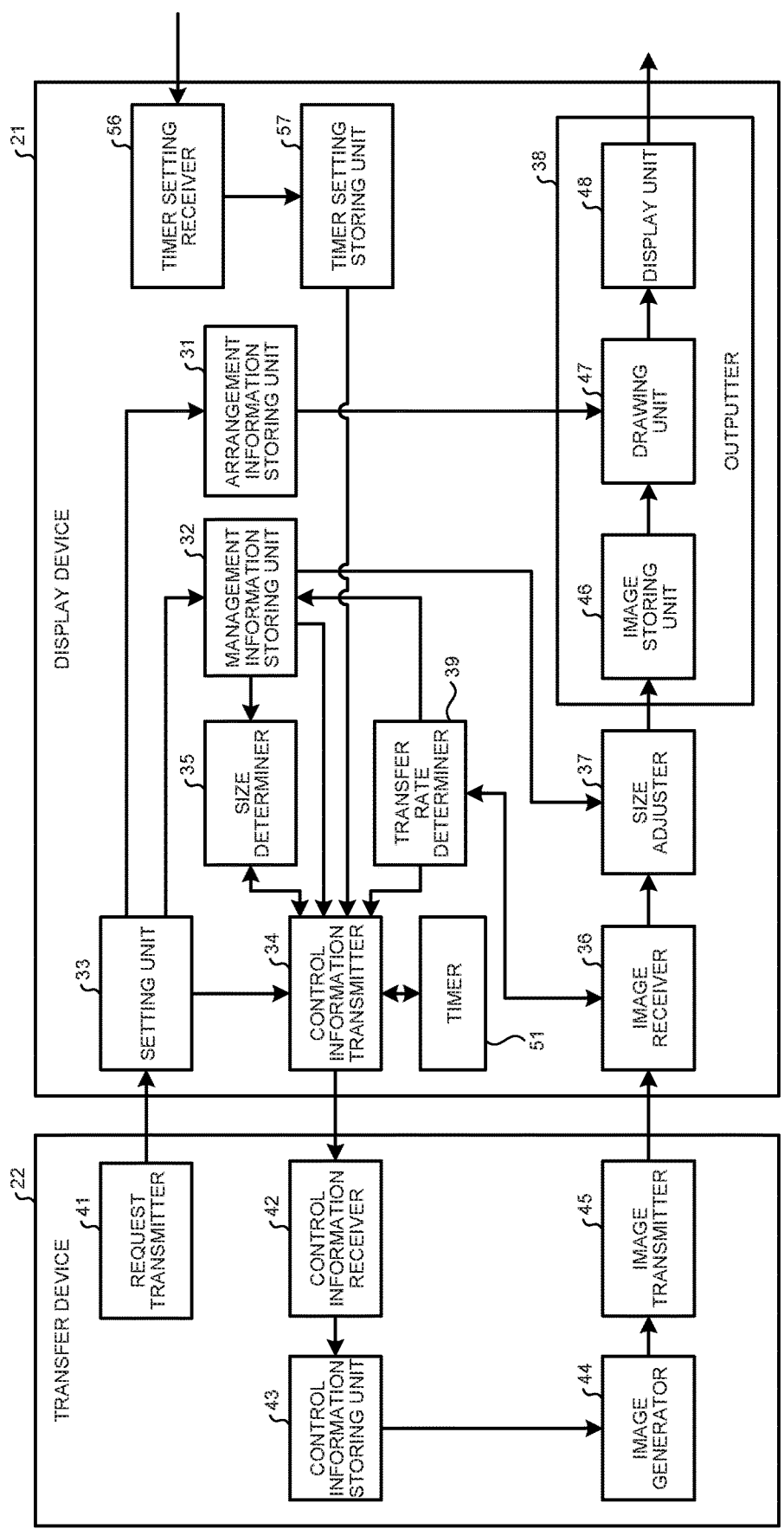
FIG. 30 is a diagram illustrating other functional configurations of the display device and the transfer device according to the second modification of the first embodiment.

FIG. 30 is a diagram illustrating other functional configurations of the display device 21 and the transfer device 22 according to the second modification of the first embodiment. The display device 21 according to the present modification may further include a timer setting receiver 56 and a timer setting storing unit 57 in addition to the functional configuration illustrated in FIG. 28.

The timer setting receiver 56 receives setting of whether to execute temporary postponement operation of transmission of the control information using the timer 51. More specifically, the timer setting receiver 56 receives information on whether to execute transmission delaying operation of the control information.

The timer setting storing unit 57 stores therein timer setting information. The timer setting information includes a set value indicating whether to execute the temporary postponement operation of transmission of the control information using the timer 51.

If the temporary postponement operation of transmission of the control information using the timer 51 is set to be executed, the control information transmitter 34 transmits the control information to the corresponding transfer device 22 after the timer 51 has fired. If the temporary postponement operation of transmission of the control information using the timer 51 is not set to be executed, the control information transmitter 34 transmits the control information to the corresponding transfer device 22 in response to determination of the transmission image size irrespective of whether the timer 51 fires.

FIG. 31 is a diagram illustrating a setting screen for receiving information on whether to execute the transmission delaying operation of the control information. The timer setting receiver 56 may display, for example, the setting screen illustrated in FIG. 31 to receive, from the user, setting of whether to execute the temporary postponement operation of transmission of the control information.

If the temporary postponement operation of transmission of the control information is set to be executed, the control information transmitter 34 calls the timer 51 after having received the transmission image size, and transmits the control information to the corresponding transfer device 22 after the timer 51 has fired. If the temporary postponement operation of transmission of the control information is set not to be executed, the control information transmitter 34 transmits the control information to the corresponding transfer device 22 without calling the timer 51 right after having received the transmission image size.

In this manner, the display device 21 according to the present modification can allow the user to select whether to execute the temporary postponement operation of transmission of the control information.

Third Modification of First Embodiment

The following describes a third modification of the first embodiment.

Figure 32:
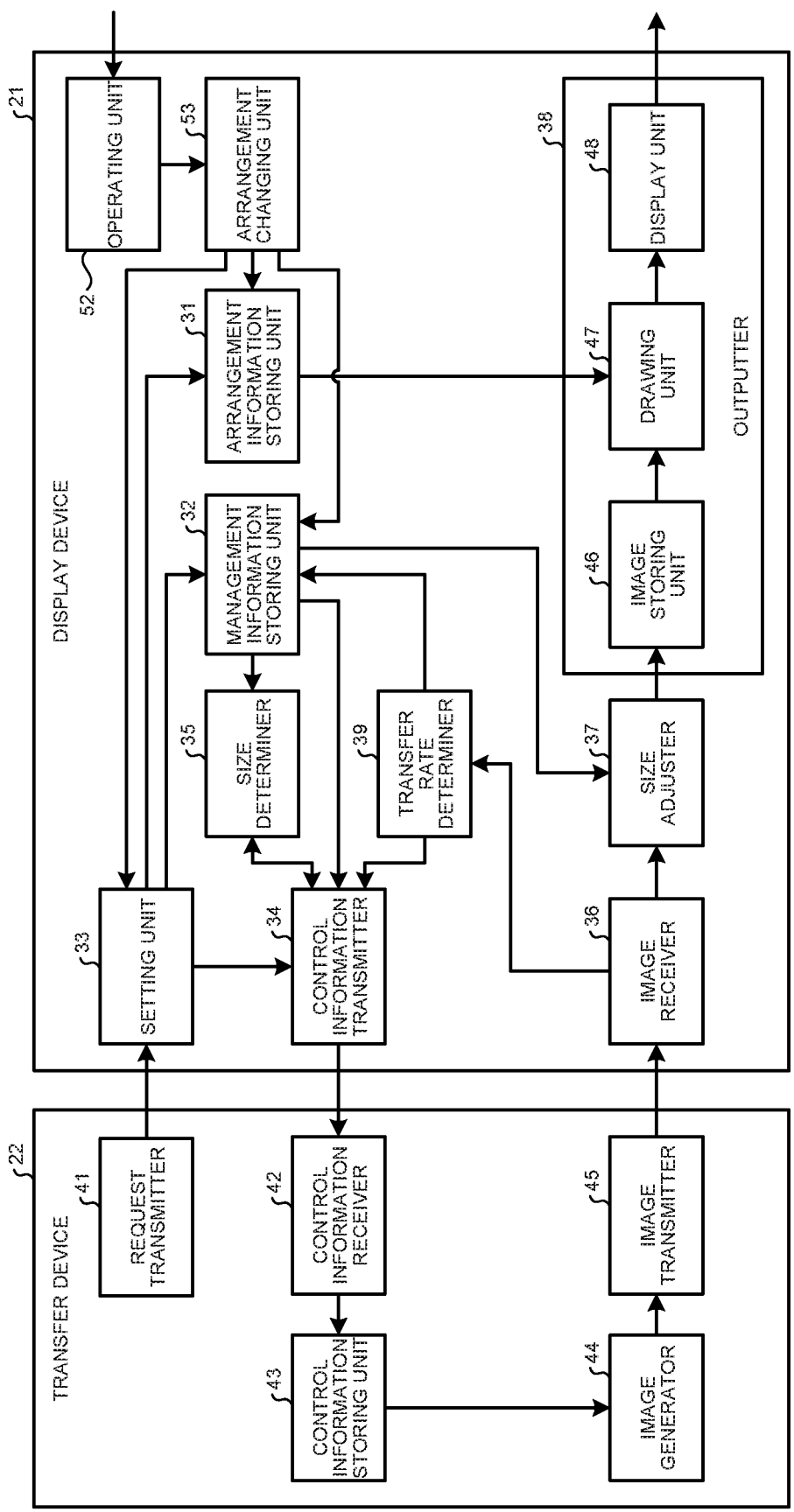
FIG. 32 is a diagram illustrating functional configurations of the display device and the transfer device according to a third modification of the first embodiment.

FIG. 32 is a diagram illustrating functional configurations of the display device 21 and the transfer device 22 according to the third modification of the first embodiment. The display device 21 according to the present modification further includes an operating unit 52 and an arrangement changing unit 53 in addition to the functional configuration illustrated in FIG. 4.

The operating unit 52 receives an operation by the user. For example, the operating unit 52 receives an operation using, for example, a remote controller, a keyboard, or a mouse. The arrangement changing unit 53 changes the arrangement information stored in the arrangement information storing unit 31 in response to an operation by the user.

FIG. 33 is a diagram illustrating exemplary the management information according to the third modification of the first embodiment. The management table included in the management information according to the present modification further includes an operation state in each entry. The operation state indicates whether the drawing position of the corresponding image data is being changed or whether display of the corresponding image data is allowed.

When the arrangement changing unit 53 has started change of the drawing position of image data in response to an operation by the user, the setting unit 33 sets the corresponding operation state to be "being changed". When the change of the drawing position has ended, the setting unit 33 sets the corresponding operation state to be "display allowed".

Figures 34, 35:
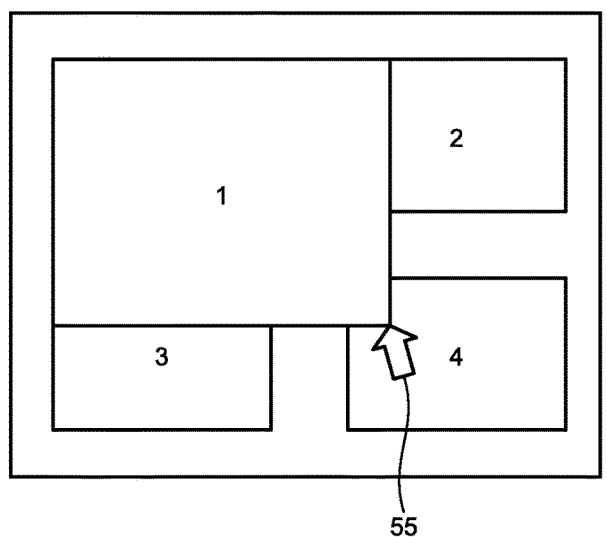
FIG. 34 is a diagram illustrating information items included in the control information according to the third modification of the first embodiment.
FIG. 35 is a diagram illustrating an exemplary screen when arrangement of image data is being changed.

FIG. 34 is a diagram illustrating information items included in the control information according to the third modification of the first embodiment. In the present modification, the control information further includes an operation state. The operation state is a value included in the management information.

The control information transmitter 34 transmits such control information to the transfer device 22. In this manner, the control information transmitter 34 can notify the transfer device 22 of whether display of image data to be transmitted is allowed because the drawing position is being changed.

If the operation state included in the control information indicates "display allowed", the image transmitter 45 of the transfer device 22 transmits the display request including image data. If the operation state included in the control information indicates "being changed", the image transmitter 45 does not transmit the display request.

FIG. 35 is a diagram illustrating an exemplary screen on which arrangement of image data is being changed. The user specifies change target image data by operating, for example, a pointer 55 displayed on the screen, and changes the drawing position of the specified image data. The display device 21 can continuously display the change target image data while the drawing position is being changed. However, the transfer device 22 transmitting the change target image data does not generate new image data when the change of the drawing position has started. Thus, the display device 21 increases or reduces the size of the change target image data or moves the change target image data, but does not change image content thereof.

Figure 36:
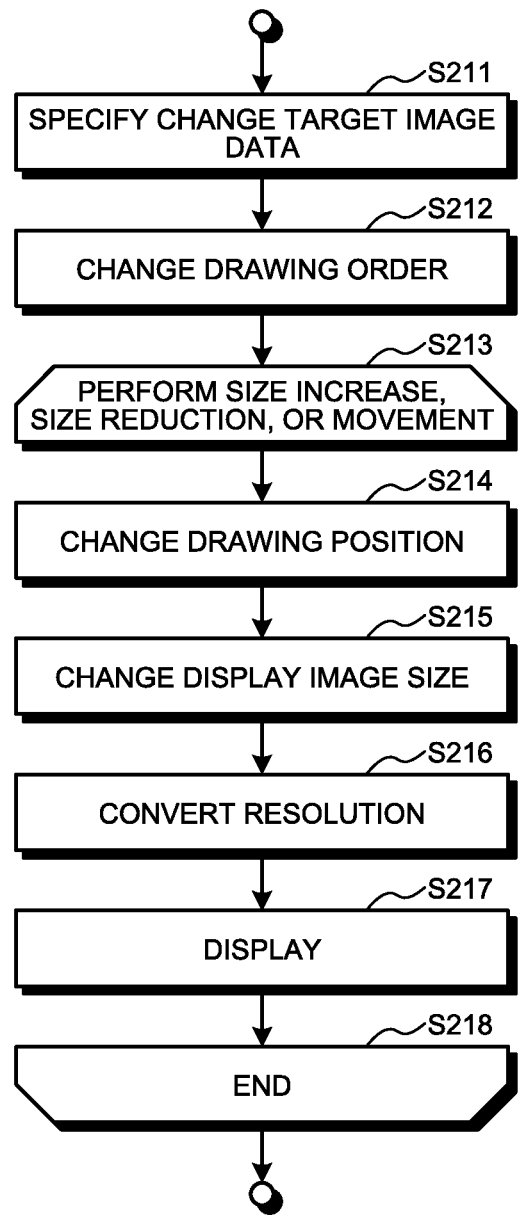
FIG. 36 is a flowchart illustrating a procedure of operations executed by the display device when the arrangement information is being changed.

FIG. 36 is a flowchart illustrating a procedure of operations at the display device 21 while the arrangement information is being changed. While the arrangement information is being changed, the arrangement changing unit 53 executes the operations in accordance with the flow illustrated in FIG. 36.

First, the arrangement changing unit 53 specifies change target image data (step S211). Specifically, the arrangement changing unit 53 specifies the image number of image data being selected by the pointer 55 by comparing the drawing position of the arrangement information and the coordinates of the pointer 55 with each other. Subsequently, the arrangement changing unit 53 changes the drawing order included in the arrangement information so that the specified image data is to be drawn last (step S212).

Subsequently, while the specified image data is being increased or reduced in size or moved through the pointer 55, the arrangement changing unit 53 repeatedly executes the operations at steps S214 to S217 (loop processing between step S213 and step S218).

At step S214, the arrangement changing unit 53 changes the drawing position of the corresponding image number included in the arrangement information in response to the size increase, size reduction, or movement of the image data using the pointer 55. Specifically, the arrangement changing unit 53 changes the starting-point coordinates, the width, and the height of the corresponding image number included in the arrangement information. Subsequently, at step S215, the arrangement changing unit 53 changes the display image size included in the corresponding entry in the management table included in the management information in response to the change of the drawing position.

Subsequently, the size adjuster 37 converts the change target image data into image data having a resolution indicated by the changed display image size (step S216). Subsequently, the outputter 38 displays the change target image data in accordance with the changed drawing position (step S217). Then, the arrangement changing unit 53 ends the flow when the operation ends.

The display device 21 according to the modification changes the drawing position of image data in accordance with the above-described process. In this manner, the display device 21 can change the drawing position while continuously displaying change target image data.

Figure 37:
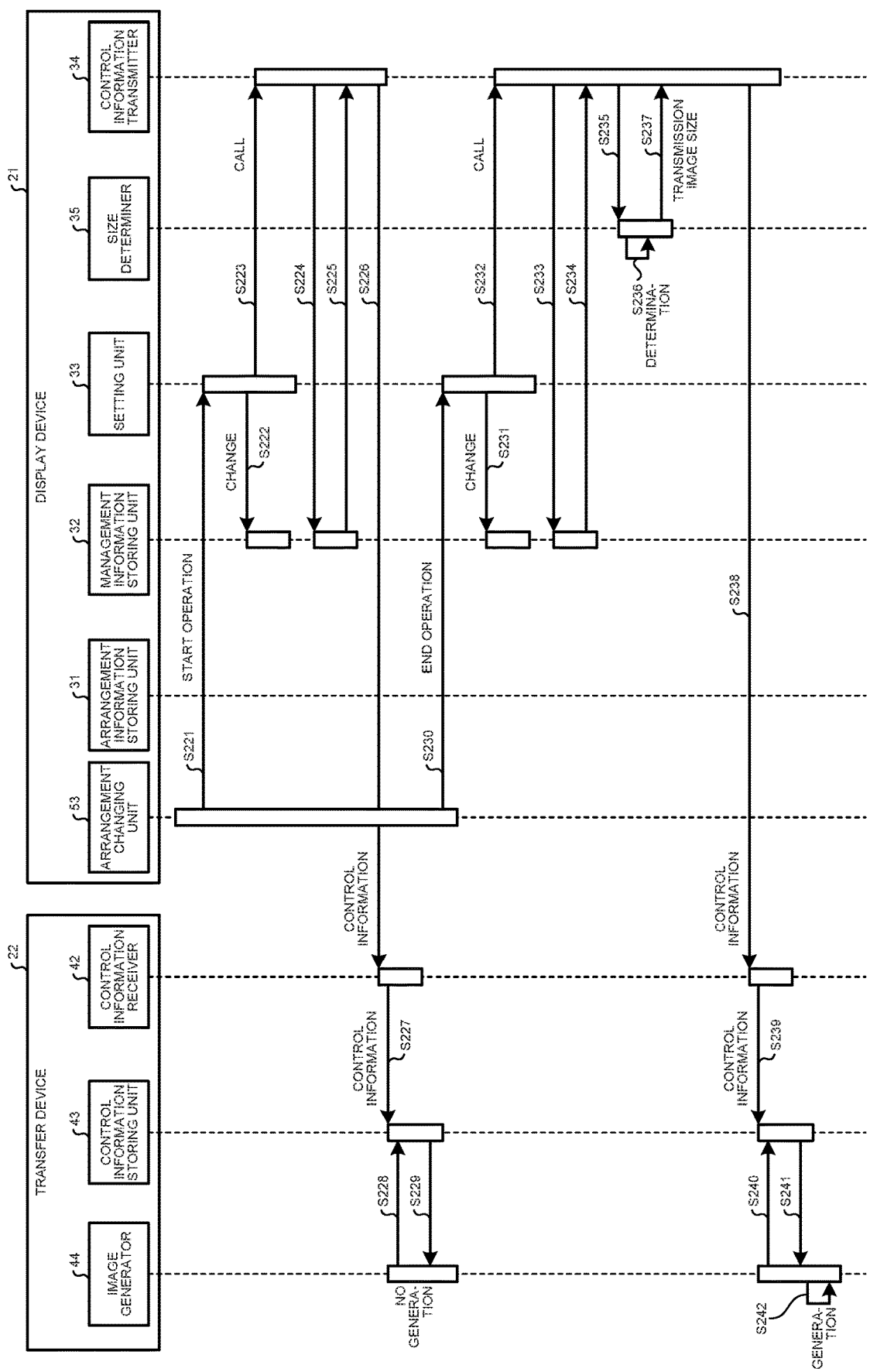
FIG. 37 is a sequence diagram illustrating an exemplary flow of operations executed when the arrangement information is being changed.

FIG. 37 is a sequence diagram illustrating an exemplary flow of operations executed while the arrangement information is being changed. The display device 21 and the transfer device 22 execute the operations as illustrated in FIG. 37 while the arrangement information is being changed.

First, having started an operation to change the drawing position of image data, the arrangement changing unit 53 notifies the setting unit 33 of this operation start (step S221). Simultaneously, the arrangement changing unit 53 also provides the setting unit 33 with the image number of change target image data.

Having received the notification of the operation start from the arrangement changing unit 53, the setting unit 33 specifies an entry including the notified image number in the management table included in the management information. Then, the setting unit 33 changes the operation state of the specified entry to "being changed" (step S222). Subsequently, the setting unit 33 calls the control information transmitter 34 by designating the item number of the specified entry (step S223).

Subsequently, having been called by the setting unit 33, the control information transmitter 34 reads, for example, the operation state indicating "being changed", from an entry having the designated item number in the management table, and generates the control information (steps S224 and S225). Then, the control information transmitter 34 transmits the control information including, for example, the operation state indicating "being changed" to the corresponding transfer device 22 (step S226).

Subsequently, the control information receiver 42 of the transfer device 22 receives the control information from the display device 21. Subsequently, the control information receiver 42 provides the control information storing unit 43 with the received control information for storage (step S227).

Then, the image generator 44 reads the control information from the control information storing unit 43 at a timing of generation of image data (steps S228 and S229). However, the image generator 44 does not generate image data because the operation state included in the control information indicates "being changed".

If the operation to change the drawing position of image data ends, the arrangement changing unit 53 notifies the setting unit 33 of this end of the operation (step S230). Simultaneously, the arrangement changing unit 53 also provides the setting unit 33 with the image number of change target image data.

Having received the operation end notification from the arrangement changing unit 53, the setting unit 33 specifies an entry including the notified image number in the management table included in the management information. Then, the setting unit 33 changes the operation state of the specified entry to "display allowed" (step S231). Subsequently, the setting unit 33 calls the control information transmitter 34 by designating the item number of the specified entry (step S232).

Subsequently, having been called by the setting unit 33, the control information transmitter 34 reads, for example, the operation state indicating "display allowed" from the entry having the designated item number in the management table (steps S233 and S234).

Subsequently, the control information transmitter 34 calls the size determiner 35 and provides the size determiner 35 with the desired image size included in the start request and the display image size read from the management information (step S235). Subsequently, the size determiner 35 determines the transmission image size based on the received desired image size and the display image size (step S236). The determination operation of the transmission image size at step S236 is same as the operation illustrated in FIG. 12. Subsequently, the size determiner 35 provides the control information transmitter 34 with the determined transmission image size (step S237).

Subsequently, the control information transmitter 34 transmits, to the corresponding transfer device 22, the control information including, for example, the transmission image size and the operation state indicating "display allowed" (step S238). Subsequently, the control information receiver 42 of the transfer device 22 receives the control information from the display device 21. Subsequently, the control information receiver 42 provides the control information storing unit 43 with the received control information for storage (step S239).

Then, the image generator 44 reads the control information from the control information storing unit 43 at a timing of generation of image data (steps S240 and S241). The operation state included in the control information indicates "display allowed". Thus, the image generator 44 generates image data having the resolution of transmission image data included in the control information (step S242).

As described above, while image data displayed on the screen is being operated, the display system 10 according to the present modification stops generation of the corresponding image data at the transfer device 22 and does not allow transmission of the corresponding image data from the transfer device 22 to the display device 21. In addition, while image data displayed on the screen is being operated, the display system 10 according to the present modification executes conversion of the resolution of the image data at the display device 21. In this manner, the display system 10 according to the present modification avoids redundant communication between the transfer device 22 and the display device 21, thereby smoothly displaying image data being operated.

Figure 38:
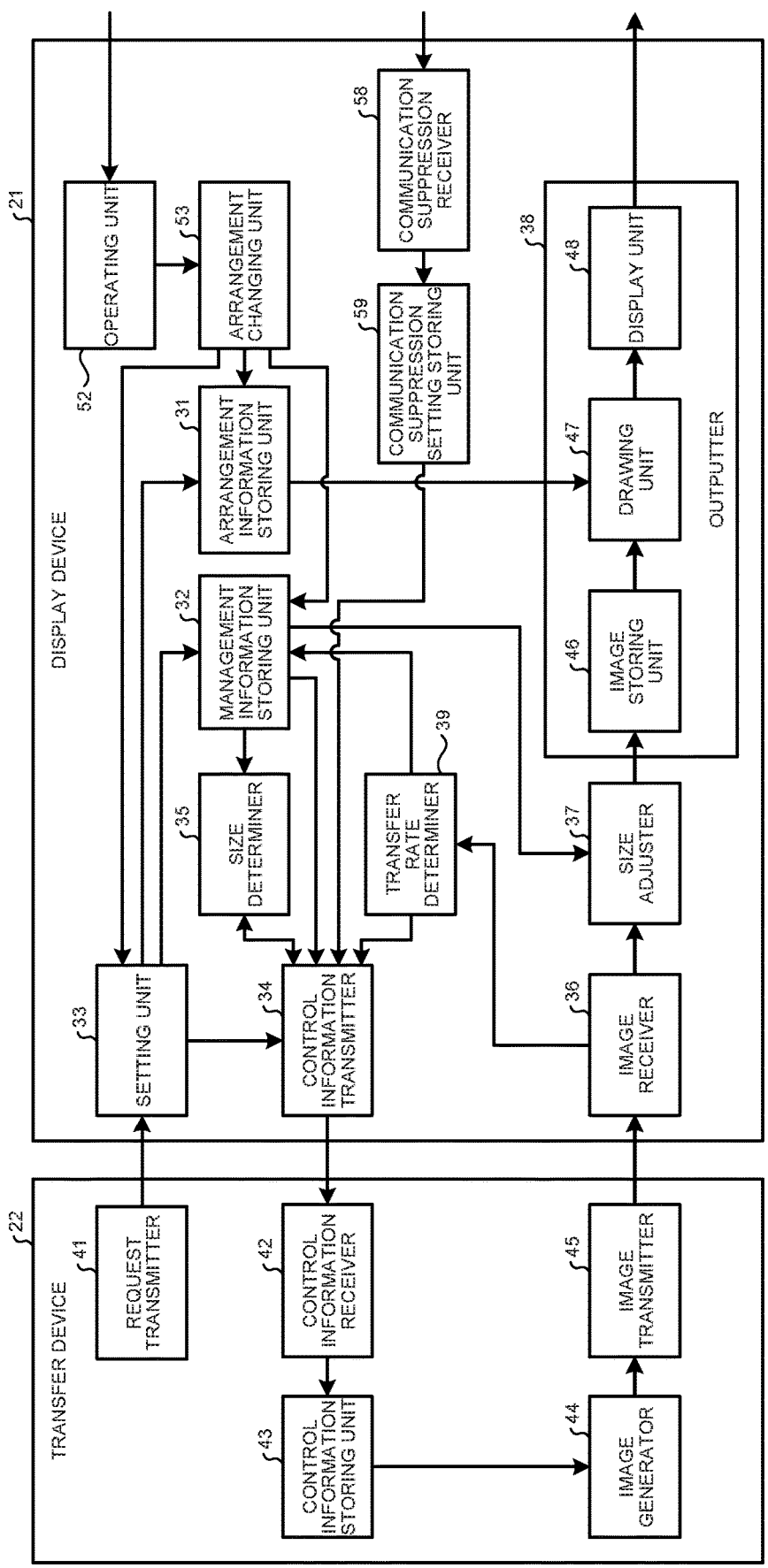
FIG. 38 is a diagram illustrating other functional configurations of the display device and the transfer device according to the third modification of the first embodiment.

FIG. 38 is a diagram illustrating other functional configurations of the display device 21 and the transfer device 22 according to the third modification of the first embodiment. The display device 21 according to the present modification may further include a communication suppression receiver 58 and a communication suppression setting storing unit 59 in addition to the functional configuration illustrated in FIG. 32.

The communication suppression receiver 58 receives setting of whether to execute communication suppressing operation of preventing transmission of the corresponding image data from the transfer device 22 to the display device 21 while the drawing position of image data is being changed. More specifically, the communication suppression receiver 58 receives information on whether to execute the communication suppressing operation while the drawing position of image data is being changed.

The communication suppression setting storing unit 59 stores therein communication suppress information. The communication suppress information includes a set value indicating whether to execute the communication suppressing operation while the drawing position of image data is being changed.

If the communication suppressing operation is set to be executed, the control information transmitter 34 transmits, to the transfer device 22, the control information including an operation state indicating whether the drawing position is being changed or display is allowed. Specifically, if the communication suppressing operation is set to be executed and the drawing position is being changed at a timing of transmission of the control information, the control information transmitter 34 transmits, to the transfer device 22, the control information including the operation state indicating that the drawing position is being changed.

If the communication suppressing operation is set not to be executed, the control information transmitter 34 transmits the control information including the operation state indicating "display allowed" to the transfer device 22 at a timing of transmission of the control information irrespective of whether the drawing position is being changed.

FIG. 39 is a diagram illustrating a setting screen for receiving information on whether to execute the communication suppressing operation. The communication suppression receiver 58 may display, for example, the setting screen illustrated in FIG. 39 to receive setting of whether to execute the communication suppressing operation from the user. In this manner, the display device 21 according to the present modification can allow the user to select whether to execute the communication suppressing operation while the drawing position is being changed.

Fourth Modification of First Embodiment

The following describes a fourth modification of the first embodiment.

Figure 40:
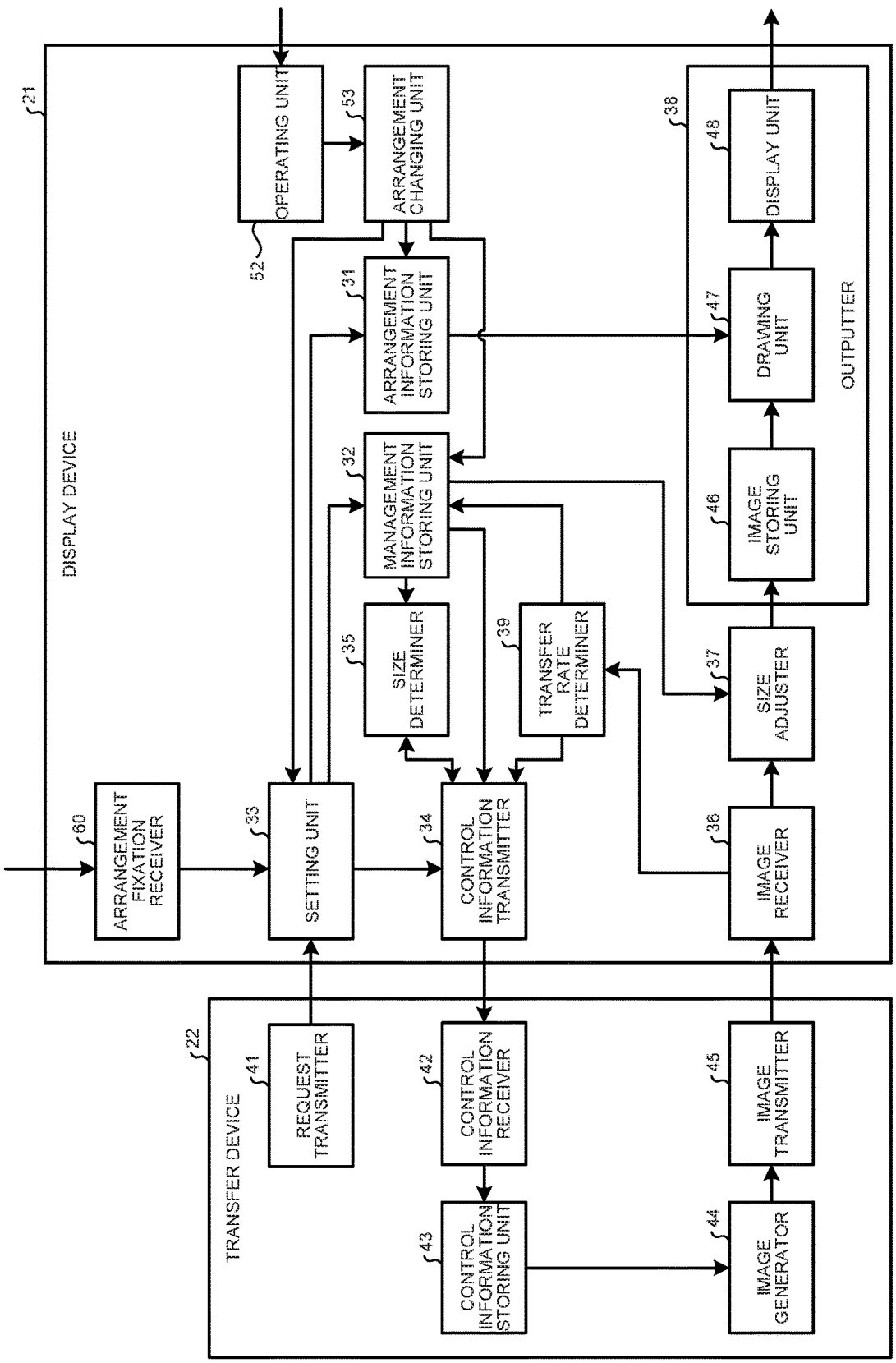
FIG. 40 is a diagram illustrating functional configurations of the display device and the transfer device according to a fourth modification of the first embodiment.

FIG. 40 is a diagram illustrating functional configurations of the display device 21 and the transfer device 22 according to the fourth modification of the first embodiment. The display device 21 according to the present modification further includes an arrangement fixation receiver 60 in addition to the functional configuration illustrated in FIG. 32.

The arrangement fixation receiver 60 receives setting of whether to execute arrangement fixing operation of fixing screen arrangement. More specifically, the arrangement fixation receiver 60 receives information on whether to execute the arrangement fixing operation.

If the arrangement fixing operation is set not to be executed, the setting unit 33 changes the display image size and the arrangement information upon reception of the start request to start transmission of image data from the transfer device 22. If the arrangement fixing operation is set to be executed, the setting unit 33 fixes the display image size and the arrangement information irrespective of whether the start request to start transmission of image data from the transfer device 22 is received.

Figures 41, 42:
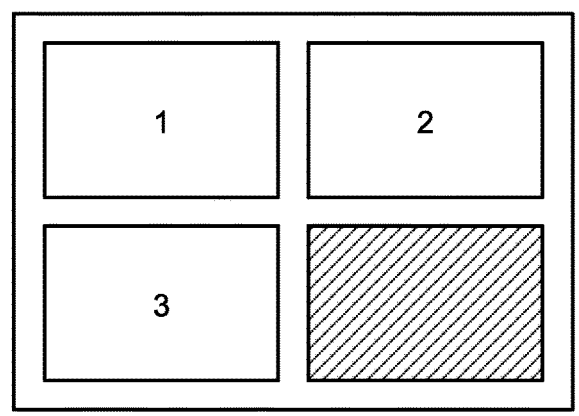
FIG. 41 is a diagram illustrating a setting screen for receiving information on whether to execute an arrangement fixing operation.
FIG. 42 is a diagram illustrating exemplary display when transmission of one piece of image data stops while four pieces of image data are being collectively displayed on one screen.

FIG. 41 is a diagram illustrating a setting screen for receiving information on whether to execute the arrangement fixing operation. The arrangement fixation receiver 60 displays, for example, the setting screen illustrated in FIG. 41 to receive setting of whether to execute the arrangement fixing operation from the user.

FIG. 42 illustrates exemplary display when transmission of one piece of image data stops while four pieces of image data are being collectively displayed on one screen.

For example, assume that the display device 21 has received four pieces of image data from the four transfer devices 22, and the setting unit 33 selects mode 4. Mode 4 is a mode in which four pieces of image data are collectively displayed on one screen.

Assume that reception of image data from any one of the transfer devices 22 has stopped when the arrangement fixing operation of fixing screen arrangement is set to be executed. In this case, the setting unit 33 does not change the mode. Thus, the outputter 38 sets a display region of the image data, the reception of which has stopped, to be a black screen that outputs no image data.

As described above, the display system 10 according to the present modification can execute the arrangement fixing operation of fixing screen arrangement. Thus, for example, when reception of image data frequently starts and stops, the display system 10 according to the present modification, the display device 21 does not need to execute unnecessary size adjustment operation and the like, thereby reducing the amount of processing by the display device 21.

Second Embodiment

The following describes the display system 10 according to a second embodiment.

When a plurality of pieces of image data transmitted from the transfer devices 22 are collectively displayed on the screen, the display system 10 stops displaying part of the image data in some cases. For example, the display system 10 switches from a state in which four pieces of image data are collectively displayed on the screen to a state in which one piece of image data is displayed on the screen alone in some cases. In such a case, in the conventional technology, communication is disconnected between the transfer device 22 transmitting image data not to be displayed on the screen and the display device 21.

However, for example, the display system 10 returns from the state in which one piece of image data is displayed on the screen alone to the state in which four pieces of image data are collectively displayed on the screen in some cases. In such a case, in the conventional technology, communication needs to be connected again between the transfer device 22 transmitting image data to be newly displayed on the screen and the display device 21. The display system 10 according to the second embodiment can reduce the number of procedures necessary for communication at display switching, without disconnecting the communication when image data is not displayed.

The display system 10 according to the second embodiment has a system configuration and a hardware configuration identical to those of the first embodiment. Thus, description of the system configuration and the hardware configuration of the display system 10 according to the second embodiment will be omitted.

Figure 43:
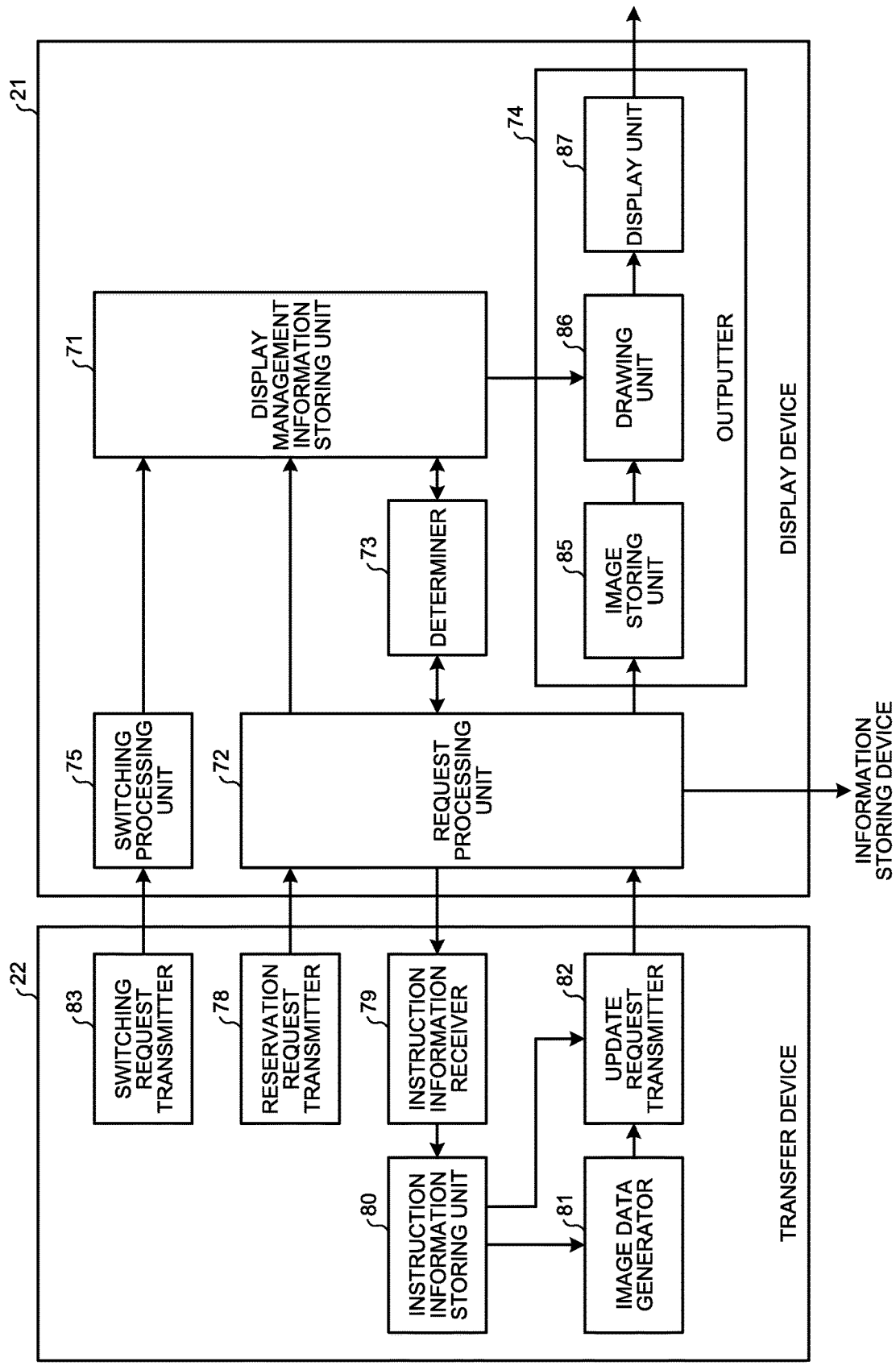
FIG. 43 is a diagram illustrating functional configurations of the display device and the transfer device according to a second embodiment.

FIG. 43 is a diagram illustrating functional configurations of the display device 21 and the transfer device 22 according to the second embodiment. The display device 21 includes a display management information storing unit 71, a request processing unit 72, a determination unit 73, an outputter 74, and a switching processing unit 75. The transfer device 22 includes a reservation request transmitter 78, an instruction information receiver 79, an instruction information storing unit 80, an image data generator 81, an update request transmitter 82, and a switching request transmitter 83.

The display management information storing unit 71 of the display device 21 stores therein display management information. The display management information includes, for each transfer device 22, identification information of the transfer device 22, a display status, an image size, and an update frequency. In the present embodiment, the display management information is a table as illustrated in Tables 1 and 2 below.

TABLE 1

| Entry Number | Identification Information | Display Status | Image Size | Update Frequency |
|---|---|---|---|---|
| 1 | Tablet 1 | Shared Display | 640 × 400 | 10 fps |
| 2 | PC 1 | Shared Display | 640 × 400 | 5 fps |
| 3 | Tablet 2 | Shared Display | 640 × 400 | 5 fps |
| 4 | PC 3 | Shared Display | 640 × 400 | 5 fps |

TABLE 2

| Entry Number | Identification Information | Display Status | Image Size | Update Frequency |
|---|---|---|---|---|
| 1 | Tablet 1 | Full-screen Display | 1280 × 800 | 15 fps |
| 2 | PC 1 | Non-Display | 0 × 0 | 5 fps |
| 3 | Tablet 2 | Non-Display | 0 × 0 | 5 fps |
| 4 | | | | |

The display management information includes entries (records) in the number of the transfer devices 22 connectable with the display device 21. The transfer device 22 connected with the display device 21 registered to each entry. Thus, when the number of the transfer devices 22 connected with the display device 21 is smaller than the maximum number of transfer devices with which the display device 21 is connectable, the display management information includes an empty entry as illustrated in Table 2.

The identification information is information for identifying the transfer device 22 registered to the entry.

The display status indicates a method of displaying, on the screen, image data received from the transfer device 22 registered to the entry. Specifically, the display status indicates any one of full-screen display, shared display, and non-display. The full-screen display indicates that the received image data is displayed on the screen alone. The shared display indicates that the received image data is displayed on the screen together with image data received from any other device. The non-display indicates that the received image data is not displayed on the screen.

If the display status of any one of the transfer devices 22 indicates the shared display, the display status of any other device indicates the shared display or the non-display as illustrated in Table 1. For example, if the display status of any one of the transfer devices 22 indicates the full-screen display, the display status of any other device indicates the non-display as illustrated in Table 2.

The image size is the resolution of the image data received from the transfer device 22 registered to the entry. The update frequency indicates a frequency at which the image data received from the transfer device 22 registered to the entry is updated. For example, the update frequency indicates the number of images updated during one second (frames per second).

When image data is displayed through the display device 21, the reservation request transmitter 78 of the transfer device 22 transmits a reservation request to the display device 21 before transmission of the image data. The reservation request includes a preferred display status.

The request processing unit 72 of the display device 21 receives the reservation request from each transfer device 22. Having received the reservation request, the request processing unit 72 registers, to the display management information, an entry corresponding to the transfer device 22 from which the reservation request is transmitted. If the display management information has no empty entry, the request processing unit 72 does not need to register, to the display management information, the transfer device 22 from which the reservation request is transmitted.

If the display status of any transfer device 22 other than the transfer device 22 from which the reservation request is transmitted is not stored in the display management information storing unit 71, the request processing unit 72 sets, to be the full-screen display, the display status corresponding to the transfer device 22 from which the reservation request is transmitted in the display management information storing unit 71. In other words, if any transfer device 22 other than the transfer device 22 from which the reservation request is transmitted is not registered to the display management information, the request processing unit 72 sets, to be the full-screen display, the display status of the entry corresponding to the transfer device 22 from which the reservation request is transmitted in the display management information.

If the display status corresponding to any transfer device 22 other than the transfer device 22 from which the reservation request is transmitted is stored in the display management information storing unit 71, the request processing unit 72 sets the display status corresponding to the transfer device 22 from which the reservation request is transmitted in the display management information storing unit 71 to be the display status included in the reservation request. In other words, if any transfer device 22 other than the transfer device 22 from which the reservation request is transmitted is registered to the display management information, the request processing unit 72 sets the display status of the entry corresponding to the transfer device 22 from which the reservation request is transmitted in the display management information to be the display status included in the reservation request.

If the display status included in the reservation request indicates the full-screen display, the request processing unit 72 sets, to be the non-display, the display status corresponding to any transfer device 22 other than the transfer device 22 from which the reservation request is transmitted at the display management information storing unit 71. In other words, if the display status included in the reservation request indicates the full-screen display, the request processing unit 72 sets, to be the non-display, the display status of the entry corresponding to any transfer device 22 other than the transfer device 22 from which the reservation request is transmitted in the display management information.

If the display status included in the reservation request indicates the shared display, the request processing unit 72 sets, to be the shared display, the display status corresponding to any transfer device 22 other than the transfer device 22 from which the reservation request is transmitted at the display management information storing unit 71. In other words, if the display status included in the reservation request indicates the shared display, the request processing unit 72 sets, to be the shared display, the display status of the entry corresponding to any transfer device 22 other than the transfer device 22 from which the reservation request is transmitted in the display management information.

The request processing unit 72 transmits, to each transfer device 22, instruction information including the corresponding display status, image size, and update frequency. For example, the request processing unit 72 transmits, to the transfer device 22 from which the reservation request is transmitted, the display status, the image size, and the update frequency set to the entry corresponding to the transfer device 22 from which the reservation request is transmitted.

The instruction information receiver 79 of the transfer device 22 receives the instruction information from the display device 21. The instruction information storing unit 80 of the transfer device 22 stores therein the instruction information received by the instruction information receiver 79.

The image data generator 81 of the transfer device 22 generates image data of the image size included in the instruction information at the update frequency included in the instruction information. The update request transmitter 82 of the transfer device 22 generates an update request including the image data generated by the image data generator 81 and the display status included in the instruction information. The update request transmitter 82 transmits the generated update request to the display device 21 at least at the update frequency included in the instruction information.

The request processing unit 72 of the display device 21 receives the update request from each transfer device 22. Having received the update request, the request processing unit 72 calls the determination unit 73.

The determination unit 73 of the display device 21 determines whether the display status included in the update request matches with the display status corresponding to the transfer device 22 from which the update request stored in the display management information storing unit 71 is transmitted. In other words, the determination unit 73 determines whether the display status included in the update request matches with the display status of the entry corresponding to the transfer device 22 from which the update request is transmitted in the display management information. The determination unit 73 returns a result of the determination to the request processing unit 72.

If the display status included in the update request matches with the display status corresponding to the transfer device 22 from which the update request stored in the display management information storing unit 71 is transmitted, the request processing unit 72 provides the outputter 74 with the image data included in the update request. If the display status included in the update request does not match with the display status corresponding to the transfer device 22 from which the update request stored in the display management information storing unit 71 is transmitted, the request processing unit 72 does not provide the outputter 74 with the image data but transmits the instruction information to the transfer device 22 from which the update request is transmitted.

Having received the image data from the request processing unit 72, the outputter 74 of the display device 21 displays the image data included in the update request on the screen in accordance with the display status corresponding to the transfer device 22 from which the update request is transmitted. For example, if the display status corresponding to the transfer device 22 from which the update request is transmitted indicates the full-screen display, the outputter 74 displays the image data included in the update request on the entire screen. If the display status corresponding to the transfer device 22 from which the update request is transmitted indicates the shared display, the outputter 74 displays the image data included in the update request together with image data received from any other device. If the display status corresponding to the transfer device 22 from which the update request is transmitted indicates the non-display, the outputter 74 does not display the image data included in the update request.

The outputter 74 includes, for example, an image storing unit 85, a drawing unit 86, and a display unit 87. The image storing unit 85 stores therein image data in association with the transfer device 22 from which the image data is transmitted. For example, having received new image data from any one of the transfer devices 22, the image storing unit 85 deletes image data stored in association with this transfer device 22 and stores therein the new image data instead. In this manner, the outputter 74 can update displayed image data at each reception of new image data.

The drawing unit 86 generates synthesized image data by drawing each piece of image data stored in the image storing unit 85 at a predetermined screen position. In this manner, the drawing unit 86 can collectively display the image data received from each transfer device 22 on one screen. The display unit 87 displays the synthesized image data generated by the drawing unit 86. In the present embodiment, the display unit 87 projects the synthesized image data onto the screen 23.

The switching request transmitter 83 of the transfer device 22 transmits a switching request to the display device 21 when switching display methods. The switching request includes a preferred display status.

The switching processing unit 75 of the display device 21 receives the switching request from any one of the transfer devices 22. Having received the switching request, the switching processing unit 75 sets, to be the display status included in the switching request, the display status corresponding to the transfer device 22 from which the switching request is transmitted in the display management information storing unit 71. The switching processing unit 75 sets, to be the display status included in the switching request, the display status of the entry corresponding to the transfer device 22 from which the switching request is transmitted in the display management information.

If the display status included in the switching request indicates the full-screen display, the switching processing unit 75, in the display management information storing unit 71 sets, to be the non-display, the display status corresponding to any transfer device 22 other than the transfer device 22 from which the switching request is transmitted. In other words, if the display status included in the switching request indicates the full-screen display, the switching processing unit 75 sets, to be the non-display, the display status of the entry corresponding to any transfer device 22 other than the transfer device 22 from which the switching request is transmitted in the display management information.

If the display status included in the switching request indicates the shared display, the switching processing unit 75 sets, to be the shared display, the display status corresponding to any transfer device 22 other than the transfer device 22 from which the switching request is transmitted. In other words, if the display status included in the switching request indicates the shared display, the switching processing unit 75 sets, to be the shared display, the display status of the entry corresponding to any transfer device 22 other than the transfer device 22 from which the switching request is transmitted in the display management information.

Figure 44:
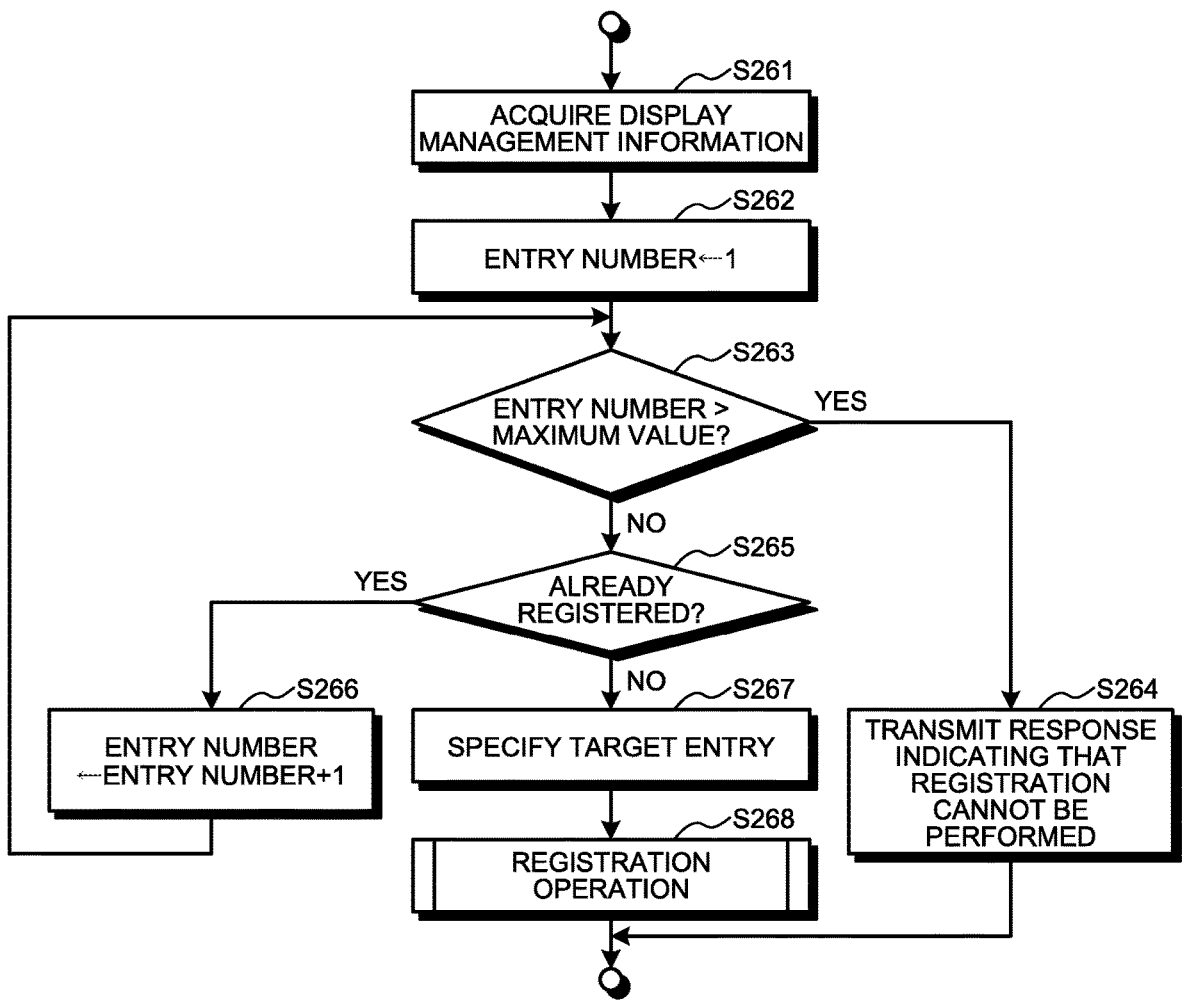
FIG. 44 is a flowchart illustrating a procedure of operations executed when a reservation request is received.

FIG. 44 is a flowchart illustrating a procedure of operations executed when the reservation request is received. Having received the reservation request, the request processing unit 72 executes the operations as illustrated in FIG. 44.

Having received the reservation request, first, the request processing unit 72 acquires the display management information from the display management information storing unit 71 (step S261). Subsequently, the request processing unit 72 substitutes one into an entry number (step S262). Subsequently, the request processing unit 72 determines whether the entry number exceeds a maximum value (step S263). The maximum value is the number of transfer devices 22 connectable with the display device 21. If the entry number exceeds the maximum value (Yes at step S263), the request processing unit 72 transmits a response indicating that registration cannot be performed to the transfer device 22 from which the reservation request is transmitted (step S264), and ends the flow.

If the entry number does not exceed the maximum value (No at step S263), the request processing unit 72 determines whether any one of the transfer devices 22 is already registered to an entry having the entry number (step S265). In other words, the request processing unit 72 determines whether the entry having the entry number is empty. If any one of the transfer devices 22 is already registered to the entry having the entry number (Yes at step S265), the request processing unit 72 adds one to the entry number (step S266), and returns to the operation at step S263.

If none of the transfer devices 22 is registered to the entry having the entry number, in other words, if the entry having the entry number is empty (No at step S265), the request processing unit 72 specifies the entry having the entry number as a target entry (step S267). Subsequently, the request processing unit 72 executes registration operation illustrated in FIG. 45 on the specified target entry (step S268).

Figure 45:
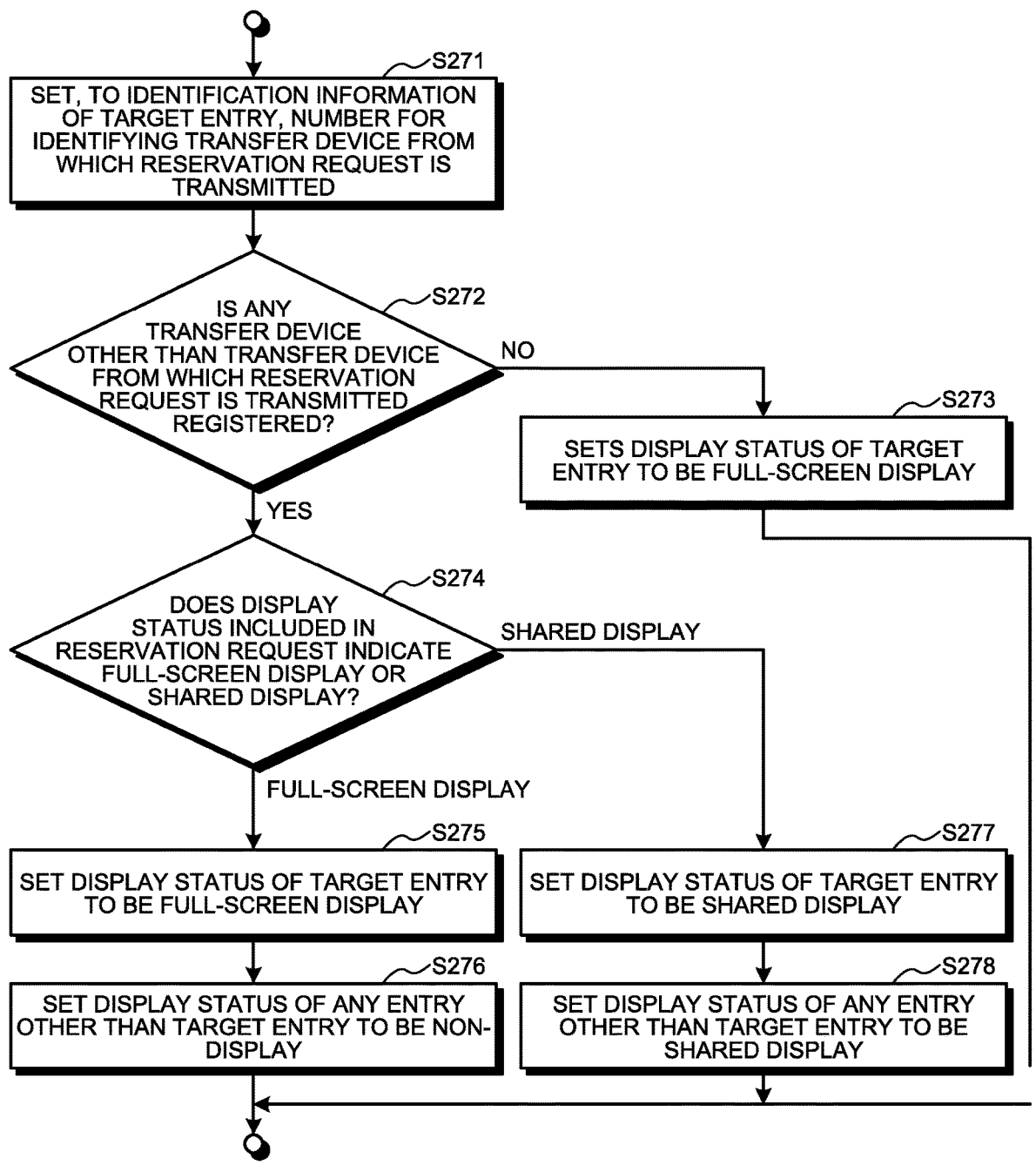
FIG. 45 is a flowchart illustrating a procedure of registration operation.

FIG. 45 is a flowchart illustrating a procedure of the registration operation. The request processing unit 72 executes the operations illustrated in FIG. 45 at step S268 in FIG. 44.

First, the request processing unit 72 sets, to the identification information of the target entry, a number for identifying the transfer device 22 from which the reservation request is transmitted (step S271). Subsequently, the request processing unit 72 determines whether any transfer device 22 other than the transfer device 22 from which the reservation request is transmitted is registered to an entry other than the target entry (step S272). If any transfer device 22 other than the transfer device 22 from which the reservation request is transmitted is not registered to an entry other than the target entry (No at step S272), the request processing unit 72 proceeds to operation at step S273.

At step S273, the request processing unit 72 sets the display status of the target entry to be the full-screen display. In addition, at step S273, the request processing unit 72 sets the image size and the update frequency of the target entry to be values in accordance with the full-screen display. Then, having completed step S273, the request processing unit 72 ends the flow.

If any transfer device 22 other than the transfer device 22 from which the reservation request is transmitted is registered to an entry other than the target entry (Yes at step S272), the request processing unit 72 proceeds to operation at step S274. At step S274, the request processing unit 72 determines whether the display status included in the reservation request indicates the full-screen display or the shared display. If the display status included in the reservation request indicates the full-screen display (the full-screen display at step S274), the request processing unit 72 proceeds to operation at step S275. If the display status included in the reservation request indicates the shared display (the shared display at step S274), the request processing unit 72 proceeds to operation at step S277.

At step S275, the request processing unit 72 sets the display status of the target entry to be the full-screen display. In addition, at step S275, the request processing unit 72 sets the image size and the update frequency of the target entry to be values in accordance with the full-screen display. Subsequently, at step S276, the request processing unit 72 sets the display status of any entry other than the target entry to be the non-display. In addition, at step S276, the request processing unit 72 sets the image size and the update frequency of the entry other than the target entry to be values in accordance with the non-display. Then, having completed step S276, the request processing unit 72 ends the flow.

At step S277, the request processing unit 72 sets the display status of the target entry to be the shared display. In addition, at step S277, the request processing unit 72 sets the image size and the update frequency of the target entry to be values in accordance with the shared display. Subsequently, at step S278, the request processing unit 72 sets the display status of any entry other than the target entry to be the shared display. In addition, at step S278, the request processing unit 72 sets the image size and the update frequency of the entry other than the target entry to be values in accordance with the shared display. Then, having completed step S278, the request processing unit 72 ends the flow.

Figure 46:
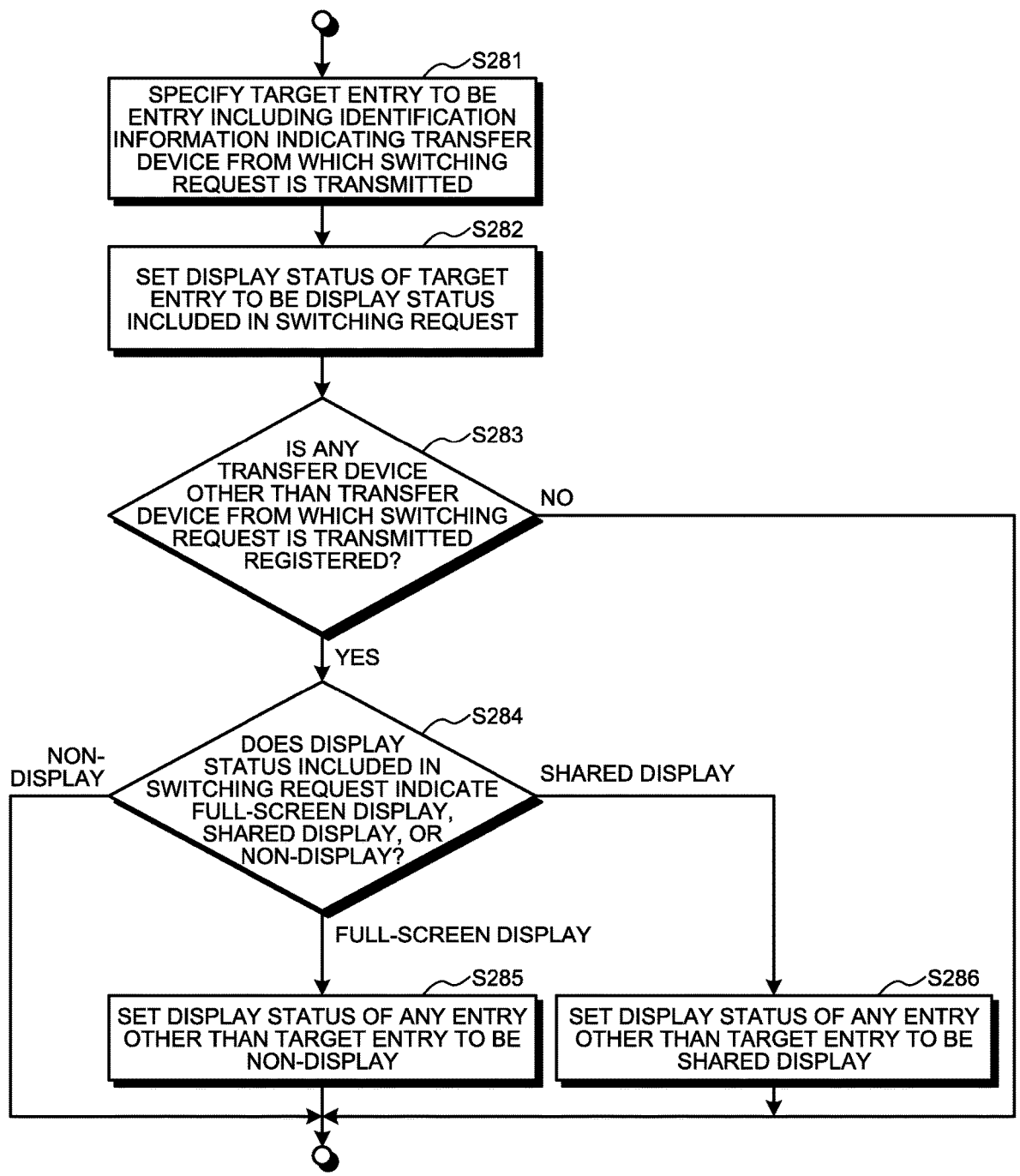
FIG. 46 is a flowchart illustrating a procedure of operations executed when a switching request is received.

FIG. 46 is a flowchart illustrating a procedure of operations executed when the switching request is received.

Having received the switching request, the switching processing unit 75 executes the operations as illustrated in FIG. 46.

First, the switching processing unit 75 specifies a target entry to be an entry including the identification information indicating the transfer device 22 from which the switching request is transmitted (step S281). Subsequently, the switching processing unit 75 sets the display status of the target entry to be the display status included in the switching request (step S282). In addition, at step S282, the switching processing unit 75 sets the image size and the update frequency of the target entry to be values in accordance with the display status included in the switching request.

Subsequently, the switching processing unit 75 determines whether any transfer device 22 other than the transfer device 22 from which the switching request is transmitted is registered to an entry other than the target entry (step S283). If any transfer device 22 other than the transfer device 22 from which the reservation request is transmitted is not registered an entry other than the target entry (No at step S283), the switching processing unit 75 ends the flow. If any transfer device 22 other than the transfer device 22 from which the reservation request is transmitted is registered to an entry other than the target entry (Yes at step S283), the switching processing unit 75 proceeds to operation at step S284.

At step S284, the switching processing unit 75 determines whether the display status included in the switching request indicates the full-screen display, the shared display, or the non-display. If the display status included in the switching request indicates the full-screen display (the full-screen display at step S284), the switching processing unit 75 proceeds to operation at step S285. If the display status included in the switching request indicates the shared display (the shared display at step S284), the switching processing unit 75 proceeds to operation at step S286. If the display status included in the switching request indicates the non-display (the non-display at step S284), the switching processing unit 75 ends the flow.

At step S285, the switching processing unit 75 sets the display status of any entry other than the target entry to be the non-display. In addition, at step S285, the switching processing unit 75 sets the image size and the update frequency of the entry other than the target entry to be values in accordance with the non-display. Then, having completed step S285, the switching processing unit 75 ends the flow.

At step S286, the switching processing unit 75 sets the display status of any entry other than the target entry to be the shared display. In addition, at step S286, the switching processing unit 75 sets the image size and the update frequency of the entry other than the target entry to be values in accordance with the shared display. Then, having completed step S286, the switching processing unit 75 ends the flow.

Figure 47:
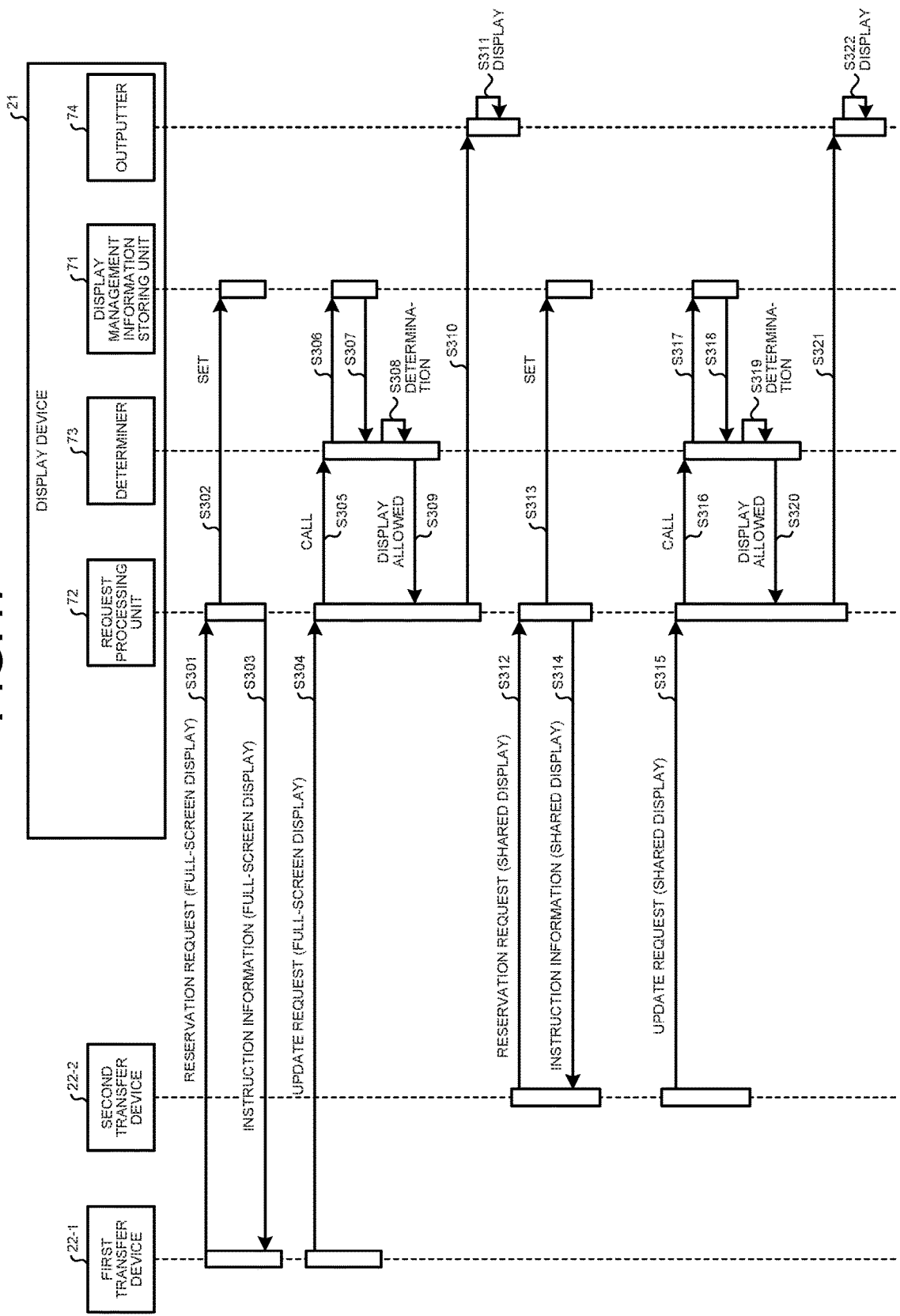
FIG. 47 is a sequence diagram illustrating an exemplary flow of operations executed by the display system at reservation.

FIG. 47 is a sequence diagram illustrating an exemplary flow of operations executed by the display system 10 at reservation. The display system 10 executes the operations as follows, when none of the transfer devices 22 is connected with the display device 21.

First, the first transfer device 22-1 transmits, to the display device 21, the reservation request including the display status indicating the full-screen display (step S301). Subsequently, having received the reservation request, the request processing unit 72 sets related information to an empty entry of the display management information, as illustrated in Table 3 below (step S302).

TABLE 3

| Entry Number | Identification Information | Display Status | Image Size | Update Frequency |
|---|---|---|---|---|
| 1 | First Transfer Device | Full-Screen Display | 1280 × 800 | 15 fps |
| 2 | | | | |
| 3 | | | | |
| 4 | | | | |

Specifically, the request processing unit 72 sets, at an empty entry, a number for identifying the first transfer device 22-1 to the identification information, the display status to be the full-screen display, the image size to be a resolution (for example, 1280×800) in accordance with the full-screen display, and the update frequency to be a rate in accordance with the full-screen display (for example, 15 fps).

Subsequently, the request processing unit 72 transmits, to the first transfer device 22-1, the instruction information including the set information such as the display status indicating the full-screen display (step S303).

Subsequently, the first transfer device 22-1 transmits the update request including image data and the display status indicating the full-screen display to the display device 21 (step S304). Subsequently, having received the update request, the request processing unit 72 calls the determination unit 73 (step S305). Having received the call, the determination unit 73 accesses the display management information storing unit 71 (steps S306 and S307), and determines whether the display status included in the update request matches with the display status of the corresponding entry in the display management information (step S308). In this example, the display statuses both indicate the full-screen display and match with each other, and thus the determination unit 73 returns a determination result indicating that display is allowed to the request processing unit 72 (step S309).

Having received the determination result indicating that display is allowed from the determination unit 73, the request processing unit 72 provides the outputter 74 with image data (step S310). Then, the outputter 74 displays the received image data on the entire screen alone (step S311).

The second transfer device 22-2 transmits the reservation request including the display status indicating the shared display to the display device 21 (step S312). Subsequently, having received the reservation request, the request processing unit 72 sets related information to an empty entry of the display management information as illustrated in Table 4 below (step S313).

TABLE 4

| Entry Number | Identification Information | Display Status | Image Size | Update Frequency |
|---|---|---|---|---|
| 1 | First Transfer Device | Shared Display | 640 × 400 | 5 fps |
| 2 | Second Transfer Device | Shared Display | 640 × 400 | 5 fps |
| 3 | | | | |
| 4 | | | | |

Specifically, the request processing unit 72 sets, at an empty entry, a number for identifying the second transfer device 22-2 to the identification information, the display status to be the shared display, the image size to be a resolution (for example, 640×400) in accordance with the shared display, and the update frequency to be a rate (for example, 5 fps) in accordance with the shared display.

In addition, at step S313, the request processing unit 72 changes the display status, the image size, and the update frequency at an entry to which the first transfer device 22-1 is registered. Specifically, the request processing unit 72 sets, at the entry to which the first transfer device 22-1 is registered, the display status to be the shared display, the image size to be a resolution (for example, 640×400) in accordance with the shared display, and the update frequency to be a rate (for example, 5 fps) in accordance with the shared display.

Subsequently, the request processing unit 72 transmits, to the second transfer device 22-2, the instruction information including the set information such as the display status indicating the shared display (step S314).

Subsequently, the second transfer device 22-2 transmits the update request including image data and the display status indicating the shared display to the display device 21 (step S315). Subsequently, having received the update request, the request processing unit 72 calls the determination unit 73 (step S316). Having received the call, the determination unit 73 accesses the display management information storing unit 71 (steps S317 and S318), and determines whether the display status included in the update request matches with the display status of the corresponding entry in the display management information (step S319). In this example, the display statuses both indicate the shared display and match with each other, and thus the determination unit 73 returns the determination result indicating that display is allowed to the request processing unit 72 (step S320).

Having received the determination result indicating that display is allowed from the determination unit 73, the request processing unit 72 provides the outputter 74 with image data (step S321). Then, the outputter 74 displays the received image data together with the image data received from the first transfer device 22-1 (step S322).

Figure 48:
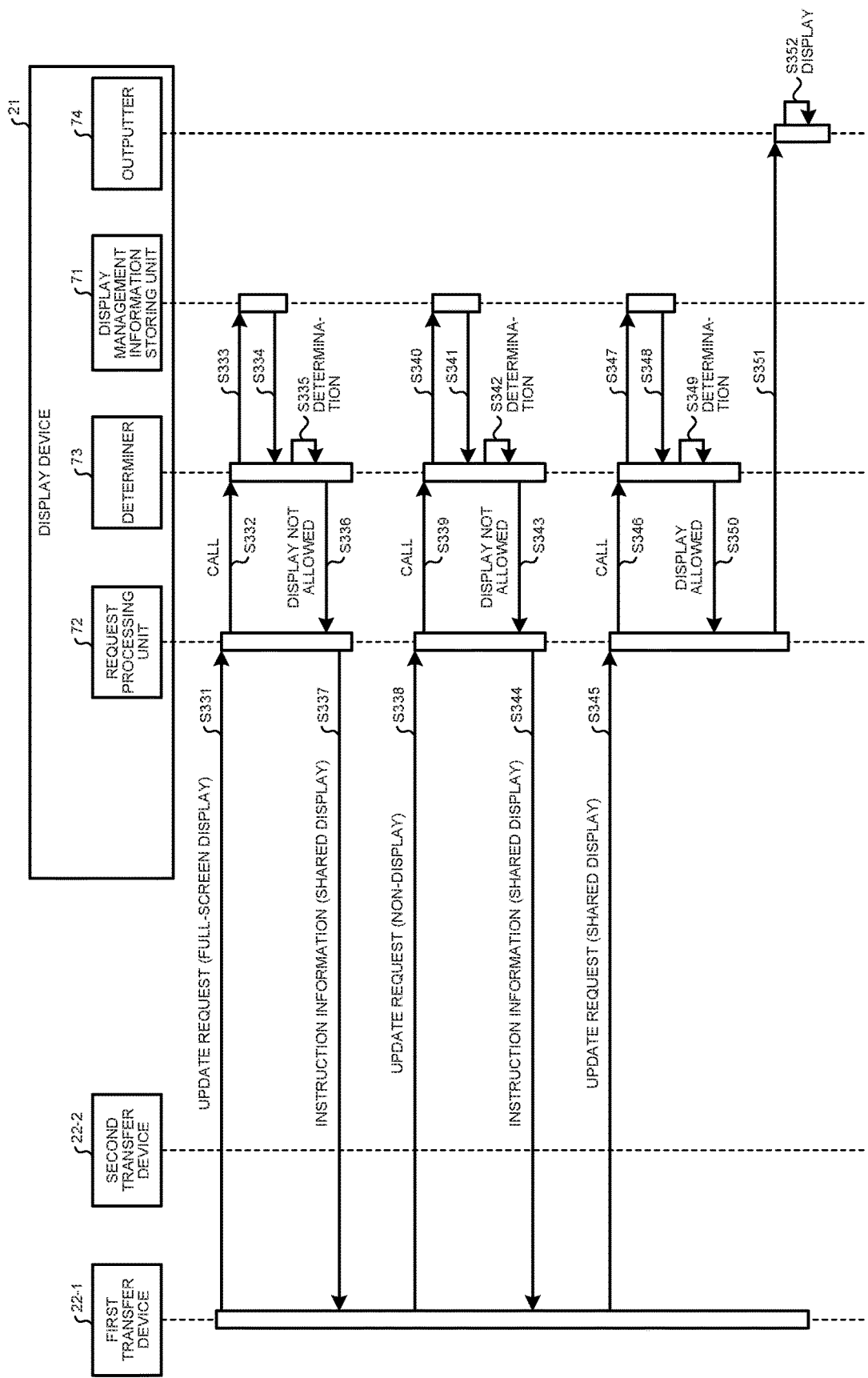
FIG. 48 is a sequence diagram illustrating an exemplary flow of operations executed by the display system at update.

FIG. 48 is a sequence diagram illustrating an exemplary flow of operations executed by the display system 10 at update. The display system 10 executes the operations as follows, when the operation at step S322 in FIG. 47 has ended.

The first transfer device 22-1 transmits the update request including image data and the display status indicating the full-screen display to the display device 21 (step S331). Subsequently, having received the update request, the request processing unit 72 calls the determination unit 73 (step S332). Having received the call, the determination unit 73 accesses the display management information storing unit 71 (steps S333 and S334), and determines whether the display status included in the update request matches with the display status of the corresponding entry in the display management information (step S335). In this example, the display status included in the update request indicates the full-screen display, but the display status corresponding to the first transfer device 22-1 in the display management information indicates the shared display, and thus the display statuses do not match with each other. Thus, the determination unit 73 returns to a determination result indicating that display is not allowed to the request processing unit 72 (step S336).

Having received the determination result indicating that display is not allowed from the determination unit 73, the request processing unit 72 does not provide the outputter 74 with the image data, but transmits the instruction information to the first transfer device 22-1 (step S337). The instruction information includes, for example, the display status (the shared display) included in the entry corresponding to the first transfer device 22-1 in the display management information.

Subsequently, for example, the first transfer device 22-1 transmits the update request including image data and the display status indicating the non-display to the display device 21 (step S338). Subsequently, having received the update request, the request processing unit 72 calls the determination unit 73 (step S339). Having received the call, the determination unit 73 accesses the display management information storing unit 71 (steps S340 and S341), and determines whether the display status included in the update request matches with the display status of the corresponding entry in the display management information (step S342). In this example, the display status included in the update request indicates the non-display, but the display status corresponding to the first transfer device 22-1 in the display management information indicates the shared display, and thus the display statuses do not match with each other. Thus, the determination unit 73 returns the determination result indicating that display is not allowed to the request processing unit 72 (step S343).

Having received the determination result indicating that display is not allowed from the determination unit 73, the request processing unit 72 does not provide the outputter 74 with the image data, but transmits the instruction information to the first transfer device 22-1 (step S344). The instruction information includes, for example, the display status (the shared display) included in the entry corresponding to the first transfer device 22-1 in the display management information.

Subsequently, for example, the first transfer device 22-1 transmits the update request including image data and the display status indicating the shared display to the display device 21 (step S345). Subsequently, having received the update request, the request processing unit 72 calls the determination unit 73 (step S346). Having received the call, the determination unit 73 accesses the display management information storing unit 71 (steps S347 and S348), and determines whether the display status included in the update request matches with the display status of the corresponding entry in the display management information (step S349). In this example, the display statuses both indicate the shared display and match with each other, and thus the determination unit 73 returns the determination result indicating that display is allowed to the request processing unit 72 (step S350).

Having received the determination result indicating that display is allowed from the determination unit 73, the request processing unit 72 provides the outputter 74 with image data (step S351). Then, the outputter 74 displays the received image data together with the image data received from the second transfer device 22-2 (step S352).

Figure 49:
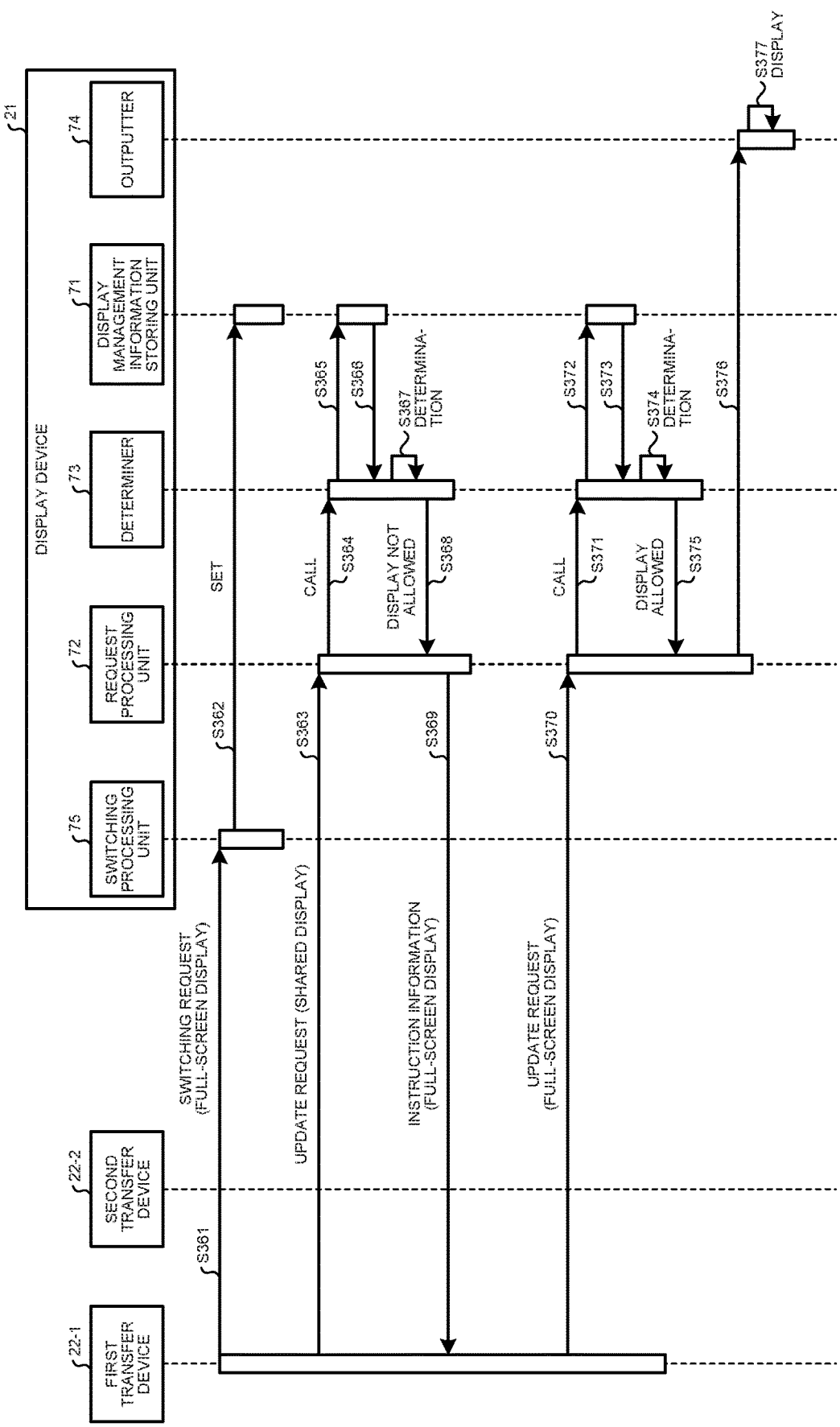
FIG. 49 is a sequence diagram illustrating an exemplary flow of operations executed by the display system at switching.

FIG. 49 is a sequence diagram illustrating an exemplary flow of operations executed by the display system 10 at switching. The display system 10 executes the operations as follows, to switch display methods when the operation at step S352 in FIG. 48 has ended.

First, the first transfer device 22-1 transmits the switching request including the display status indicating the full-screen display to the display device 21 (step S361). Subsequently, having received the switching request, the switching processing unit 75 sets related information to entries to which the first transfer device 22-1 and the second transfer device 22-2 are registered in the display management information as illustrated in Table 5 below (step S362).

TABLE 5

| Entry Number | Identification Information | Display Status | Image Size | Update Frequency |
|---|---|---|---|---|
| 1 | First Transfer Device | Full-Screen Display | 1280 × 800 | 15 fps |
| 2 | Second Transfer Device | Non-Display | 0 × 0 | 5 fps |
| 3 | | | | |
| 4 | | | | |

Specifically, the switching processing unit 75 sets, at the entry to which the first transfer device 22-1 is registered, the display status to be the full-screen display, the image size to be a resolution (for example, 1280×800) in accordance with the full-screen display, and the update frequency to be a rate in accordance with the full-screen display (for example, 15 fps). In addition, the switching processing unit 75 sets, at the entry to which the second transfer device 22-2 is registered, the display status to be the non-display, the image size to be a resolution (for example, 0×0) in accordance with the non-display, and the update frequency to be a rate (for example, 5 fps) in accordance with the non-display.

The first transfer device 22-1 transmits the update request including image data and the display status indicating the shared display to the display device 21 (step S363). Subsequently, having received the update request, the request processing unit 72 calls the determination unit 73 (step S364). Having received the call, the determination unit 73 accesses the display management information storing unit 71 (steps S365 and S366), and determines whether the display status included in the update request matches with the display status of the corresponding entry in the display management information (step S367). In this example, the display status included in the update request indicates the shared display, but the display status corresponding to the first transfer device 22-1 in the display management information indicates the full-screen display, and thus the display statuses do not match with each other. Thus, the determination unit 73 returns the determination result indicating that display is not allowed to the request processing unit 72 (step S368).

Having received the determination result indicating that display is not allowed from the determination unit 73, the request processing unit 72 does not provide the outputter 74 with the image data, but transmits the instruction information to the first transfer device 22-1 (step S369). The instruction information includes, for example, the display status (the full-screen display) included in the entry corresponding to the first transfer device 22-1 in the display management information.

Subsequently, the first transfer device 22-1 transmits the update request including image data and the display status indicating the full-screen display to the display device 21 (step S370). Subsequently, having received the update request, the request processing unit 72 calls the determination unit 73 (step S371). Having received the call, the determination unit 73 accesses the display management information storing unit 71 (steps S372 and S373), and determines whether the display status included in the update request matches with the display status of the corresponding entry in the display management information (step S374). In this example, the display statuses both indicate the full-screen display and match with each other, and thus the determination unit 73 returns to the determination result indicating that display is allowed to the request processing unit 72 (step S375).

Having received the determination result indicating that display is allowed from the determination unit 73, the request processing unit 72 provides the outputter 74 with image data (step S376). Then, the outputter 74 displays the received image data on the entire screen alone (step S377).

Figure 50:
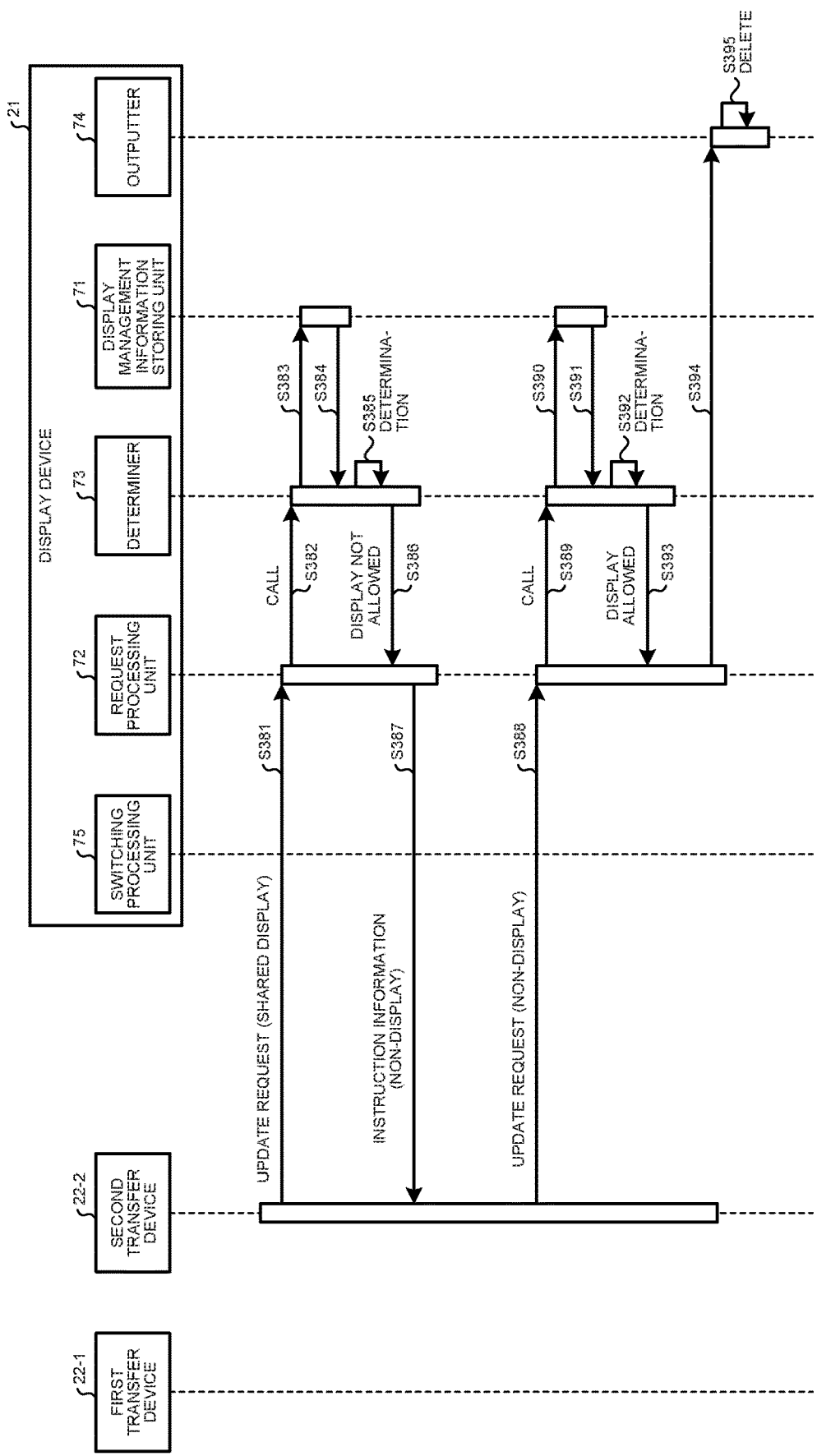
FIG. 50 is a sequence diagram illustrating an exemplary flow of operations executed by the display system after switching.

FIG. 50 is a sequence diagram illustrating an exemplary flow of operations executed by the display system 10 after switching. The display system 10 executes the operations as follows, when the operation at step S377 in FIG. 49 has ended.

The second transfer device 22-2 transmits the update request including image data and the display status indicating the shared display to the display device 21 (step S381). Subsequently, having received the update request, the request processing unit 72 calls the determination unit 73 (step S382). Having received the call, the determination unit 73 accesses the display management information storing unit 71 (steps S383 and S384), and determines whether the display status included in the update request matches with the display status of the corresponding entry in the display management information (step S385). In this example, the display status included in the update request indicates the shared display, but the display status corresponding to the second transfer device 22-2 in the display management information indicates the non-display, and thus the display statuses do not match with each other. Thus, the determination unit 73 returns the determination result indicating that display is not allowed to the request processing unit 72 (step S386).

Having received the determination result indicating that display is not allowed from the determination unit 73, the request processing unit 72 does not provide the outputter 74 with the image data, but transmits the instruction information to the second transfer device 22-2 (step S387). The instruction information includes, for example, the display status (the non-display) included in the entry corresponding to the second transfer device 22-2 in the display management information.

Subsequently, the second transfer device 22-2 transmits the update request including image data and the display status indicating the non-display to the display device 21 (step S388). Subsequently, having received the update request, the request processing unit 72 calls the determination unit 73 (step S389). Having received the call, the determination unit 73 accesses the display management information storing unit 71 (steps S390 and S391), and determines whether the display status included in the update request matches with the display status of the corresponding entry in the display management information (step S392). In this example, the display statuses both indicate the full-screen display and match with each other, and thus the determination unit 73 returns to the determination result indicating that display is allowed to the request processing unit 72 (step S393).

Having received the determination result indicating that display is allowed from the determination unit 73, the request processing unit 72 provides the outputter 74 with image data (step S394). In this example, the display status corresponding to the second transfer device 22-2 indicates the non-display. Thus, the outputter 74 does not display the received image data but deletes the received image data (step S395).

Figures 51, 52, 53:
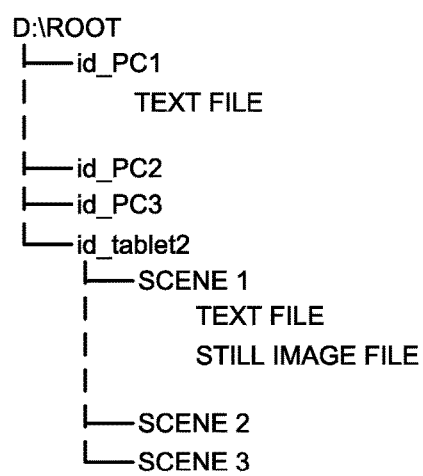
FIG. 51 is a diagram illustrating information items included in dummy data.
FIG. 52 is a diagram illustrating an information type table indicating the content of information included in the dummy data.
FIG. 53 is a diagram illustrating a storage position of data stored in an information storing device.

FIG. 51 is a diagram illustrating information items included in dummy data. FIG. 52 is a diagram illustrating an information type table indicating the content of information included in the dummy data.

If the display status included in the instruction information indicates the non-display, the update request transmitter 82 of the transfer device 22 may transmit the update request including the dummy data as image data to the display device 21.

In this case, the update request transmitter 82 may set the size of the dummy data to be optional. For example, the update request transmitter 82 may set the size of the dummy data to be one byte. In this manner, the transfer device 22 can reduce a communication load while maintaining connection with the display device 21 when generated image data is not displayed.

The update request transmitter 82 may include optional information in the dummy data. For example, as illustrated in FIG. 51, the dummy data may include optional information, an information type indicating the type of actual information, and an optional information size. In this case, the information type includes, for example, a value indicating no information, and text. If the information type is the value indicating no information, for example, the optional information may include no data or a predetermined amount of data of meaningless information. If the information type is text, the optional information includes text data. Alternatively, for example, the optional information may include still image data or sound data.

FIG. 53 is a diagram illustrating a storage position of data stored in an information storing device. If the display status indicates the non-display, the outputter 74 analyzes the information type included in the dummy data. If the optional information includes no information, the outputter 74 deletes the dummy data.

If the type of the optional information is a predetermined information type such as text, the outputter 74 executes operation in accordance with the information type. For example, the outputter 74 externally stores the optional information included in the dummy data in the information storing device.

In this case, as illustrated in FIG. 53, the outputter 74 may store the optional information in a directory corresponding to the transfer device 22 from which the update request is transmitted. The outputter 74 may form a directory for each information type, and store the optional information in the directory of the corresponding information type. More specifically, if the information type is text, the outputter 74 may store the optional information in a directory for text data.

In the information storing device, directories may be categorized into scenes. In this case, the outputter 74 may store, for example, a text file or a still image file in a directory of image data for each scene.

As a modification, the display device 21 may be connected with an image forming device such as a printer device. In this case, the display device 21 provides the image forming device with image data, and causes the image forming device to print the image data. Then, the display device 21 may provide the image forming device with, together with the image data, for example, a text file or a still image file stored in association with a scene of the image data. In this case, the image forming device prints, for example, a text file or a still image file together with the image data on an identical sheet.

As described above, in the display system 10 according to the present embodiment, the display status indicating the full-screen display, the shared display, or the non-display are mutually managed by the display device 21 and the transfer device 22. Then, the display device 21 displays image data in accordance with the display status. For example, if the display status indicates the non-display, the display device 21 does not display the image data.

In the display system 10 with this configuration, when display methods are switched not to display image data, the transfer device 22 can continue transmitting the image data being not displayed to the display device 21. Thus, the display system 10 can maintain communication between the transfer device 22 transmitting the image data being not displayed on the screen and the display device 21. Accordingly, when the full-screen display is switched to the shared display to display the image data again, the transfer device 22 can transmit the image data without performing procedures to establish communication again.

In this manner, the display system 10 according to the present embodiment can reduce the number of procedures necessary for communication at mutual switching between the full-screen display, the shared display, and the non-display.

Computer Program Configuration

Computer programs executed by the display device 21 and the transfer device 22 are each recorded and provided as a file in an installable or executable format in a computer-readable recording medium such as a CD-ROM, a flexible disk (FD), a CD-R, or a digital versatile disc (DVD).

Alternatively, the computer programs executed by the display device 21 and the transfer device 22 may be stored in a computer connected with a network such as the Internet and may be provided through downloading via the network. Alternatively, the computer programs executed by the display device 21 and the transfer device 22 may be provided or distributed through a network such as the Internet. Alternatively, the computer programs executed by the display device 21 and the transfer device 22 may be previously incorporated and provided in, for example, a ROM.

A computer program executed by the display device 21 according to the first embodiment includes a setting module, a control information transmitting module, a size determining module, an image receiving module, a size adjusting module, an outputting module, and a transfer rate determining module. The above-described components of the display device 21 according to the first embodiment are loaded onto a main storage device by a processor as actual hardware reading a computer program from a storage medium and executing the computer program so that the processor functions as the setting unit 33, the control information transmitter 34, the size determiner 35, the image receiver 36, the size adjuster 37, the drawing unit 47 of the outputter 38, the display unit 48 of the outputter 38, and the transfer rate determiner 39. For example, a storage device such as a main storage unit functions as the arrangement information storing unit 31, the management information storing unit 32, and the image storing unit 46 of the outputter 38.

A computer program executed by each transfer device 22 according to the first embodiment includes a request transmitting module, a control information receiving module, an image generating module, and an image transmitting module. The above-described components of the transfer device 22 according to the first embodiment are loaded onto a main storage device by a processor as actual hardware reading a computer program from a storage medium and executing the computer program so that the processor functions as the request transmitter 41, the control information receiver 42, the image generator 44, and the image transmitter 45. For example, a storage device such as a main storage unit functions as the control information storing unit 43.

A computer program executed by the display device 21 according to the second embodiment includes a request processing module, a determining module, an outputting module, and a switching processing module. The above-described components of the display device 21 according to the second embodiment are loaded onto a main storage device by a processor as actual hardware reading a computer program from a storage medium and executing the computer program so that the processor functions as the request processing unit 72, the determination unit 73, the drawing unit 86 of the outputter 74, the display unit 87 of the outputter 74, and the switching processing unit 75. For example, a storage device such as a main storage unit functions as the display management information storing unit 71 and the image storing unit 85 of the outputter 74.

A computer program executed by each transfer device 22 according to the second embodiment includes a reservation requesting module, an instruction information receiving module, an image data generating module, an update request transmitting module, and a switching request transmitting module. The above-described components of the transfer device 22 according to the second embodiment are loaded onto a main storage device by a processor as actual hardware reading a computer program from a storage medium and executing the computer program so that the processor functions as the reservation request transmitter 78, the instruction information receiver 79, the image data generator 81, the update request transmitter 82, and the switching request transmitter 83. For example, a storage device such as a main storage unit functions as the instruction information storing unit 80.

The present invention can reduce the number of procedures necessary for communication between a display device and a transfer device.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A display device to display image data received from a transfer device, the display device comprising:
   processing circuitry configured to
      determine a transmission image size as a resolution at which image data is to be transmitted by the transfer device, based on a display image size as a resolution at which the image data is to be displayed and a desired image size as a resolution at which the image data is to be transmitted by the transfer device;
      control transmission of control information, including the transmission image size determined, to the transfer device;
      convert the image data received from the transfer device into image data having a resolution indicated by the display image size; and
      control display of the image data converted, on a screen;
   a memory configured to store the display image size for each of a plurality of transfer devices, wherein the processing circuitry is configured to
      control collective display of pieces of image data respectively received from the transfer devices on one screen,
      convert the pieces of image data respectively received from the transfer devices into pieces of image data each having a resolution indicated as the corresponding display image size, and
      control display of the pieces of image data converted, on one screen; and
   a timer configured to fire upon a threshold time passing after the timer is called, wherein the processing circuitry is configured to
      upon the transmission image size being determined, call the timer and transmit, after the timer fires, the control information to a corresponding transfer device, and
      upon the display image size used to generate the transmission image size being changed before the timer fires, stop operation of the timer and generate a transmission image size again.

2. The display device of claim 1, wherein,
   upon a ratio of the desired image size relative to the display image size being in a defined range, the processing circuitry is configured to set the transmission image size to be the desired image size, and
   upon the ratio being out of the defined range, the processing circuitry is configured to set the transmission image size to be the display image size.

3. The display device of claim 2, wherein, upon the display image size being set or changed, the processing circuitry is configured to determine the transmission image size and is configured to control transmission of the control information including the transmission image size determined to the corresponding transfer device.

4. The display device of claim 3, wherein the processing circuitry is
configured to receive setting of whether to automatically adjust the transmission image size, wherein
upon the transmission image size being set to be automatically adjusted, the processing circuitry is configured to determine the transmission image size based on the display image size and the desired image size, and
upon the transmission image size being set not to be automatically adjusted, the processing circuitry is configured to determine the transmission image size to be the desired image size.

5. The display device of claim 1, wherein the processing circuitry is configured to receive setting of whether to execute temporary postponement operation of transmission of the control information, wherein
upon the temporary postponement operation being set to be executed, the processing circuitry is configured to control transmission of the control information to the corresponding transfer device after the timer fires; and
upon the temporary postponement operation being set not to be executed, the processing circuitry is configured to control transmission of the control information to a corresponding transfer device in response to determination of the transmission image size, irrespective of whether or not the timer fires.

6. The display device of claim 1, wherein the processing circuitry is configured to
change arrangement information of the pieces of image data collectively displayed on one screen in response to an operation by a user, and
the control transmission of the control information including an operation state indicating whether a drawing position of the corresponding image data is being changed or the corresponding image data is capable of being displayed.

7. The display device of claim 6, further comprising:
a communication suppression receiver configured to receive setting of whether to execute communication suppressing operation of preventing transmission of image data while a drawing position of the image data is being changed, wherein
upon the communication suppressing operation being set to be executed, the processing circuitry is configured to control transmission of the control information including the operation state indicating whether the drawing position is being changed or the image data is capable of being displayed, and
upon the communication suppressing operation being set not to be executed, the processing circuitry is configured to control transmission of the control information including the operation state indicating whether the image data is capable of being displayed.

8. The display device of claim 6, wherein the processing circuitry is configured to
receive, from the transfer device, a start request to start transmission of image data; and
receive setting of whether to execute arrangement fixing operation of fixing a screen arrangement, wherein
upon the arrangement fixing operation being set not to be executed, the processing circuitry is configured to change the display image size and the arrangement information in accordance with a number of pieces of received image data in response to the start request, and
upon the arrangement fixing operation being set to be executed, the processing circuitry is configured to fix the display image size and the arrangement information irrespective of the start request and irrespective of the number of pieces of received image data.

9. The display device of claim 1, wherein the processing circuitry is configured to control transmission, to the transfer device, of the control information including a transmission transfer rate as a transfer rate of image data to be transmitted.

10. The display device of claim 9, wherein the processing circuitry is configured to determine the transmission transfer rate included in the control information to be transmitted to the transfer device based on a measured value of a transfer rate of received image data.

11. The display device of claim 10, wherein
upon the measured value of the transfer rate of the received image data being equal to or larger than a defined value, the processing circuitry is configured to set the transmission transfer rate to be a first speed, and
upon the measured value of the transfer rate of the received image data being smaller than the defined value, the processing circuitry is configured to set the transmission transfer rate to be a second speed lower than the first speed.

12. The display device of claim 11, further comprising an automatic adjustment receiver configured to receive setting of whether to
automatically adjust the transmission transfer rate, wherein
upon the automatic adjustment of the transmission transfer rate being set, the processing circuitry is configured to determine the transmission transfer rate included in the control information to be transmitted to the corresponding transfer device based on the measured value of the transfer rate of the received image data, and
upon the automatic adjustment of the transmission transfer rate not being set, the processing circuitry is configured to set the transmission transfer rate to be a fixed speed.

13. The display device of claim 1, wherein the processing circuitry includes at least one of an application specific integrated circuit (ASIC), digital signal processor (DSP), and field programmable gate array (FPGA).

14. The display device of claim 1, further comprising a memory storing computer-readable instructions, wherein the processing circuitry includes and one or more processors configured to execute the computer-readable instructions.

15. A display method of displaying image data received from a transfer device on a display, the display method comprising:
determining a transmission image size as a resolution of image data to be transmitted from the transfer device, based on a display image size as a resolution at which the image data is displayed and a desired image size as a resolution at which the image data is to be transmitted by the transfer device;
controlling transmission of control information including the transmission image size determined, to the transfer device;
converting image data received from the transfer device into image data having a resolution indicated by the display image size;

controlling display of the image data, once converted, on a screen;
storing the display image size for each of a plurality of transfer devices;
controlling collective display of pieces of image data respectively received from the transfer devices on one screen;
converting the pieces of image data respectively received from the transfer devices into pieces of image data each having a resolution indicated as the corresponding display image size;
controlling display of the pieces of image data converted, on one screen;
firing a timer, upon a threshold time passing after the timer is called;
calling the timer, upon the transmission image size being determined and transmitting, after the timer firing, the control information to a corresponding transfer device; and
stopping operation of the timer, upon the display image size used to generate the transmission image size being changed before the timer fires, and generating a transmission image size again.

16. A display system comprising:
a transfer device configured to transmit image data; and
a display device configured to receive the image data from the transfer device and display the image data on a screen, wherein
the display device includes processing circuitry to:
  determine a transmission image size as a resolution of image data to be transmitted by the transfer device, based on a display image size as a resolution at which the image data is displayed and a desired image size as a resolution at which the image data is to be transmitted by the transfer device;
  control transmission of control information including the transmission image size determined, to the transfer device;
  convert image data received from the transfer device into image data having a resolution indicated by the display image size; and
  control display of the image data converted on a screen, and
the transfer device includes:
  a control information receiver configured to receive the control information;
  processing circuitry configured to generate image data at the transmission image size included in the control information; and
  an image transmitter configured to transmit the image data generated to the display device;
the display device further including a memory configured to store the display image size for each of a plurality of transfer devices, wherein the processing circuitry of the display device is configured to
  control collective display of pieces of image data respectively received from the transfer device on one screen,
  convert the pieces of image data respectively received from the transfer device into pieces of image data each having a resolution indicated as the corresponding display image size, and
  control display of the pieces of image data converted, on one screen; and
the display device further including a timer configured to fire upon a threshold time passing after the timer is called, wherein the processing circuitry of the display device is configured to
  upon the transmission image size being determined, call the timer and transmit, after the timer fires, the control information to the transfer device, and
  upon the display image size used to generate the transmission image size being changed before the timer fires, stop operation of the timer and generate a transmission image size again.

17. The display system of claim 16, wherein the processing circuitry includes at least one of an application specific integrated circuit (ASIC), digital signal processor (DSP), and field programmable gate array (FPGA).

18. The display system of claim 16, further comprising a memory storing computer-readable instructions, wherein the processing circuitry includes and one or more processors configured to execute the computer-readable instructions.

* * * * *